US011671744B2

(12) United States Patent
Yang et al.

(10) Patent No.: US 11,671,744 B2
(45) Date of Patent: Jun. 6, 2023

(54) WEARABLE DEVICE

(71) Applicant: HUAWEI TECHNOLOGIES CO., LTD., Shenzhen (CN)

(72) Inventors: Rongguang Yang, Dongguan (CN); Zhi Guo, Xi'an (CN); Jie Li, Shenzhen (CN); Menglong Zhao, Dongguan (CN); Bin Zhang, Dongguan (CN); Yanguo He, Xi'an (CN); Yuliang Yao, Xi'an (CN); Kelin Li, Xi'an (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 70 days.

(21) Appl. No.: 17/417,911

(22) PCT Filed: Dec. 25, 2018

(86) PCT No.: PCT/CN2018/123621
§ 371 (c)(1),
(2) Date: Jun. 24, 2021

(87) PCT Pub. No.: WO2020/132897
PCT Pub. Date: Jul. 2, 2020

(65) Prior Publication Data
US 2022/0060813 A1 Feb. 24, 2022

(51) Int. Cl.
*G06F 1/16* (2006.01)
*H04R 1/10* (2006.01)
*A44C 5/14* (2006.01)

(52) U.S. Cl.
CPC ............. *H04R 1/1091* (2013.01); *A44C 5/14* (2013.01)

(58) Field of Classification Search
CPC .......... H04R 1/163; H04R 3/017; H04R 3/16; H04R 40/30
See application file for complete search history.

(56) References Cited

U.S. PATENT DOCUMENTS

| | | | | |
|---|---|---|---|---|
| 2018/0173167 | A1 | 6/2018 | Szini et al. | |
| 2020/0110439 | A1* | 4/2020 | Deng | H04R 1/1041 |

FOREIGN PATENT DOCUMENTS

| | | | |
|---|---|---|---|
| CN | 202750212 | U | 2/2013 |
| CN | 103763647 | A | 4/2014 |
| CN | 203896487 | U | 10/2014 |
| CN | 104378709 | A | 2/2015 |
| CN | 204231644 | U | 3/2015 |

(Continued)

*Primary Examiner* — Amir H Etesam
(74) *Attorney, Agent, or Firm* — Rimon PC

(57) ABSTRACT

This application provides a wearable device. The wearable device includes a bearing body and a Bluetooth headset. An accommodating slot is disposed on the bearing body, a first locking component is disposed on the Bluetooth headset, and a second locking component is disposed on the bearing body. The Bluetooth headset is accommodated in the accommodating slot. The first locking component can be locked with the second locking component. The Bluetooth headset includes an operation portion. The operation portion is configured to: unlock the first locking component and the second locking component, and push the unlocked Bluetooth headset out of the accommodating slot. The wearable device in this application can directly accommodate the Bluetooth headset, to provide more convenience to a user.

19 Claims, 30 Drawing Sheets

(56) References Cited

FOREIGN PATENT DOCUMENTS

| | | | |
|---|---|---|---|
| CN | 204925641 | U | 12/2015 |
| CN | 206021148 | U | 3/2017 |
| CN | 206442499 | U | 8/2017 |
| CN | 107135439 | A | 9/2017 |
| CN | 107249151 | A | 10/2017 |
| CN | 206725973 | U | 12/2017 |
| CN | 206775493 | U | 12/2017 |
| CN | 207053713 | U | 2/2018 |
| CN | 207639773 | U | 7/2018 |
| CN | 108363290 | A | 8/2018 |
| CN | 207706386 | U | 8/2018 |
| CN | 108549206 | A | 9/2018 |
| CN | 108564949 | A | 9/2018 |
| CN | 207854117 | U | 9/2018 |
| CN | 109076276 | A | 12/2018 |
| WO | 2018112689 | A1 | 6/2018 |
| WO | 2018166486 | A1 | 9/2018 |

* cited by examiner

WEARABLE DEVICE

CROSS-REFERENCE TO RELATED APPLICATIONS

This application is a national stage of International Application No. PCT/CN2018/123621, filed on Dec. 25, 2018, which is hereby incorporated by reference in its entirety the beginning of the specification dated Jan. 24, 1922.

TECHNICAL FIELD

This application relates to the field of electronic device technologies, and in particular, to a wearable device.

BACKGROUND

An existing intelligent device such as a mobile phone or a watch phone usually needs to be provided with a pair of line control headsets or wireless Bluetooth headsets, to meet the requirement of a user for listening to music or having a call during exercising or driving. Whether it is the line control headsets or the wireless Bluetooth headsets that is used, the line control headsets or the wireless Bluetooth headsets need to be additionally accommodated. They are easily lost and are not convenient to carry along.

SUMMARY

A technical problem that needs to be resolved in embodiments of this application is to provide a wearable device that is convenient to use and can be used to carry a headset.

An embodiment of this application provides a wearable device. The wearable device includes a bearing body and a Bluetooth headset, where an accommodating slot is disposed on the bearing body, a first locking component is disposed on the Bluetooth headset, a second locking component is disposed on the bearing body, the Bluetooth headset is accommodated in the accommodating slot, and the first locking component is locked with the second locking component.

The Bluetooth headset includes an operation portion, and the operation portion is configured to: unlock the first locking component and the second locking component, and push the unlocked Bluetooth headset out of the accommodating slot. The wearable device provided in this application detachably accommodates the Bluetooth headset in the accommodating slot of a main body of a watch or a watch band of the wearable device. The wearable device may further locate the Bluetooth headset in the accommodating slot by coordinating the first locking component with the second locking component. The Bluetooth headset only needs to be removed from the wearable device when the Bluetooth headset needs to be used, so that it is convenient to accommodate the Bluetooth headset.

In a first embodiment, there are two Bluetooth headsets and two accommodating slots, each Bluetooth headset includes a headset head portion and a headset tail portion, the headset tail portion includes a pressing end, a contact position is disposed on an inner surface that is of the headset tail portion and that faces towards the accommodating slot, a support position that faces towards the contact position is disposed on a bottom wall of the accommodating slot, and the operation portion includes the pressing end and the contact position; and the Bluetooth headset is accommodated in the accommodating slot, the contact position of the Bluetooth headset abuts against the support position, the pressing end protrudes from the accommodating slot, a tail portion position of the Bluetooth headset is pressed into the accommodating slot, and the support position is used as a fulcrum for the Bluetooth headset, to enable the headset head portion to move out of the accommodating slot and the first locking component to be unlocked with the second locking component. The support position and the contact position form the fulcrum. To unlock the Bluetooth headset and the accommodating slot, a user only needs to press the headset, and this operation is convenient.

In a second embodiment, there are two Bluetooth headsets and two accommodating slots, each Bluetooth headset includes a headset head portion and a headset tail portion, and each accommodating slot includes a bottom wall opposite to an opening of the accommodating slot;

the headset head portion includes a head portion base and an earbud body that is slidably installed on the head portion base, a column is disposed at an end of the earbud body, and two opposite ends of the elastic body are separately connected between the head portion base and the earbud body; and after the Bluetooth headset is locked in the accommodating slot, the earbud body abuts against the bottom wall, the elastic body is pre-compressed, and the Bluetooth headset is pressed from the outside of the accommodating slot, so that the first locking component and the second locking component are unlocked, the elastic body is further compressed, and after external force is removed, the elastic body recovers elasticity to push the Bluetooth headset out, to help a user remove the headset from the relatively small accommodating slot.

In a third embodiment, there are two Bluetooth headsets and two accommodating slots, each Bluetooth headset includes a headset head portion and a headset tail portion, the main body of the watch includes a first side portion and a second side portion that is disposed opposite to the first side portion, the accommodating slot is recessed into the bearing body from the first side portion and extends to the second side portion, a through hole corresponding to each accommodating slot is disposed on the second side portion, and the through hole is in communication with the accommodating slot corresponding to the through hole; and the Bluetooth headset is accommodated in the accommodating slot, the headset head portion encapsulates an opening of the accommodating slot, the headset tail portion protrudes from the second side portion of the main body of the watch through the through hole, and the headset tail portion is pushed into the bearing body, so that the first locking component is unlocked with the second locking component and the headset head portion extends out of the accommodating slot. In this embodiment, a locking structure of the Bluetooth headset and the main body of the watch is simple, and by directly pressing the Bluetooth headset, the Bluetooth headset can be unlocked and pushed out of the main body of the watch, to help a user perform this operation.

In a fourth embodiment, the bearing body includes the main body of the watch and a bottom housing, a display screen is disposed on a front face of the main body of the watch, the accommodating slot is disposed on the bottom housing, and the main body of the watch and the bottom housing are movably connected to each other through a connection portion;

an elastic ejector pin is disposed on the Bluetooth headset, the main body of the watch covers the bottom housing to encapsulate the accommodating slot, a back face of the main body of the watch assists the first locking component and the second locking component in abutting against the Bluetooth headset, and the elastic ejector pin is compressed into the Bluetooth headset; and the main body of the watch moves relative to the bottom housing through the connection portion, to expose the accommodating slot, and the elastic ejector pin enables the first locking component and the second locking component to be unlocked, and pushes the Bluetooth headset out of the accommodating slot. A manner in which the main body of the watch is coordinated with Cisco is used to accommodate the Bluetooth headset, an inner structure of the main body of the watch does not need to be changed, and simple manufacturing does not affect performance of the watch.

In a fifth embodiment, the bearing body is the main body of the watch, the Bluetooth headset includes a headset tail portion and a headset head portion, and the headset tail portion includes an ejector pin that is disposed opposite to the first locking component;

an installation hole that threads through an outer side face of the main body of the watch is disposed on a side wall of the accommodating slot, the second locking component includes a key and a fastening hook, the key includes an abutting face that faces towards the fastening hook, the key is inserted in the installation hole from the outside of the main body of the watch, the fastening hook is located in the accommodating slot and is far away from the installation hole, and the abutting face abuts against the ejector pin; and the Bluetooth headset is accommodated in the accommodating slot, the fastening hook is fastened to the first locking component from a side of the headset tail portion, the key is pressed, to drive the fastening hook to move away from the headset tail portion and be unlocked with the first locking component, and in addition, the ejector pin is pushed to abut against and push the Bluetooth headset out of the accommodating slot.

In a sixth embodiment, the bearing body is the main body of the watch, a watch band is connected to the main body of the watch, and a flexible key and an ejecting component that is connected to the flexible key are disposed on each of two opposite sides faces of the Bluetooth headset;

the watch band includes a band body and a watch fastener that is disposed on the band body, the accommodating slot is disposed on an outer surface of the watch fastener, the accommodating slot includes two first side walls that are disposed opposite to each other, and a notch is disposed at an end portion of each first side wall; and the Bluetooth headset is accommodated in the accommodating slot, two flexible keys are fastened into notches, the flexible keys are pressed into the Bluetooth headset, to enable the flexible keys and notches to be unlocked, and in addition, the flexible key pushes the ejecting component to extend out of the Bluetooth headset and abut against a bottom wall of the accommodating slot, to push the Bluetooth headset out of the accommodating slot. In this embodiment, the Bluetooth headset is accommodated by using a watch fastener structure of the watch band. The structure is simple, and a dial does not need to be improved, to facilitate manufacturing.

The following describes each embodiment and various implementations in detail.

In the first embodiment of this application, the wearable device includes the main body of the watch and the two Bluetooth headsets, the Bluetooth headset includes the headset head portion and the headset tail portion, a first fastening slot is disposed on the headset head portion, a second fastening slot is disposed on the headset tail portion, and the accommodating slots are disposed on two opposite sides of the main body of the watch; and a locking component is disposed in each accommodating slot, the locking component includes an elastic body and an elastic fastener that is disposed opposite to the elastic body, the elastic body includes a connection end that is connected to the accommodating slot and a free end that is opposite to the connection end, an elastic protrusion is disposed on the free end, the Bluetooth headset is accommodated in the accommodating slot, the elastic protrusion is elastically fastened into the first fastening slot, and the elastic fastener is fastened into the second fastening slot.

In an implementation, connection ends of two elastic bodies are connected to each other, and the two elastic bodies are integrally formed to be conveniently installed in the main body of the watch.

Furthermore, the two elastic bodies are connected to each other at an angle, and free ends of the two elastic bodies tilt opposite to each other, to provide enough elasticity to the elastic protrusion.

In this embodiment, a support position that faces towards an opening is disposed in the accommodating slot. The Bluetooth headset is accommodated in the accommodating slot and abuts against the support position. A tail portion position of the Bluetooth headset is pressed into the accommodating slot, and the support position is used as a fulcrum for the Bluetooth headset, to enable the headset head portion to move out of the accommodating slot and be unlocked with the elastic protrusion. There is no need to additionally dispose an unlocking structure, and unlocking may be implemented by using the headset, to facilitate this operation.

The accommodating slot includes a first wall and a stopping wall that is disposed opposite to the first wall, the headset head portion is accommodated between the first wall and the stopping wall, the connection end of the elastic body is fastened to the first wall or the stopping wall, and the first fastening slot is recessed in an outer surface that is of the headset head portion and that faces towards the first wall, or the first fastening slot is recessed in an outer surface that is of the headset head portion and that faces towards the stopping wall.

Each accommodating slot includes a second wall that is disposed opposite to the first wall, the Bluetooth headset is located between the first wall and the second wall, and the elastic fastener is convexly disposed on the second wall and extends to the first wall.

Furthermore, a support board in parallel with the first wall is disposed between the first wall and the stopping wall that are of each accommodating slot, the connection end of the elastic body is fastened to the first wall and is located between the first wall and the support board, an abutting position disposed adjacent to the elastic protrusion is disposed on the free end of the elastic body, an end portion of the support board is an abutting end, and the abutting end supports the abutting position of the elastic body.

The accommodating slot includes the bottom wall that is located between the first wall and the second wall, a support body that faces towards the opening of the accommodating slot is convexly disposed on the bottom wall, and the support position is located on the support body.

A recessed portion is disposed on the second wall, an elastic end is disposed on the elastic fastener, and the elastic end is fastened to the recessed portion, so that the elastic fastener may be elastically deformed relative to the recessed portion.

The accommodating slot and the locking component that is located in the accommodating slot are disposed in the watch in this embodiment, to accommodate the Bluetooth headset in the main body of the watch. The Bluetooth headset and the locking component may be unlocked by pressing the Bluetooth headset. A structure is simple, and it is convenient to remove the headset. For the user, the user does not need to find an additional position to accommodate the headset, to avoid losing the headset and the headset can be removed in a timely manner when the headset is used, to save time and facilitate this operation.

In the second embodiment of this application, the wearable device includes two Bluetooth headsets, the main body of the watch, and a driving component, the Bluetooth headset includes the headset head portion and the headset tail portion, accommodating slots are respectively disposed on two opposite sides of the main body of the watch, and the first locking component is disposed on the Bluetooth headset; and the driving component includes a sliding portion and the second locking component, the sliding portion includes two opposite sliding directions, the two sliding directions are the same as directions in which two Bluetooth headsets are separated from the accommodating slots, the Bluetooth headset is fastened in the accommodating slot by fastening the first locking component and the second locking component, and when the sliding portion is driven to slide in a sliding direction, the second locking component is driven to be unlocked with the Bluetooth headset in the sliding direction.

Furthermore, a first fastening slot is disposed on the headset head portion, a second fastening slot is disposed on the headset tail portion, first locking components are the first fastening slot and the second fastening slot, the accommodating slots are respectively disposed on two opposite sides of the main body of the watch, the second locking component includes two elastic fastening bodies and two elastic fasteners, the sliding portion includes two opposite sliding directions, each accommodating slot includes a first wall and a second wall opposite to the first wall, the two elastic fasteners are respectively installed on second walls of the two accommodating slots, the sliding portion and the two elastic fastening bodies are disposed in the main body of the watch, the two elastic fastening bodies are respectively located in the two sliding directions of the sliding portion, and the two elastic fastening bodies respectively extend into the corresponding accommodating slots through two first walls; and the Bluetooth headset is accommodated in the accommodating slot and is located between the first wall and the second wall, the elastic fastener is fastened to the second fastening slot, the elastic fastening body is elastically fastened into the first fastening slot; and when the sliding portion is driven to slide in the sliding direction, the elastic fastening body located in the sliding direction is driven to be unlocked with the first fastening slot that is of the Bluetooth headset and that is fastened to the elastic fastening body.

The wearable device includes the two Bluetooth headsets, the main body of the watch, and the driving component, the Bluetooth headset includes the headset head portion and the headset tail portion, the first fastening slot is disposed on the headset head portion, the second fastening slot is disposed on the headset tail portion, and the accommodating slots are respectively disposed on two opposite sides of the main body of the watch; and the driving component includes the sliding portion, the two elastic fastening bodies, and the two elastic fasteners, and the sliding portion includes the two opposite sliding directions:

each accommodating slot includes the first wall and the second wall opposite to the first wall, the two elastic fasteners are respectively installed on second walls of the two accommodating slots, the sliding portion and the two elastic fastening bodies are disposed in the main body of the watch, the two elastic fastening bodies are respectively located in the two sliding directions of the sliding portion, and the two elastic fastening bodies respectively extend into the corresponding accommodating slots through the two first walls; and the Bluetooth headset is accommodated in the accommodating slot and is located between the first wall and the second wall, the elastic fastener is fastened to the second fastening slot, the elastic fastening body is elastically fastened into the first fastening slot, and when the sliding portion is driven to slide in the sliding direction, the elastic fastening body located in the sliding direction is driven to be unlocked with the first fastening slot that is of the Bluetooth headset and that is fastened to the elastic fastening body.

Furthermore, the driving component further includes an ejecting portion, and when the first fastening slot and the elastic fastening body are unlocked, the ejecting portion ejects the Bluetooth headset out of the accommodating slot. The ejecting portion helps the user remove the Bluetooth headset from the accommodating slot.

In this embodiment, the sliding portion includes a sliding slot and a sliding block that is slidably installed in the sliding slot, the sliding block includes a first end and a second end that are opposite to each other, first abutting bevels are disposed on both of the first end and the second end, and second abutting bevels are disposed on both of the two elastic fastening bodies; and the two elastic fastening bodies are installed in the sliding slot and are respectively located on the first end and the second end of the sliding block, the first abutting bevel abuts against the second abutting bevel, the two elastic fastening bodies partially extend out of the sliding slot and is elastically fastened to the first fastening slot, the sliding block slides to the first end or the second end, the first abutting bevel abuts against and pushes the second abutting bevel that is coordinated with the first abutting bevel, to enable the elastic fastening bodies to be retracted into the sliding slot and to be unlocked with the first fastening slot.

Each elastic fastening body includes a fastener body and a spring with one end disposed on the fastener body, the other end of the spring is connected to the sliding slot, the second abutting bevel is disposed on the fastener body, the fastener body extends out of the sliding slot and is fastened to the first fastening slot, and the spring provides fastening force to the fastener body.

Furthermore, the sliding portion further includes two return springs, the two return springs are separately connected between the sliding slot and the sliding block and have opposite elasticity, an elasticity direction of the spring is perpendicular to elasticity directions of the return springs, and the return springs provide return elasticity to the sliding block that has slid.

Two first stopping blocks that are spaced apart are disposed on a side wall of the sliding slot, a second stopping block is disposed on a surface that is of the sliding block and that is located between the first end and the second end, two opposite ends of each return spring are separately connected between the first stopping block and the second stopping block, and an elasticity direction is parallel to a sliding direction of the sliding block.

A fastener is disposed at an end portion that is of the fastener body and that is far away from the spring, the sliding slot includes the first side wall and the second side wall that are disposed opposite to each other and a third side wall that is connected to the first side wall and the second side wall, the first stopping block is disposed on the third side wall, a through hole in communication with the outside is disposed on each of two opposite ends of the second side wall, the spring is connected to the first side wall, and the fastener extends out of the sliding slot through the through hole.

In this embodiment, a toggle key that extends out of the main body of the watch is disposed on the sliding block, and the toggle key is connected to the sliding block; or a driving motor is connected to the sliding block, the driving motor is electrically connected to the wearable device, and the toggle key or the driving motor is configured to drive the sliding block to slide in the sliding slot.

The sliding portion includes a base, the sliding slot is disposed on the base, the base is installed on a side that is in the main body of the watch and on which the accommodating slot accommodates the headset head portion, and the elastic fastening body extends out of the base and then extends into the accommodating slot.

In an implementation, the ejecting portion includes a first magnet that is disposed in the Bluetooth headset and a second magnet that is disposed in the accommodating slot and that is opposite to the first magnet, and the first magnet and the second magnet are magnetically repulsive to each other. A structure of the ejecting portion in this embodiment is simple.

In another implementation, the ejecting portion is the elastic body, the headset head portion includes the head portion base and the earbud body that is slidably installed on the head portion base, the column is disposed at the end of the earbud body, and the two opposite ends of the elastic body are separately connected between the head portion base and the earbud body; and the accommodating slot includes the bottom wall, after the Bluetooth headset is locked in the accommodating slot, the earbud body abuts against the bottom wall and compresses the elastic body, and after the Bluetooth headset is unlocked, the elastic body recovers elasticity to push the Bluetooth headset out. The elastic body is disposed on the headset head portion, to increase comfort of the user when the headset head portion is put in an ear.

The main body of the watch includes a back housing, the back housing includes an installation hole that is in communication with the accommodating slot, the elastic fastener is disposed on a carrier, the carrier includes a seal board and an elastic arm that is located on an inner surface of the seal board and that extends far away from the seal board, the elastic fastener is disposed on the elastic arm, the elastic arm extends into the accommodating slot through the installation hole and contacts the second wall, and the seal board is installed on a back cover and covers the installation hole.

Each accommodating slot includes a first area that accommodates the headset head portion and a second area that accommodates other portions of the Bluetooth headset, the main body of the watch includes an installation cavity and a storage cavity that form the base, two first areas are connected and located between the installation cavity and the storage cavity, and second areas are located on two opposite sides of the storage cavity.

The two sliding directions are respectively directions in which the two Bluetooth headsets are removed from the accommodating slots.

In this embodiment, the Bluetooth headset is accommodated in the main body of the watch and is fastened to the first fastening slot through an elastic fastening body that elastically contacts the sliding portion. The elastic fastener is fastened to the second fastening slot to fasten the Bluetooth headset into the main body of the watch. The sliding portion may be driven by toggling the toggle key to unlock the elastic fastening body and the first fastening slot, so that the Bluetooth headset is released. In addition, the ejecting portion is coordinated to quickly release the headset, so that it is convenient to remove the headset and the user has comfortable experience. Furthermore, in this application, the two Bluetooth headsets can be unlocked in two directions by using a same sliding portion, to facilitate this operation.

The wearable device in the third embodiment of this application includes the main body of the watch and the two Bluetooth headsets, each Bluetooth headset includes the headset head portion and the headset tail portion, the first locking component is disposed on the headset head portion, the main body of the watch includes the first side portion and the second side portion that is disposed opposite to the first side portion, two adjacent accommodating slots that face towards the main body of the watch are recessed in the first side portion, the second locking component is disposed in each accommodating slot, the through hole corresponding to each accommodating slot is disposed on the second side portion, and the through hole is in communication with the corresponding accommodating slot; and the Bluetooth headset is accommodated in the accommodating slot, the headset head portion encapsulates the opening of the accommodating slot, the headset tail portion protrudes from the second side portion of the main body of the watch through the through hole, the Bluetooth headset is locked in the accommodating slot by coordinating the first locking component with the second locking component, and the headset tail portion is pushed into the main body of the watch, so that the first locking component and the second locking component are unlocked and the headset head portion extends out of the accommodating slot.

The headset tail portion protrudes from the second side face of the main body of the watch; or an end face of the headset tail portion is coplanar with a surface of the second side portion.

The headset head portion includes a top face that faces away from the headset tail portion, and the top face is coplanar with a surface of the first side portion.

The accommodating slot includes a first area that accommodates the headset head portion and a second area that is connected to the first area and that is in communication with the through hole, the second area extends from the first area to the second side portion, and two second areas of the accommodating slots are spaced apart.

The main body of the watch includes the main body and a back cover, a display screen is disposed on a front face of the main body, the accommodating slot is located on a back face of the main body, the opening of the accommodating slot is disposed on the first side portion, a storage cavity separates the two second areas of the accommodating slots, and the back cover covers the accommodating slot and the storage cavity.

A Bluetooth start key is disposed on the end face of the headset tail portion, and when the Bluetooth start key of the headset tail portion is pushed by external force to push the Bluetooth headset out of the accommodating slot, the Bluetooth headset is started.

Both of the first locking component and the second locking component are magnets, and the two magnets are magnetically attractive to each other.

In this embodiment, the Bluetooth headsets are located on a same side of the main body of the watch, and can be removed by directly pushing the tail portion of the Bluetooth headset. A structure is simple, an operation is convenient, and a structure in a body of the mobile phone does not need to be increased.

In the fourth and fifth embodiments of this application, the wearable device includes the main body of the watch, the bottom housing, and two Bluetooth headsets. The first locking component is disposed in the Bluetooth headset, and the display screen is disposed on the front face of the main body of the watch. The bottom housing includes a bearing face and the accommodating slot that is recessed in the bearing face. The second locking component that is locked with the first locking component is disposed in the accommodating slot. The main body of the watch is movably connected to the bottom housing through a connection portion. The main body of the watch covers the bearing face and encapsulates the accommodating slot, to encapsulate the Bluetooth headset into the bottom housing. The main body of the watch moves relative to the bottom housing through the connection portion, to expose the accommodating slot.

In an implementation, the connection portion is disposed at an end of the main body of the watch and is rotatably connected to the bottom housing, so that the main body of the watch may cover the bottom housing in a flipping manner, and the main body of the watch may be automatically ejected relative to the accommodating slot of the bottom housing.

The connection portion includes two opposite hinge ends and two rotating shafts, a rotary spring is sheathed on each of the rotating shafts, the two hinge ends are disposed at an end of the bottom housing, the two rotating shafts are respectively disposed on side faces that are of the main body of the watch and that are located on two opposite sides of the display screen, the two rotating shafts are respectively rotatably installed on the two hinge ends, to enable the main body of the watch to rotate relative to the bottom housing, and two opposite ends of the rotary spring respectively abut against the main body of the watch and the hinge end.

In this embodiment, main elements and the display screen of the watch are put in an integral form. The bottom housing is disposed and the main body of the watch covers the bottom housing, to form space that accommodates the Bluetooth headset. A manufacturing process is relatively simple, and space used to avoid the elements of the watch does not need to be disposed. After the main body of the watch and the bottom housing are unlocked, the main body of the watch may be automatically ejected, to help the user operate during a moving process. Therefore, convenience for use is improved and it is not easy to lose the headset.

In another implementation, the main body of the watch includes a back face opposite to the display screen, the connection portion includes sliding rails that are disposed on two opposite sides of the back face and sliding rails that are disposed on the bottom housing and that are coordinated with the sliding slots, and the sliding rails are slidably installed in the sliding slots, so that the main body of the watch is slidably installed on the bottom housing.

In this embodiment, the wearable device further includes the locking component, the locking component is disposed opposite to the rotating portion, and is configured to lock the main body of the watch on the bottom housing.

The locking component includes a first magnet that is disposed on a bearing face of the bottom housing and a second magnet that is disposed in the main body of the watch, the first magnet and the second magnet are magnetically attractive to each other and are both far away from the connection portion, and the main body of the watch covers the bottom housing and is fastened to the bottom housing through attraction between the first magnet and the second magnet.

A position that is of the back face of the main body of the watch and that is opposite to the accommodating slot is a recessed portion, and a fastening slot is disposed on an inner side wall of the recessed portion; and the locking component includes the fastening slot, a key, a fastening hook, and an elastic body; and an installation hole that threads through the accommodating slot is disposed on the bottom housing, the key includes a key shaft, the key shaft extends into the accommodating slot through the installation hole, the fastening hook is connected to an end portion of the key shaft, the elastic body is sheathed on the key shaft and is connected between the key and the bottom housing, the main body of the mobile phone covers the bottom housing, the fastening hook is fastened to the fastening slot and provides fastening force by using the elastic body, and the key is pressed to compress the elastic body to unlock the fastening hook and the fastening slot.

A storage portion and the recessed portion are disposed on the back face of the main body of the watch, a recessed slot that is adjacent to and in communication with the accommodating slot is disposed on the bearing face of the bottom housing, the main body of the watch covers the bottom housing, the storage portion is accommodated in the recessed slot, and the recessed portion is opposite fastened to the accommodating slot to form space that accommodates the two Bluetooth headsets.

There is a protrusion on the back face of the main body of the watch, the two sliding rails are disposed on two opposite sides of the protrusion and threads through an end face of the protrusion, the sliding slots are respectively disposed on inner side end portions of two side walls of the accommodating slot, the main body of the watch is slidably installed on the bottom housing, and the protrusion is located in the accommodating slot.

Both of the first locking component and the second locking component are magnets, and the two magnets are magnetically attractive to each other.

In this embodiment, the Bluetooth headset is encapsulated in a sliding form of the main body of the watch and the bottom housing, specifically a form of coordinating the sliding slot with the sliding rail. A structure is simple, a manufacturing process is convenient, and costs are relatively low. In addition, it is further ensured that the watch is clean and elegant in appearance.

In the sixth embodiment of this application, the wearable device includes the main body of the watch and two Bluetooth headsets, the Bluetooth headset includes the headset head portion and the headset tail portion, and the headset tail portion includes an outer end face and the first locking component;

the main body of the watch includes a front face, a display screen and accommodating slots located on two opposite sides of the display screen are disposed on the front face, and the second locking component corresponding to each Bluetooth headset is disposed on the main body of the watch; and the two Bluetooth headsets are respectively installed in the two accommodating slots, the second locking component is locked with the first locking component to firmly lock the Bluetooth headset into the accommodating slot, and the outer end face of the headset tail portion encapsulates an opening of the accommodating slot and is coplanar with the front face of the main body of the watch.

An elastic body is disposed on a bottom wall of the accommodating slot, the Bluetooth headset is accommodated in the accommodating slot and then compresses the elastic body, the second locking component is unlocked with the first locking component, and the elastic body ejects the Bluetooth headset out of the accommodating slot.

The first locking component is a fastening slot disposed on a side portion of the headset tail portion, and an installation hole that threads through an outer side face of the main body of the watch is disposed on a side wall of the accommodating slot;

the second locking component includes a key, a spring, and a fastening hook, the key includes a keycap and a key shaft that is disposed at an end of the keycap, the fastening hook is disposed at an end portion of the key shaft, a cavity that threads through the end portion of the key shaft is disposed in the key shaft, the spring is located in the cavity, and one end of the spring is fastened to the cavity; and the key shaft is inserted in the installation hole from the outside of the main body of the watch, the fastening hook is located in the accommodating slot and is far away from the installation hole, the other end of the spring is fastened to a side wall that is of the accommodating slot and that is far away from the installation hole, the Bluetooth headset is accommodated in the accommodating slot, the fastening hook is fastened to the fastening slot from a side of the headset tail portion, and the keycap is pressed to compress the spring, to drive the fastening hook to move and be unlocked with the fastening slot.

The accommodating slot includes a first area and a second area that is connected to the first area, the first area is configured to accommodate the headset head portion, and the second area is configured to accommodate the headset tail portion.

Furthermore, a decorative layer is disposed on the outer end face of the headset tail portion. The decorative layer may be set to a layer that has the same color as that of the front face of the main body of the watch, or may be a color layer, to improve appearance of a band.

The wearable device includes a watch band, and the watch band and the main body of the watch are integrally formed.

In this embodiment, the two Bluetooth headsets are respectively installed on two sides that are of an outer surface of a hand ring and that are located on the display screen, and the outer end face of the headset tail portion encapsulates the opening of the accommodating slot and is coplanar with the front face of the main body of the watch. It is only required to directly increase a length direction of the main body of the watch, and the inside of the watch does not need to be structurally changed. For the hand ring, when a length of the dial is increased, appearance is entirely improved.

In the seventh embodiment of this application, the wearable device includes the main body of the watch, the watch band connected to the main body of the watch, and the Bluetooth headset. The Bluetooth headset includes an external portion. The watch band includes a band body and a watch fastener that is disposed on the band body. The accommodating slot is disposed on an outer surface of the watch fastener. The Bluetooth headset is accommodated in the accommodating slot, the external portion encapsulates the opening of the accommodating slot, and a surface of the external portion of the Bluetooth headset is coplanar with the outer surface of the watch fastener.

The watch band includes a first band body and a second band body, the first band body and the second band body are respectively connected to two opposite ends of the main body of the watch, the watch fastener includes a foldable connection band and a buckle, the accommodating slot is disposed on an outer surface of the buckle, one end of the connection band is connected to the first band body, the other end is connected to one end of the buckle, the other end of the buckle is connected to the second band body, and the buckle is configured to firmly lock the first band body with the second band body.

The accommodating slot includes two first side walls that are disposed opposite to each other, a notch is disposed at an end portion of each first side wall, a flexible key is disposed on each of two opposite sides faces of the Bluetooth headset, the Bluetooth headset is accommodated in the accommodating slot, two flexible keys are fastened into the notch, and the flexible key is pressed into the Bluetooth headset to unlock the flexible key and the notch; and the flexible key is a function key of the Bluetooth headset, and is configured to start the Bluetooth headset when the Bluetooth headset is removed from the watch fastener.

The wearable device further includes a primary Bluetooth headset, a main accommodating slot is further disposed on the main body of the watch, and the primary Bluetooth headset is accommodated in the sub-accommodating slot, and is locked with the sub-accommodating slot by using a locking component. The primary Bluetooth headset and the Bluetooth headset may be used at the same time, or may be used separately.

When one of the primary Bluetooth headset and the Bluetooth headset is used, the other is charged by using a watch circuit, to ensure that the Bluetooth headset can be always used.

The Bluetooth headset includes an outer surface, a layer is disposed on the outer surface, the Bluetooth headset is installed outside the watch fastener, and the layer is exposed on the watch fastener. In this embodiment, the Bluetooth headset is disposed on the watch fastener, to help the user use the Bluetooth headset, and the user does not need to put the Bluetooth headset in another position such as a pocket of a garment, to avoid losing the Bluetooth headset. A thickness of the Bluetooth headset and a thickness of the watch fastener are the same, so that an entire thickness of the watch band is not increased, comfort of the band body of the watch band is not affected, and a dial does not need to be structurally changed. The Bluetooth headset has a key. When the key is pressed, an action of removing the headset may be performed, so that it is convenient and quick to accommodate and remove the Bluetooth headset.

The wearable device provided in this application detachably accommodates the Bluetooth headset in the accommodating slot of the main body of the watch or the watch band of the wearable device. The wearable device may further locate the Bluetooth headset in the accommodating slot by coordinating the first locking component and the second locking component. The Bluetooth headset can be removed from the wearable device when the Bluetooth headset needs to be used. Therefore, it is convenient to accommodate the Bluetooth headset, it is not easy for the Bluetooth headset to fall from the wearable device, and there is no need to put the Bluetooth headset in a handbag or the pocket, to avoid losing the Bluetooth headset. In addition, a line control headset is not required, and requirements of the user to listen to music and have a call during exercising or driving, to improve convenience for using the Bluetooth headset.

DESCRIPTION OF EMBODIMENTS

Figure 1:
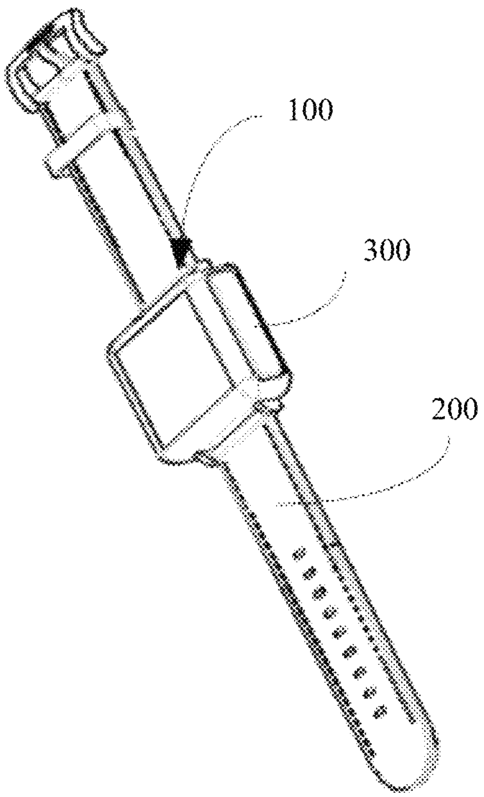
FIG. 1 is an overall schematic diagram of a wearable device in this application, where the wearable device is a smartwatch.

The following clearly and completely describes the technical solutions in implementations of the present invention with reference to the accompanying drawings in the implementations of the present invention.

This application discloses a wearable device. The wearable device may be a smartwatch or a smart band having a call function. The wearable device includes a bearing body and a Bluetooth headset, where an accommodating slot is disposed on the bearing body, a first locking component is disposed on the Bluetooth headset, a second locking component is disposed on the bearing body, the Bluetooth headset is accommodated in the accommodating slot, and the first locking component is locked with the second locking component, to prevent the headset from falling out of a watch; and the Bluetooth headset includes an operation portion, and the operation portion is configured to: unlock the first locking component and the second locking component, and push the unlocked Bluetooth headset out of the accommodating slot. A watch band is detachably connected to the bearing body, and a display screen is further installed on the bearing body. The bearing body accommodates various devices that implement a function of the watch, such as a circuit board. The Bluetooth headset can be removed from the bearing body when the Bluetooth headset needs to be used. The Bluetooth headset may be charged or discharged by using the watch. The wearable device in this application may accommodate the Bluetooth headset, and it is very convenient to remove or accommodate the Bluetooth headset. The Bluetooth headset does not need to be put in a handbag or a pocket, to avoid losing the Bluetooth headset. A line control headset is not required, and the Bluetooth headset is applicable to scenarios such as exercising and driving, to improve convenience for using the Bluetooth headset. In any one of the following embodiments, the Bluetooth headset may be limited in a structure of a dial or a watch band of the watch. A first locking component is disposed on the Bluetooth headset, and a second locking component may be disposed on the watch. The second locking component may be an independent element, or may be a combination of a plurality of elements.

In embodiments of this application, the wearable device is described by using a smartwatch having a call function and two Bluetooth headsets as an example. A display screen is disposed on the smartwatch, to implement functions such as receiving or having a call, reading a message, displaying a motion parameter. The Bluetooth headset may be connected to the watch through Bluetooth to implement a function of assisting the watch in making or receiving a sound. In addition, the two Bluetooth headsets may be combined as a dual-channel to listen to stereo music and to receive or have a call. Certainly, one of the two Bluetooth headsets may be used as a primary headset, and the other is used as a secondary headset. The primary headset is frequently used to have a call or listen to music, and the secondary headset may continue to be charged in the main body of the watch. In other words, a power supply endurance capability of the primary headset may be doubled or be more increased. Details are described by using the following embodiments.

In a first embodiment of this application, the smartwatch is used as an example, the bearing body is the main body of the watch, there are two Bluetooth headsets and two accommodating slots, and each Bluetooth headset includes a headset head portion and a headset tail portion, where the headset tail portion includes a pressing end, a contact position is disposed on an inner surface that is of the headset tail portion and that faces towards the accommodating slot, a support position that faces towards the contact position is disposed on a bottom wall of the accommodating slot, and the operation portion includes the pressing end and the contact position; and the Bluetooth headset is accommodated in the accommodating slot, the contact position of the Bluetooth headset abuts against the support position, the pressing end protrudes from the accommodating slot, a tail portion position of the Bluetooth headset is pressed into the accommodating slot, and the support position is used as a fulcrum for the Bluetooth headset, to enable the headset head portion to move out of the accommodating slot and the first locking component to be unlocked with the second locking component. The Bluetooth headset includes the headset head portion and the headset tail portion, a first fastening slot is disposed on the headset head portion, a second fastening slot is disposed on the headset tail portion, accommodating slots are disposed on two opposite sides of the main body of the watch, and the support position that faces towards the opening is disposed in the accommodating slot; and an elastic component is disposed in each accommodating slot, the elastic component includes an elastic body and an elastic fastener that is disposed opposite to the elastic body, the elastic body includes a connection end that is connected to the accommodating slot and a free end that is opposite to the connection end, an elastic protrusion is disposed on the free end of the elastic body, the Bluetooth headset is accommodated in the accommodating slot and abuts against the support position, the elastic protrusion is fastened into the first fastening slot, and the elastic fastener is fastened into the second fastening slot. It may be understood that the first fastening slot and the second fastening slot are first locking components, and the elastic component is the second locking component. The following is described in detail by using specific embodiments with reference to the accompanying drawings.

Figure 2:
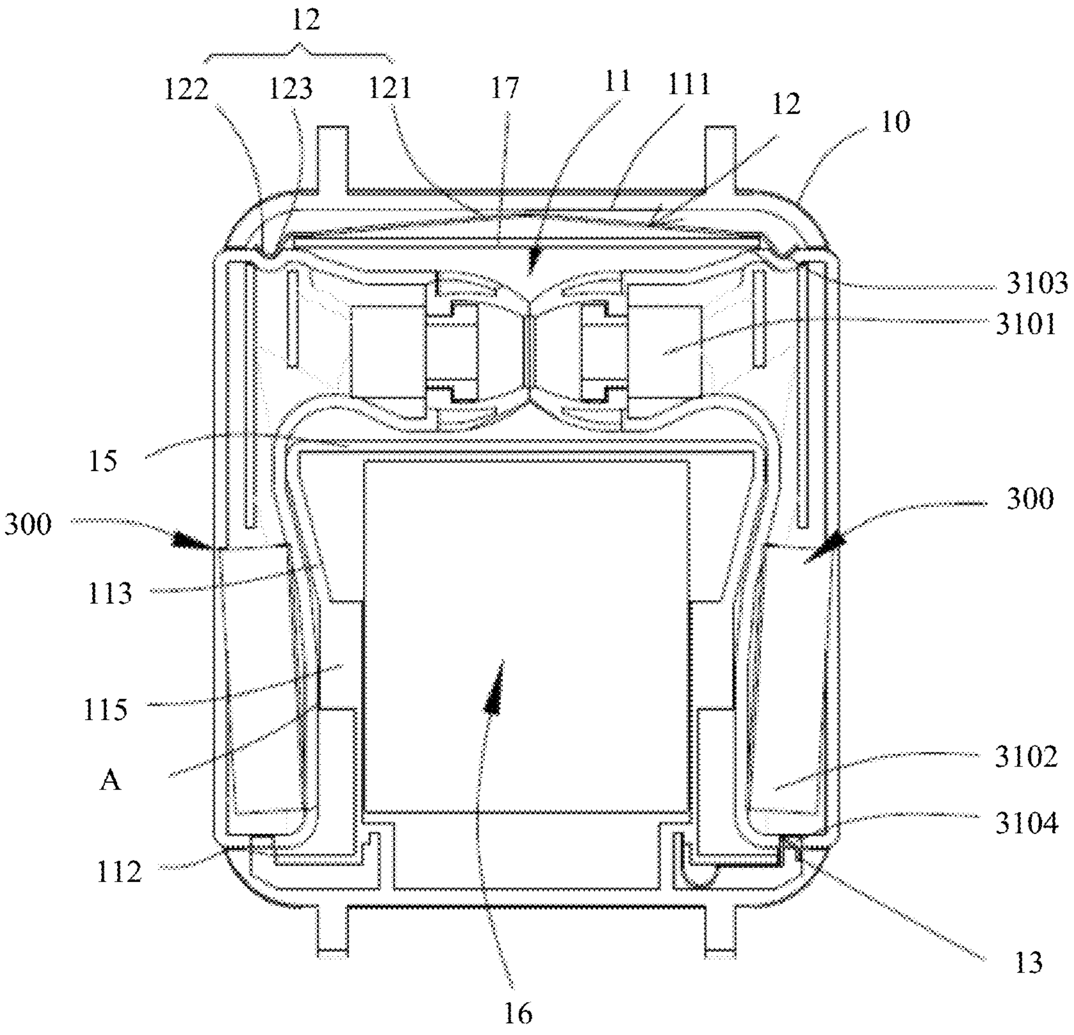
FIG. 2 is a schematic diagram of an internal structure of the smartwatch in a first embodiment shown in FIG. 1, where a Bluetooth headset is firmly locked in a main body of the watch.
Figure 3:
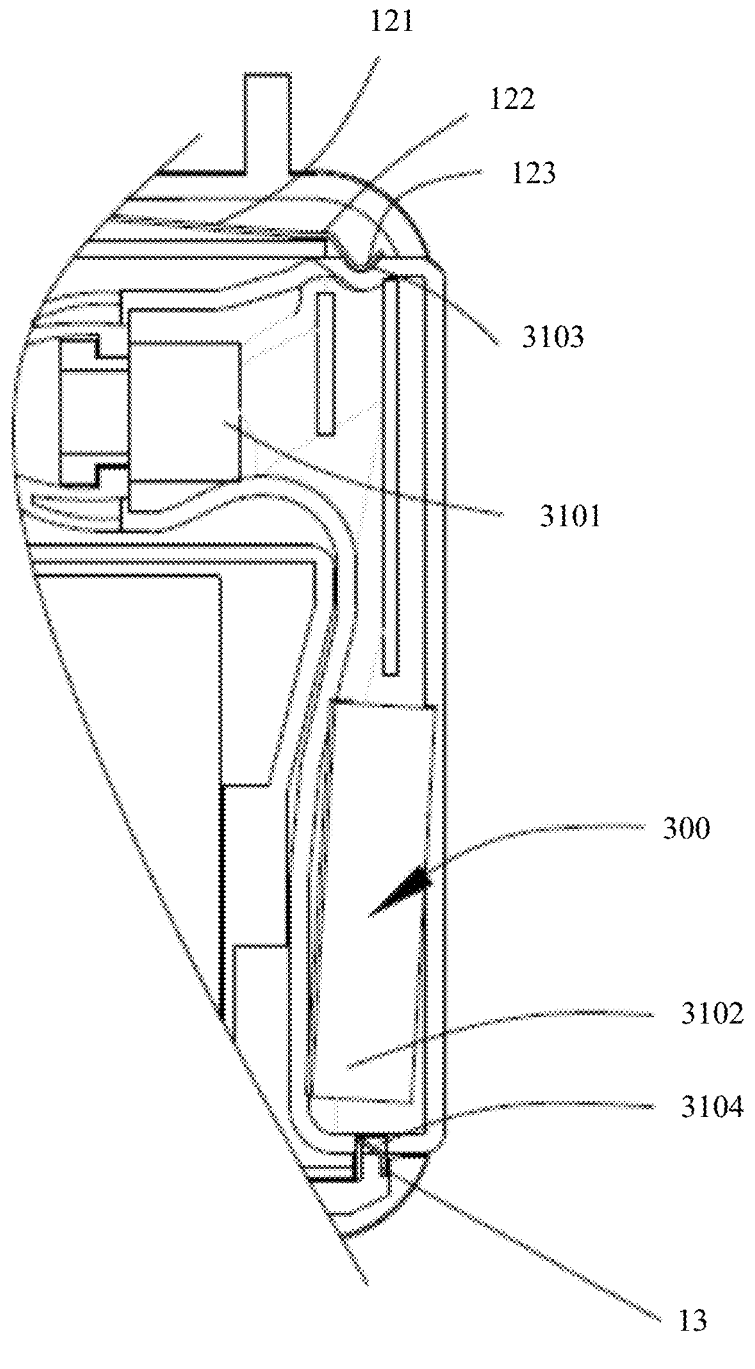
FIG. 3 is a partially enlarged view of a structure of the smartwatch shown in FIG. 2.

FIG. 1 is an overall diagram of a smartwatch. The smartwatch includes a dial 100, a watch band 200 that is installed on the dial 100, and a Bluetooth headset 300. A display screen 14 is disposed on the dial, and the dial may be understood as a main body of the watch or including the main body of the watch. FIG. 2 is a schematic diagram of an internal structure of the main body of the smartwatch in an embodiment. The Bluetooth headset is firmly locked in the dial. The Bluetooth headset 300 includes a headset head portion 3101 configured to transfer a sound and a headset tail portion 3102 that is disposed opposite to the headset head portion 3101, and a body of the headset is between the headset head portion 3101 and the headset tail portion 3102. The first locking component includes a first fastening slot 3103 that is disposed on the headset head portion 3101 and a second fastening slot 3104 that is disposed on the headset tail portion 3102. The dial of the smartwatch includes a main body of the watch 10, and accommodating slots 11 that accommodate two Bluetooth headsets 300 that face towards the inside of the main body of the watch are recessed in two opposite sides of the main body of the watch 10. FIG. 3 is a partially enlarged view of the structure shown in FIG. 2. An elastic component is disposed in each accommodating slot 11, the elastic component includes an elastic body 12 and an elastic fastener 13 that is disposed opposite to the elastic body 12, the elastic body 12 includes a connection end 121 that is connected to the accommodating slot 11 and a free end 122 that is opposite to the connection end 121, and an elastic protrusion 123 is disposed on the free end 121. The elastic body 12 and the elastic fastener 13 are disposed opposite to each other in the accommodating slot 11, the Bluetooth headset 300 is pressed and is accommodated in the accommodating slot 11 from the opening of the accommodating slot 11, the elastic protrusion 123 is elastically fastened into the first fastening slot 3103, and the elastic fastener 13 is fastened into the second fastening slot 3104, to fasten the Bluetooth headset into the main body of the watch. When the Bluetooth headset needs to be removed, the headset may be directly pulled out from the outside, so that the elastic protrusion 123 is unlocked with the first fastening slot 3103 and the elastic fastener 13 is unlocked with the second fastening slot 3104.

Figure 5:
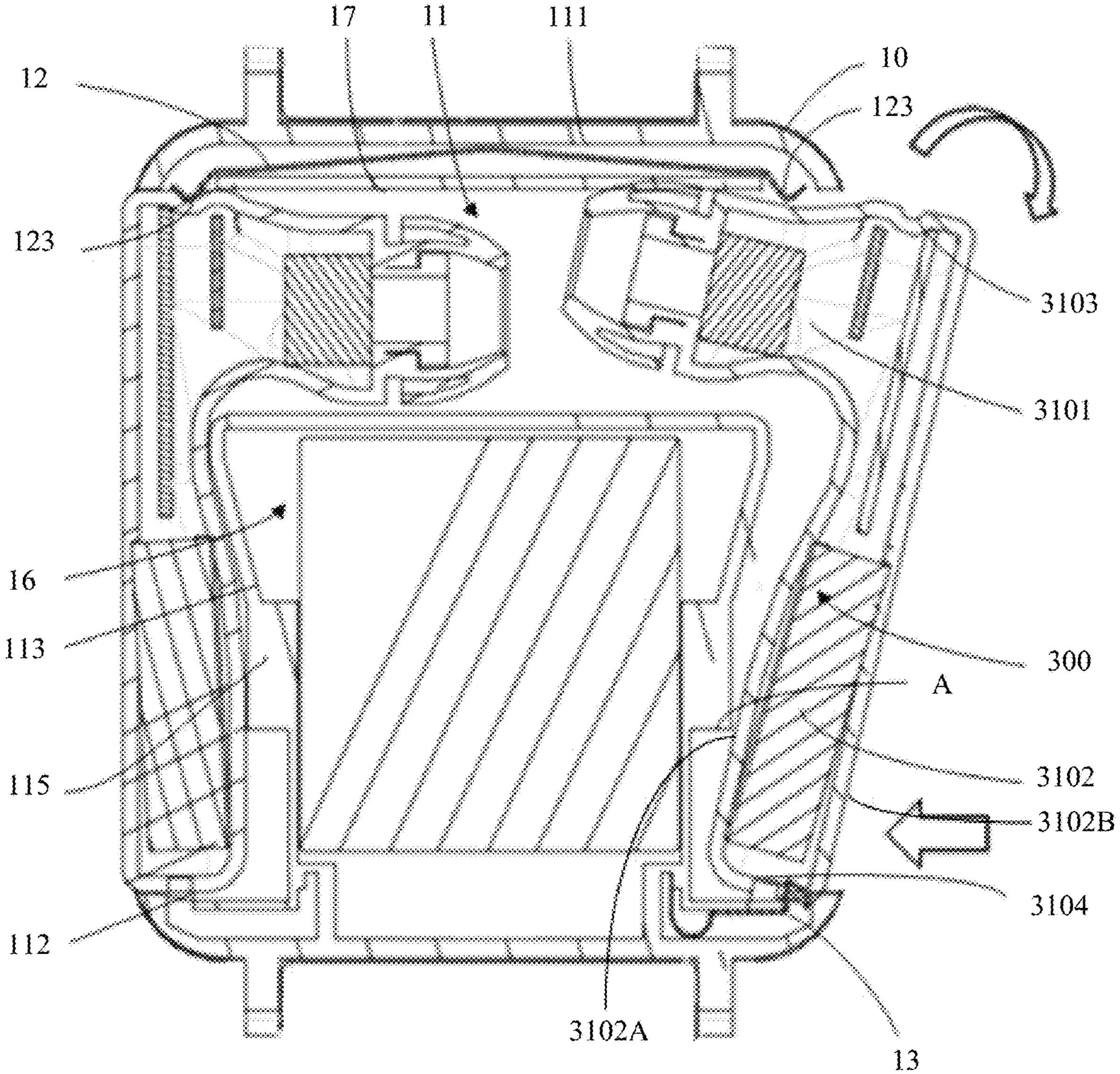
FIG. 5 is a schematic diagram of an unlocking state of the Bluetooth headset and the main body of the watch shown in FIG. 2.

Furthermore, referring to FIG. 5, FIG. 5 is a diagram of an unlocking state of the Bluetooth headset and the dial of the watch, a support position A that faces towards the opening is disposed in the accommodating slot 11, the headset tail portion 3102 includes a pressing end 3102A, and a contact position 3102B is disposed on an inner surface that is of the headset tail portion 3102 and that faces towards the accommodating slot 11. The Bluetooth headset 300 is accommodated in the accommodating slot 11 and abuts against the support position A, the pressing end 3102A of the headset tail portion is pressed into the accommodating slot 11, the support position A is used as a fulcrum for the Bluetooth headset 300, the headset head portion 3101 is enabled to move out of the accommodating slot 11 and to be unlocked with the elastic protrusion 123, so that it is convenient to remove the Bluetooth headset 300. In this embodiment, the operation portion includes the headset tail portion 3102 that includes the pressing end 3102A and the contact position 3102B. Furthermore, to enable the headset head portion to be removed from the accommodating slot more easily, a spring is disposed in the headset head portion 3101. Specifically, the headset head portion 3101 includes a head portion base and an earbud body that is slidably installed on the head portion base, a column is disposed at an end of the earbud body, and two opposite ends of the elastic body are separately connected between the head portion base and the earbud body. After the Bluetooth headset is locked in the accommodating slot, the elastic body is pre-compressed, and the pressing end of the Bluetooth headset is pressed, so that the first locking component is unlocked with the second locking component, and the elastic body recovers elasticity to eject the headset head portion out of the accommodating slot. Elasticity of the spring is less than locking force of the first locking component and the second locking component. A part that is of the Bluetooth headset 300 and that protrudes from the accommodating slot 11 of the main body of the watch is an outer side of the Bluetooth headset, the first fastening slot 3103 and the second fastening slot 3104 are disposed on positions that are not on the outer side, and a subsequently described process in which the Bluetooth headset 300 is pressed refers to a process in which the outer side is pressed. The headset tail portion 3102 of the Bluetooth headset 300 is pressed, the support position A that is located in the accommodating slot 11 and that is between the headset head portion 3101 and the headset tail portion 3102 of the Bluetooth headset 300 is used as a rotating fulcrum, the headset head portion 3101 of the Bluetooth headset 300 is enabled to tilt towards the outside of the accommodating slot 11, and the first fastening slot 3103 is enabled to be removed from the elastic fastening body 12 and is unlocked. Therefore, the Bluetooth headset 300 may be removed to enable the Bluetooth headset 300 to entirely fall out of the accommodating slot 11.

The accommodating slot and the elastic component that is located in the accommodating slot are disposed in the watch in this embodiment, to accommodate the Bluetooth headset in the main body of the watch. The Bluetooth headset may be unlocked with the locking component by pressing the Bluetooth headset, and it is convenient to remove the headset. For a user, the user does not need to find an additional position to accommodate the headset, to avoid losing the headset, and the headset can be removed in a timely manner when the headset is used, to save time and facilitate this operation.

Figure 4:
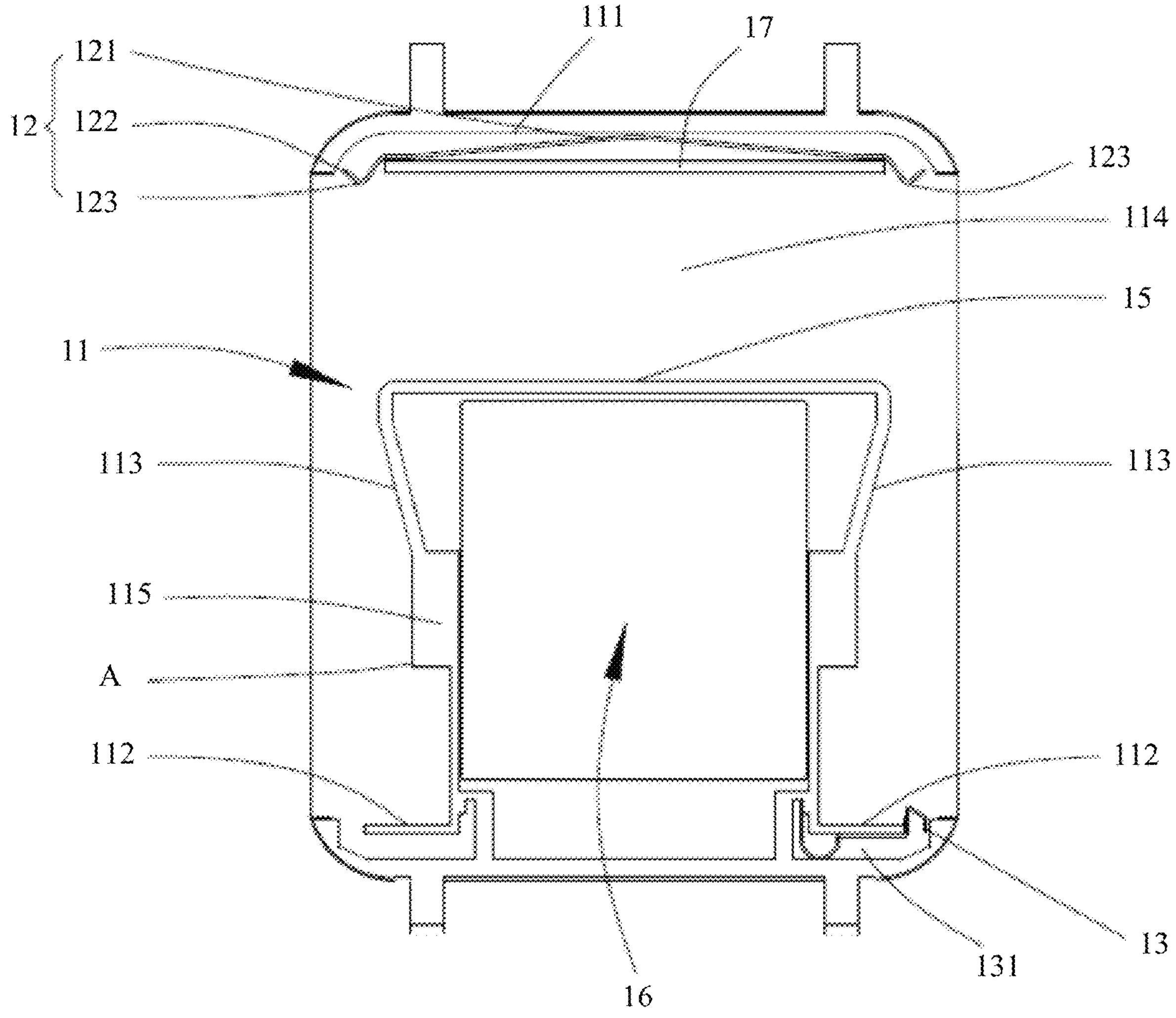
FIG. 4 is a schematic diagram of the internal structure of the main body of the watch shown in FIG. 2.

The following describes a specific structure in this embodiment in detail. Referring to FIG. 4 and FIG. 5, FIG. 4 is a schematic diagram of an internal structure of the main body of the watch 10 without the Bluetooth headset. The main body of the watch 10 includes a back housing (not shown in the figure), two opposite side portions 101 that are disposed on the back housing, and two opposite end portions 102 that are connected to the two side portions 101. The back housing, the end portions 102, and the side portions 101 enclose accommodating space. The display screen 14 is installed on the main body of the watch 10, is opposite to the back housing, and contacts the end portions 102 and the side portions 101 to cover the accommodating space. The display screen 14, the main body of the watch 10, various devices that implement functions of the watch, such as a circuit board, and the main body of the watch form the dial 100 of the watch. The watch band 200 is connected to the outside of the two end portions 102. A storage cavity 16 that is enclosed by stopping walls is disposed in the main body of the watch 10. The storage cavity 16 accommodates the various devices that implement the functions of the watch, such as the circuit board. Certainly, after integrally formed with the display screen 14, the various devices that implement the functions of the watch, such as the circuit board, may be installed on the main body of the watch 10, and two accommodating slots 11 are respectively recessed in the two side portions 101. After the Bluetooth headset 300 is accommodated in the accommodating slot 11, the Bluetooth headset 300 exactly fills the opening of the accommodating slot 11, and a surface that is of the Bluetooth headset 300 and that protrudes from the accommodating slot 11 forms an entire face portion with a surface of the side portion of the main body of the watch 10, to ensure integrity of appearance of the watch. As shown in FIG. 5, the surface that is of the Bluetooth headset 300 protrudes from the accommodating slot 11 and is coordinated with the main body of the watch 10, and the Bluetooth headset 300 is on the left and is locked with the main body of the watch.

The accommodating slot 11 that faces towards the inside of the main body of the watch 10 is recessed in the side portion 101. Actually, it may be understood that the accommodating slot 11 is formed after an opening of the accommodating space is disposed on the side portion 101. The storage cavity is located between the two accommodating slots 11, and faces away from the opening of the accommodating slot 11. Each accommodating slot 11 includes a first wall 111, a second wall 112 that is disposed opposite to the first wall 111, and a bottom wall (not shown in the figure) that faces towards the opening of the accommodating slot 11 and that is located between the first wall 111 and the second wall 112. In this embodiment, it can be learned from a sectional view in parallel with a direction of the display screen, the accommodating slot 11 is shaped as and the two accommodating slots 11 are in communication with each other. Specifically, first walls 111 of the two accommodating slots 11 are connected to each other to form a plate structure, two second walls 112 are separated by the storage cavity, and a stopping wall that faces towards the opening and that is of the storage cavity 16 is the bottom wall 113. A stopping wall 15 is connected to two bottom walls 113 and is opposite parallel to the first wall 111. First areas 114 that accommodate headset head portions 3101 is formed between the two first walls 111 and stopping walls 15. In this embodiment, the two first areas 114 are in communication with each other. Certainly, a spacer may be disposed in the first areas 114, to space the headset head portions 3101 of the two Bluetooth headsets.

As shown in FIG. 4, in this embodiment, the elastic body 12 is a metal elastic piece shaped in a strip. Connection ends 121 of two elastic bodies 12 are connected to each other, and the two elastic bodies 12 are integrally formed. Specifically, the two elastic fastening bodies 12 are formed by stamping the metal elastic piece shaped in the strip, and a stamped metal elastic piece may be in a shape of a straight strip, or may approximately be a "V" shaped elastic piece. The elastic protrusion 123 may approximately be shaped as "V", and protrudes in a same direction. The metal elastic piece is located in the first area 114, a connection position between connection ends 121 of the two elastic bodies 12 is connected to the first wall 111, and free ends 122 of the two elastic bodies 12 are respectively located in the accommodating slots 11 and have enough elastic deformation space.

Furthermore, the two elastic bodies 12 are connected to each other at an angle, and the free ends 122 of the two elastic bodies 12 tilts opposite to each other. Specifically, the stamped metal elastic piece is approximately in the shape of "V", a body 17 of the metal elastic piece is in a shape of a strip and is slightly bent in the middle of the body, so that the two elastic fastening bodies 12 are symmetrically disposed. The two elastic fastening bodies 12 protrude in a same direction. The free ends 122 of the two elastic bodies 12 approximately tilt in a direction that faces towards the angle, so that each elastic body 12 is in a state of a cantilever after the elastic body 12 is fastened, and the elastic protrusion 123 has enough elasticity.

As shown in FIG. 4 and FIG. 5, in a first implementation of this embodiment, the elastic bodies 12 are fastened to the first walls 111 of the two accommodating slots 11. Specifically, connection positions of the two elastic bodies 12 are fastened to connection positions of the two first walls 111. It may be understood that middle positions of metal elastic pieces are fastened to the first walls 111, the two elastic bodies 12 are symmetrically disposed and are located in the two accommodating slots 11 in a suspended manner, so that the elastic bodies 12 have enough elasticity. Corresponding to the elastic body 12, the first fastening slot 3103 of the headset head portion 3101 is disposed on a side that is of an outer surface of the headset head portion 3101 and that faces away from the headset tail portion 3102.

A recessed portion that faces towards the first wall 111 is disposed on the second wall 112, an elastic end 131 is disposed on the elastic fastener 13, and the elastic end 131 is fastened to the recessed portion, so that the elastic fastener 13 may be elastically deformed relative to the recessed portion. In this embodiment, the elastic fastener 13 protrudes from the second wall 112 and extends to the elastic body 12. Specifically, the elastic end is connected to the second side wall 112, and provides elastically deformed space to the elastic fastener 13. Furthermore, a bevel is disposed at an end portion of the elastic fastener 13, and helps the elastic fastener 13 be unlocked with the second fastening slot 3104.

As shown in FIG. 5, the second fastening slot 3104 of the headset tail portion 3102 is disposed facing away from the headset head portion 3101. When the Bluetooth headset 300 is accommodated in the accommodating slot 11, the headset head portion 3101 and the headset tail portion 3102 may both be pushed into the accommodating slots 11. After pushed by the headset head portion 3101, the elastic body 12 is first deformed away from the headset head portion 3101 until the elastic protrusion 123 is fastened to the first fastening slot 3103, and elasticity of the elastic body 12 recovers to provide enough fastening force for fastening between the elastic protrusion 123 and the first fastening slot 3103. In this case, the elastic fastener 13 is fastened to the second fastening slot 304. When the Bluetooth headset 300 needs to be removed, the pressing end of the headset tail portion 3102 is pressed from the outside of the main body of the watch 10, and a surface that is of the Bluetooth headset 300 and that faces towards the accommodating slot 11 contacts a support position of a support body 113. The support position is used as a fulcrum, the Bluetooth headset 300 is enabled to rotate, the headset head portion 3101 of the Bluetooth headset 300 tilts towards the outside of the accommodating slot 11, and the first fastening slot 3103 is removed from the elastic body 12 and is unlocked.

Furthermore, as shown in FIG. 4, a support board 17 in parallel with the first wall 111 is disposed between the first wall 111 and the spacer 15 that are of each accommodating slot 11, the connection end of the elastic body 12 is fastened to the first wall 111 and is located between the first wall 111 and the support board 17, an abutting position 124 that is disposed adjacent to the elastic protrusion 123 is disposed on the free end of the elastic body 12, and an end portion of the support board 17 supports the abutting position 124 of the elastic body 12, to enhance a strength of the elastic body 12, so that the elastic body 12 is prevented from being deformed due to excessive force of removing and accommodating the headset. Specifically, support boards 17 of the two accommodating slots 11 are integrally formed, to constitute a plate that is in parallel with the first wall 111 and that is located in the first area 114. The abutting position is located between the connection end and the elastic protrusion 123 that are of the elastic body 12. When the support board 17 supports the elastic body 12, the elastic protrusion 123 protrudes from the end portion of the support board 17, and the two elastic bodies 12 extend into the accommodating slots 11 through two ends of the support board 17. This structure may also ensure the elastic fastening force of the elastic body 12.

Furthermore, the support body 115 is disposed on a first section that is of the bottom wall 113 that faces towards the opening of the accommodating slot 11, or the support body 115 may be disposed on a partial structure of a back portion of the display screen 14. The support position is a protruding point of the support body 115. The Bluetooth headset 300 is accommodated in the accommodating slot 11 and abuts against the support position, the tail portion 3102 of the Bluetooth headset is pressed into the accommodating slot 11, the support position is used as a fulcrum for the Bluetooth headset, the headset head portion 3103 is enabled to move out of the accommodating slot 11 and to be unlocked with the elastic protrusion 123.

Figure 6:
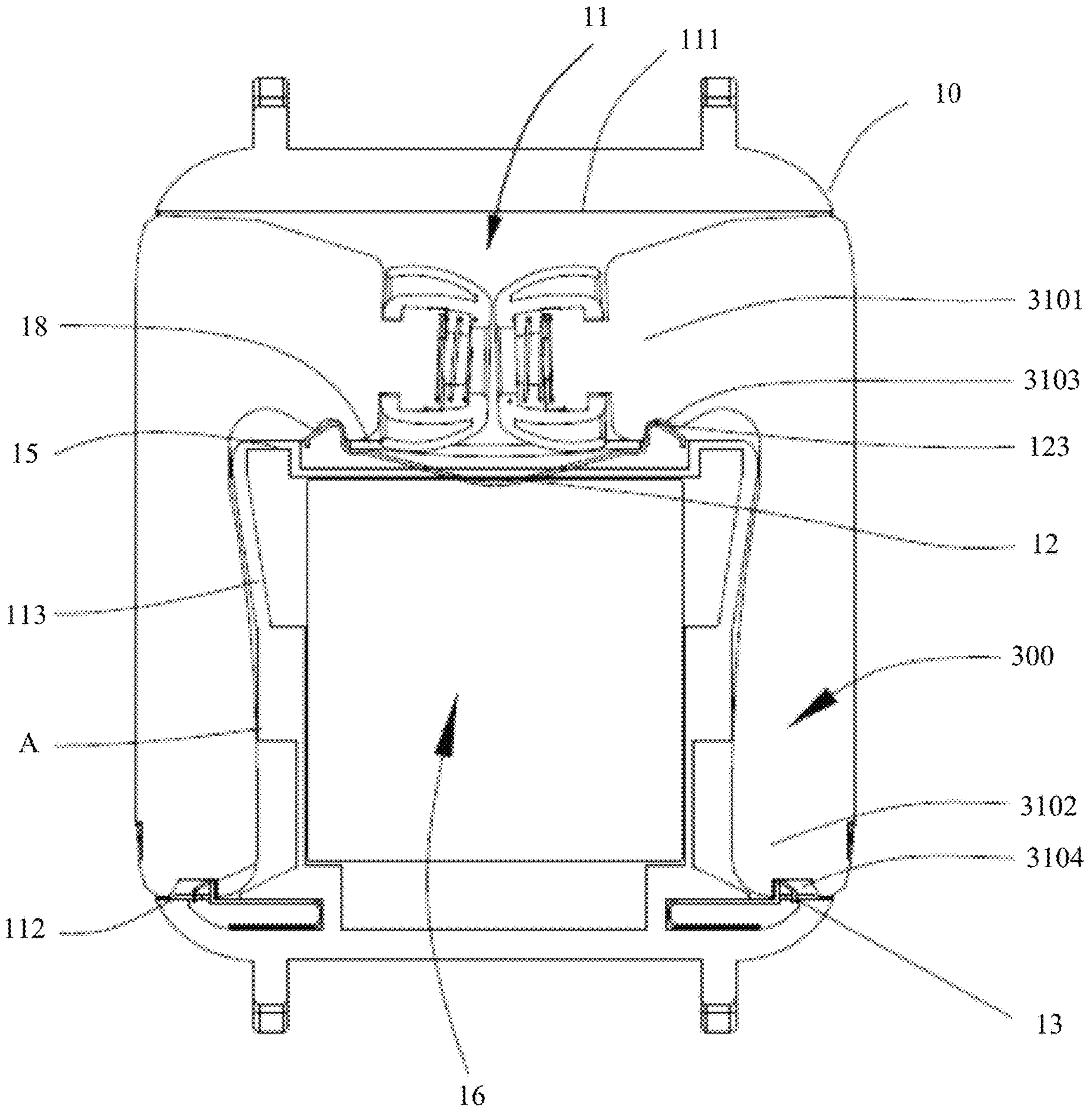
FIG. 6 is a schematic diagram of an assembling manner of an elastic body and a main body of the mobile phone of the wearable device shown in FIG. 1 in another implementation.
Figure 7:
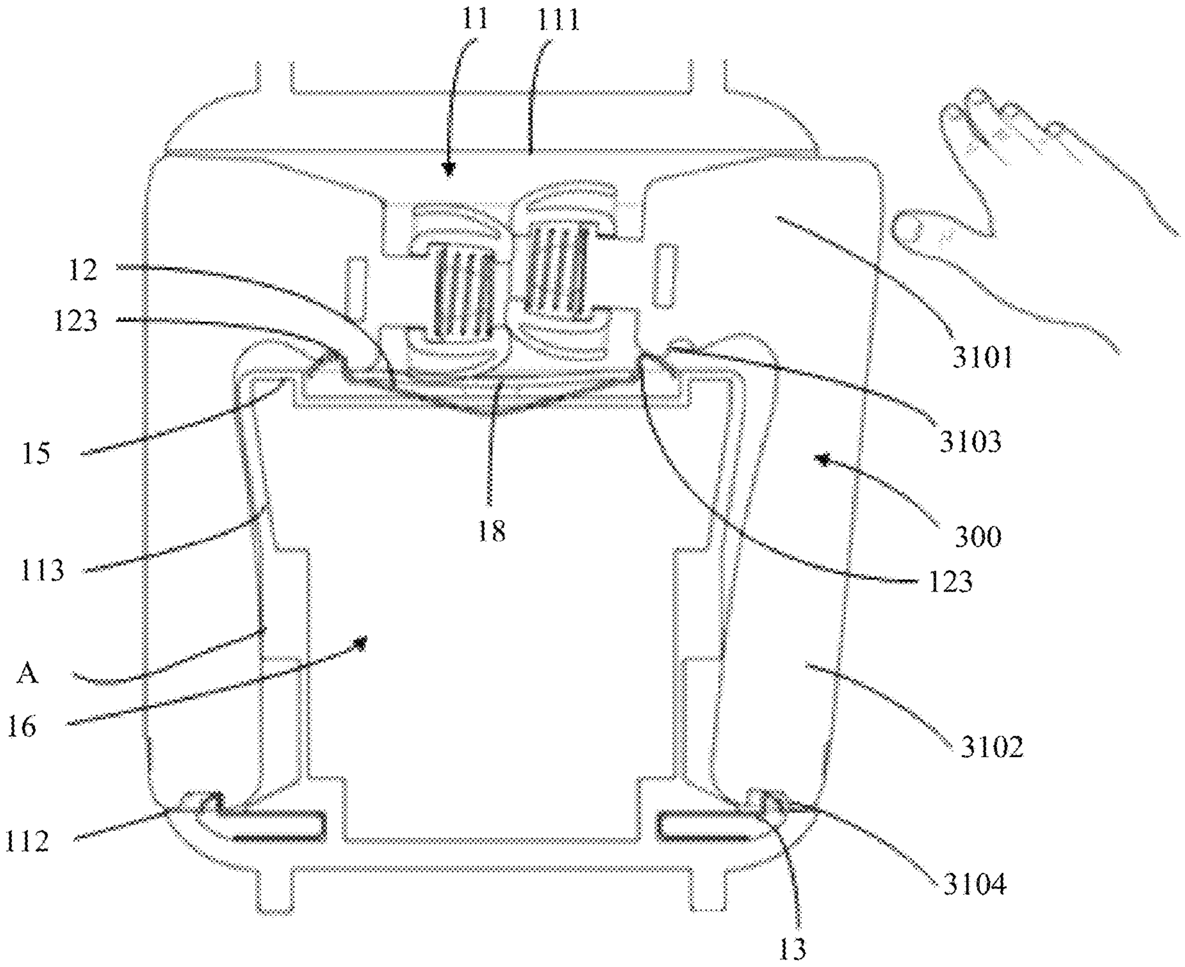
FIG. 7 is a schematic diagram of an unlocking state of a Bluetooth headset and the main body of the watch shown in FIG. 6.

FIG. 6 is a schematic diagram of an internal structure of the main body of the watch 10 in a second implementation of this embodiment, and the Bluetooth headset is firmly locked in the main body of the watch. FIG. 7 is a diagram of an unlocking state of the Bluetooth headset and the main body of the watch shown in FIG. 6, different from the foregoing implementation, in this implementation, the two elastic bodies 12 are located in first areas 114 of the two accommodating slots 11 and are fastened to the stopping wall 15 opposite to the first wall 111, and the elastic protrusion 123 of the elastic body 12 protrudes towards the first wall 111. The first fastening slot 3103 of the headset head portion 3101 is disposed on an outer surface of the headset head portion 3101 and faces towards the headset tail portion 3102. In other words, it may be understood that in the first implementation, the first fastening slot 3103 is fastened above the headset head portion 3101, and in this implementation, the first fastening slot 3103 is fastened below the headset head portion 3101. The support board 17 is disposed on the spacer 15, the connection end of the elastic body 12 is fastened to the stopping wall 15, the end portion of the support board 17 supports an abutting position of the elastic body 12, and the free end of the elastic body 12 extends to the first wall 111.

In another embodiment, the two elastic bodies 12 are independent elements that are respectively fastened to the first areas 114 of the two accommodating slots 11, each elastic fastening body 12 may be formed by bending an end portion of an independent metal elastic piece, one end of the metal elastic piece is fastened to the accommodating slot 11, and the end portion that is provided with the elastic fastening body 12 is disposed in a suspended manner. Certainly, a form of the elastic fastening body 12 is not limited to forms that are listed in this embodiment provided that the elastic fastening body 12 that is fastened to and is unlocked with the first fastening slot 3103 may be implemented. In this embodiment, the Bluetooth headset 300 is accommodated in the main body of the watch 10 and is located by coordinating the first locking component with the second locking component, that is, the Bluetooth headset 300 is fastened in the main body of the watch 10 by fastening the first fastening slot 3103 to the elastic fastening body 12, and fastening the second fastening slot 3104 to the elastic fastener 13. Due to this design, appearance of the watch is clean and has good integrity, and a structure of the first locking component and the second locking component is simple and highly reliable. The Bluetooth headset 300 can be accommodated in the main body of the watch 10 in an idle state, and can be quickly removed for use. This operation is convenient, it is not easy to lose the Bluetooth headset 300, and the user has good experience.

In a second embodiment of this application, the wearable device is a smartwatch, and the bearing body is the main body of the watch. There are two Bluetooth headsets and two accommodating slots, each Bluetooth headset includes a headset head portion and a headset tail portion, and each accommodating slot includes a bottom wall that is opposite to an opening of the accommodating slot. The headset head portion includes a head portion base and an earbud body that is slidably installed on the head portion base, a column is disposed at an end of the earbud body, and two opposite ends of the elastic body are separately connected between the head portion base and the earbud body. After the Bluetooth headset is locked in the accommodating slot, the earbud body abuts against the bottom wall, the elastic body is pre-compressed, and the Bluetooth headset is pressed from the outside of the accommodating slot, so that the first locking component and the second locking component are unlocked, and the Bluetooth headset is pushed out by using elasticity of the elastic body. In other words, the operation portion is the headset head portion on which the elastic body is disposed.

Figure 8:
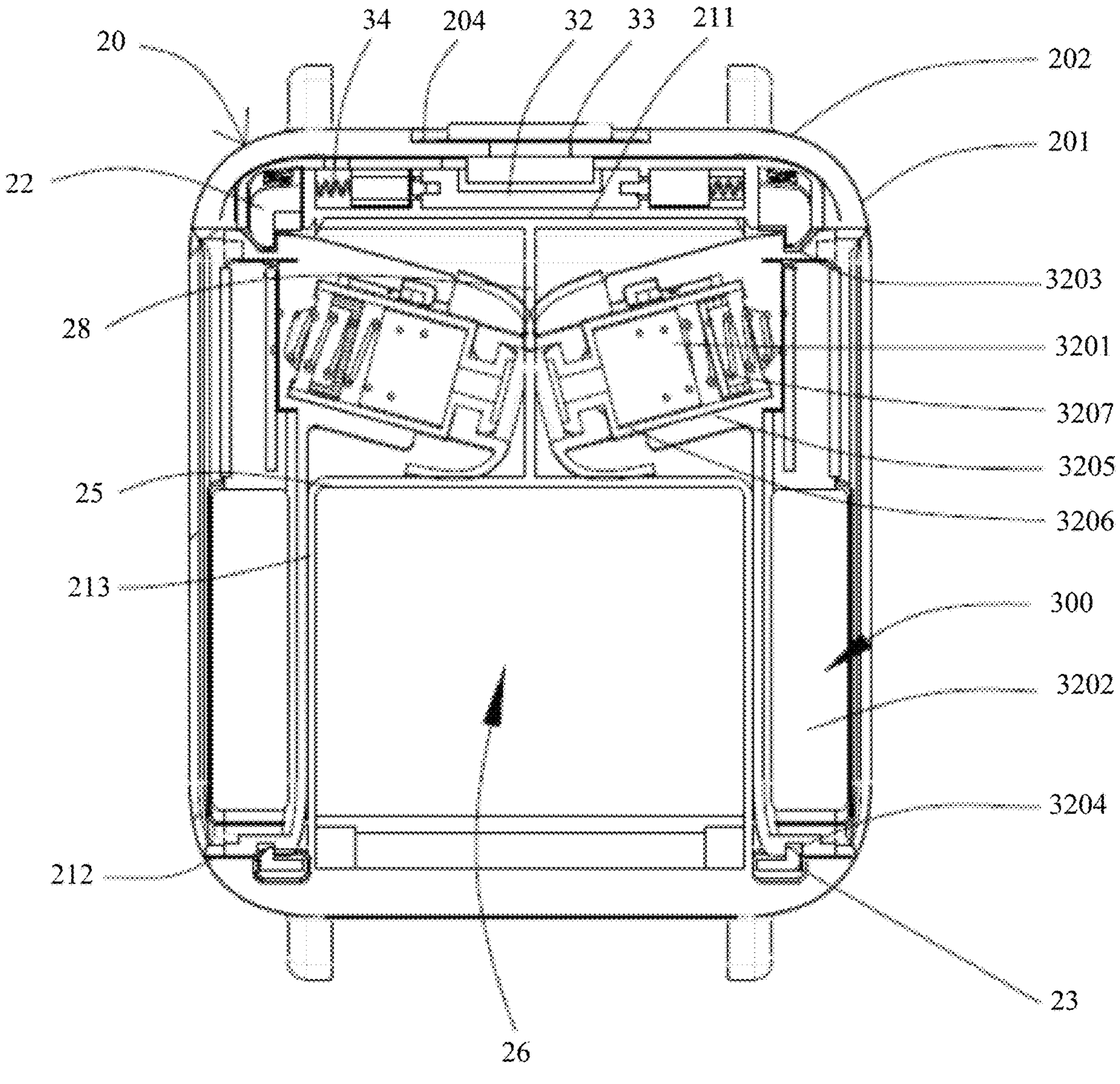
FIG. 8 is a schematic diagram of a smartwatch of a second embodiment in this application, where a Bluetooth headset and a main body of the watch are in a locking state.
Figure 13:
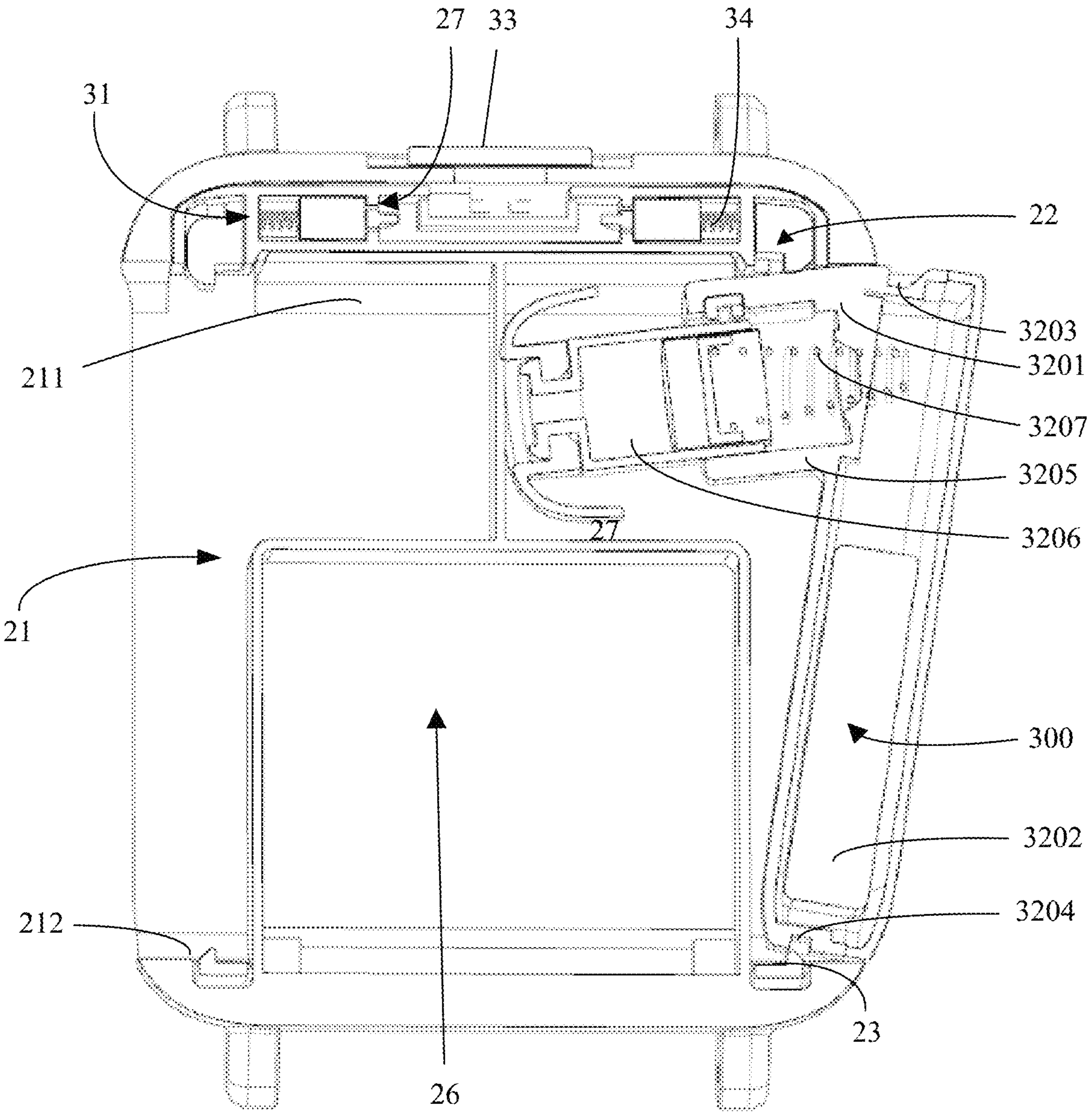
FIG. 13 is a schematic diagram of an unlocking state of the Bluetooth headset and the main body of the smartwatch shown in FIG. 8.

Specifically, referring to FIG. 8 and FIG. 13, FIG. 8 is a schematic diagram of an internal structure of the main body of the watch in this embodiment. A driving component and the Bluetooth headset are included, and the second locking component is a part of the driving component. The Bluetooth headset 300 includes a headset head portion 3201 configured to transfer a sound and a headset tail portion 3202 disposed opposite to the headset head portion 3201, and a body of the headset is between the headset head portion 3201 and the headset tail portion 3202. The first locking component includes a first fastening slot 3203 that is disposed on the headset head portion 3201 and a second fastening slot 3204 that is disposed on the headset tail portion 3202. Accommodating slots 21 that accommodate two Bluetooth headsets 300 and that are towards the main body of the watch are recessed on two opposite sides of the main body of the watch 10.

FIG. 13 is a schematic diagram of an internal structure of the smart mobile phone in this embodiment, and only one headset that is started is included. This implementation is described on a premise of without the sliding portion in FIG. 8. An elastic body 3207 is disposed on the headset head portion 3201, the headset head portion 3201 includes a head portion base 3205 and an earbud body 3206 that is slidably installed on the head portion base 3205, the head portion base 3205 is located at an end of a body of the Bluetooth headset 300 and protrudes from the body of the headset. The earbud body 3206 is a part that is put in an ear of the user. A column is disposed at an end of the earbud body 3206. The column is a partially connected to the head portion base 3205, the column is slidably installed in the head portion base 3205, and the elastic body 3207 is sheathed on the column. The elastic body 3207 is a coil spring, and two opposite ends of the elastic body 3207 are separately connected between the head portion base 3205 and the earbud body 3206. The earbud body 3206 slides relative to the head portion base 3205, and may compress the elastic body 3207. In a normal state, the elastic body 3207 is in a free extending state.

When the Bluetooth headset 300 is accommodated in the accommodating slot 21, the headset head portion 3201 and the headset tail portion 3202 may both be pushed into the accommodating slot 21. The headset head portion 3201 abuts against the bottom wall of accommodating slot 21. The elastic body 3207 in the headset head portion 3201 is pre-compressed, and the first locking component is locked with the second locking component. When the Bluetooth headset 300 needs to be removed, the Bluetooth headset 300 is pushed from an outer side that is of the Bluetooth headset 300 and that protrudes from the accommodating slot 21, and the earbud body 3206 slides relative to the head portion base 3205 and compresses a spring, so that the first locking component is unlocked with the second locking component. Then, the Bluetooth headset 300 is released, the elastic body 3027 recovers elasticity to push the Bluetooth headset 300 out of the accommodating slot 21. This structure may enhance convenience for removing the headset.

When the Bluetooth headset is removed from the main body of the watch, the spring 3207 is in an elastic free state, so that a length of the entire head portion of the Bluetooth headset is increased, the Bluetooth headset has an enough length to extend into an ear of the user, and stability and comfort of wearing the Bluetooth headset are ensured.

Furthermore, a contact position is disposed on an inner surface that is of the headset tail portion 3202 and that faces towards the accommodating slot, a pressing end is disposed on the headset tail portion 3202, a support position that abuts against the contact position is disposed on the bottom wall of the accommodating slot 21, the support position is used as a fulcrum for the Bluetooth headset 300, and the pressing end of the Bluetooth headset 300 is pressed from the outside of the accommodating slot 21, so that the first locking component is unlocked with the second locking component. Setting the fulcrum to implement that the head portion 3201 of the Bluetooth headset first moves out, in coordination with the elastic body 3207, the Bluetooth headset 300 may be more smoothly pushed out of the accommodating slot 21, and the Bluetooth headset 300 may be quickly removed, to save use time of the user.

Figure 9:
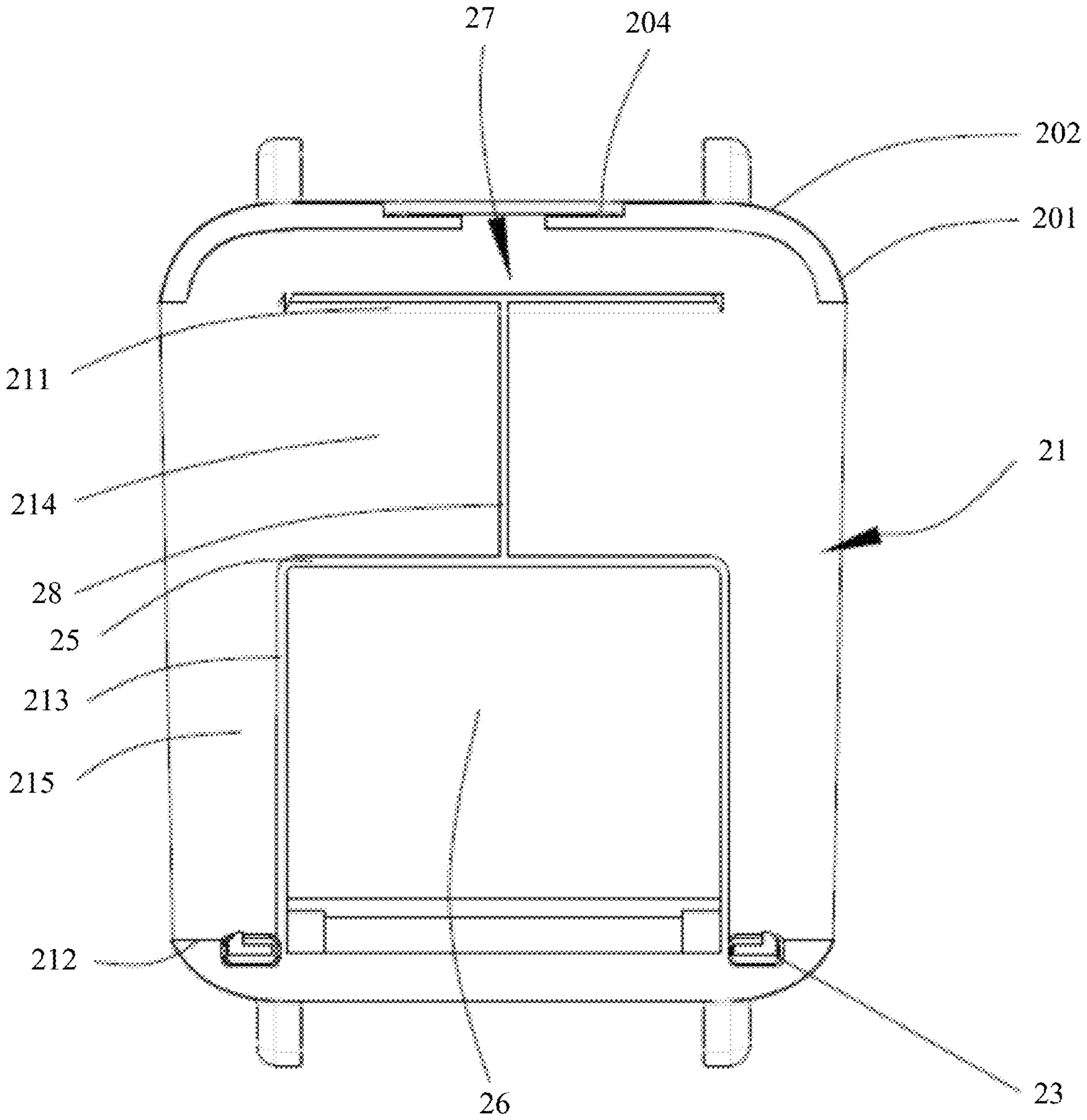
FIG. 9 is a schematic diagram of an internal structure of the main body of the smartwatch shown in FIG. 8.

Referring to FIG. 9, FIG. 9 is a schematic structural diagram of the main body of the watch without the Bluetooth headset and the driving component shown in FIG. 8. A structure of the main body of the watch 20 is generally similar to a structure of the main body of the watch in the first embodiment, and a difference is that space used to install a sliding portion is provided in the main body of the watch 20. The main body of the watch 20 includes a back housing (not shown in the figure), two opposite side portions 201 that are disposed on the back housing (not shown in the figure), and two opposite end portions 202 that are connected to the two side portions 201. The back housing (not shown in the figure), the end portions 202, and the side portions 101 enclose a dial of the watch having accommodating space. The display screen is installed on the main body of the watch 20, is opposite to the back housing (not shown in the figure), and contacts the end portions 202 and the side portions 201, to cover the accommodating space. The display screen, the main body of the watch, various devices that implement functions of the watch, such as a circuit board, and the main body of the watch form a dial 100 of the watch. The watch band 200 is connected to the outside of the two end portions 202.

The accommodating space of the main body of the watch 20 includes a storage cavity 26, an installation cavity 27, and the two accommodating slots 21. The installation cavity 27 and the storage cavity 26 are separated using the accommodating slots 21. The accommodating slot 21 is configured to accommodate the Bluetooth headset 300, the installation cavity 27 is configured to install a sliding portion 30 and an elastic fastening body 22, and the storage cavity 26 is configured to accommodate various devices that implement functions of the watch, such as the circuit board. Certainly, the various devices that implement the functions of the watch, such as the circuit board, and the display screen may be integrally formed and then installed on the main body of the watch 20. The storage cavity 26 is separated from the accommodating slot 21 by using a stopping wall 25 and is an independent area. The installation cavity 27 and the accommodating slot 21 are spaced apart by using walls of the accommodating slot 21. The two side walls 202 are located on two opposite sides of the display screen (not shown in the figure). The two accommodating slots 21 are respectively recessed in the two side portions 202. When the Bluetooth headset 300 is accommodated in the accommodating slot 21, the Bluetooth headset 300 exactly fills an opening of the accommodating slot 21, to ensure integrity of appearance of the watch.

In this embodiment, the accommodating slot 21 that is towards the inside of the main body of the watch 20 is recessed in the side portion 201. The storage cavity 26 is located between the two accommodating slots, and faces away from openings of the accommodating slots. Each accommodating slot 21 includes a first wall 211, a second wall 212 that is disposed opposite to the first wall 211, and the bottom wall (not shown in the figure) that faces towards the openings of the accommodating slots 21 and that is located between the first wall 211 and the second wall 212. The Bluetooth headset 300 is accommodated in the accommodating slot 21 and is located between the first wall 211 and the second wall 212. In this embodiment, it can be learned from a sectional view in parallel with a direction of the display screen, the accommodating slot 21 is shaped as the bottom wall includes a bottom wall section 213 and a spacer 28 that is disposed in parallel with and offset from the bottom wall section 213. The spacer 28 spaces the two accommodating slots 11. The stopping wall 25 is connected between the bottom wall section 213 and the spacer 28, the stopping wall 25 is a part of a wall body of the storage cavity, and the spacer 28 is connected to the two first walls 111 and is connected to stopping walls 25. The Bluetooth headset 300 is accommodated in the accommodating slot 21, and is located between the first wall 211 and the second wall 212. The spacer 28 divides the first areas that accommodate headset head portions 3101 and that are between the two first walls 111 and the stopping walls 15 into two sections, respectively configured to accommodate two headset head portions. Other parts of the accommodating slot 21 accommodate other parts of the Bluetooth headset 300. It may be understood that each accommodating slot 21 includes the first area that accommodates the headset head portion 3201 and the second area that accommodates the other parts of the Bluetooth headset 300, the two first areas are connected and located between the installation cavity and the storage cavity, and second areas are located on two opposite sides of the storage cavity.

Figure 10:
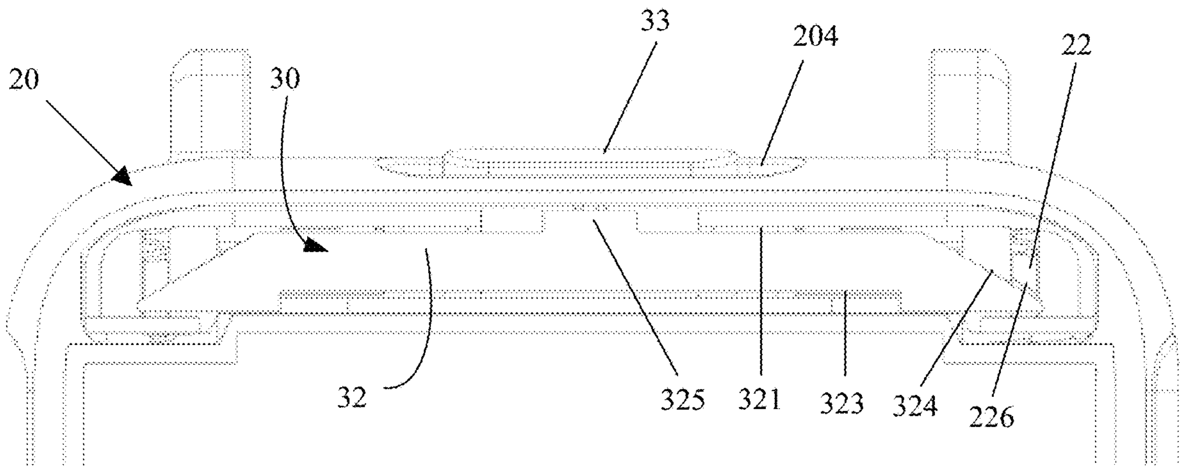
FIG. 10 is a partially enlarged view of an internal structure of a driving component of the smartwatch shown in FIG. 8.
Figure 11A:
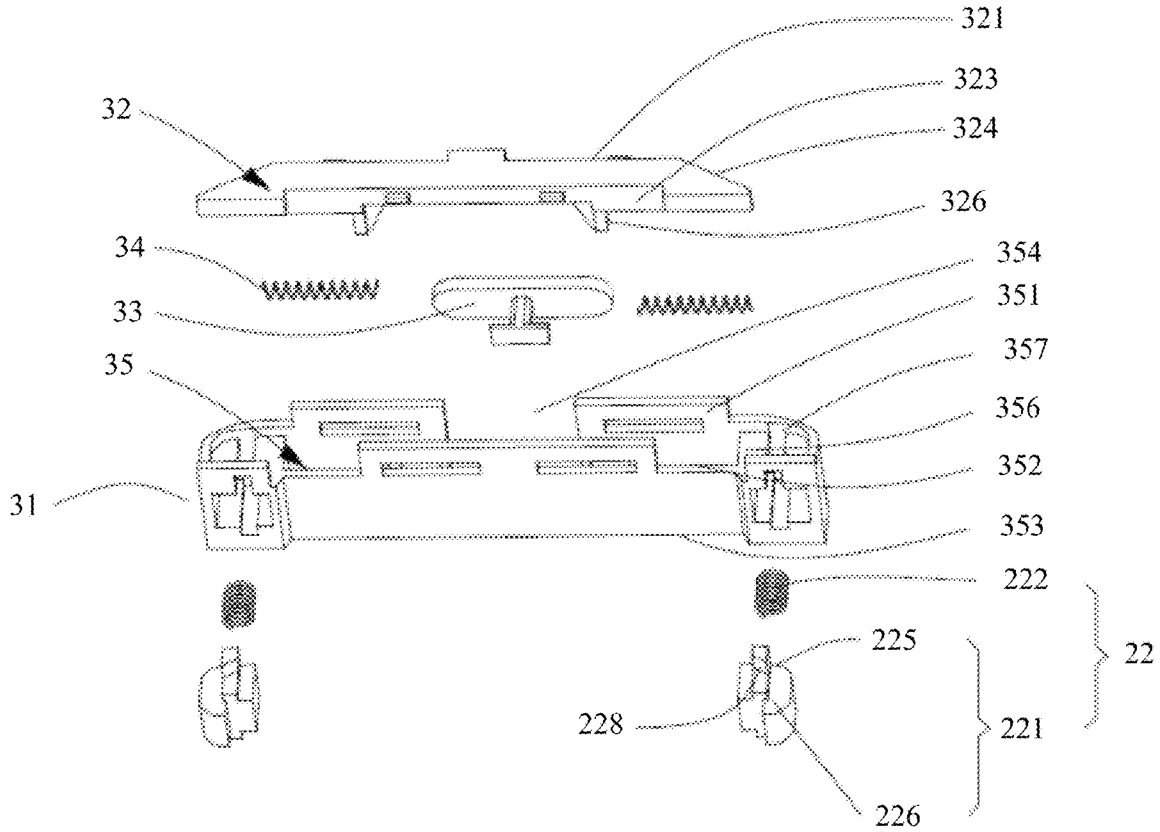
FIG. 11*a* and FIG. 11*b* are schematic structural diagrams of the driving component shown in FIG. 8 from different angles.
Figure 11B:
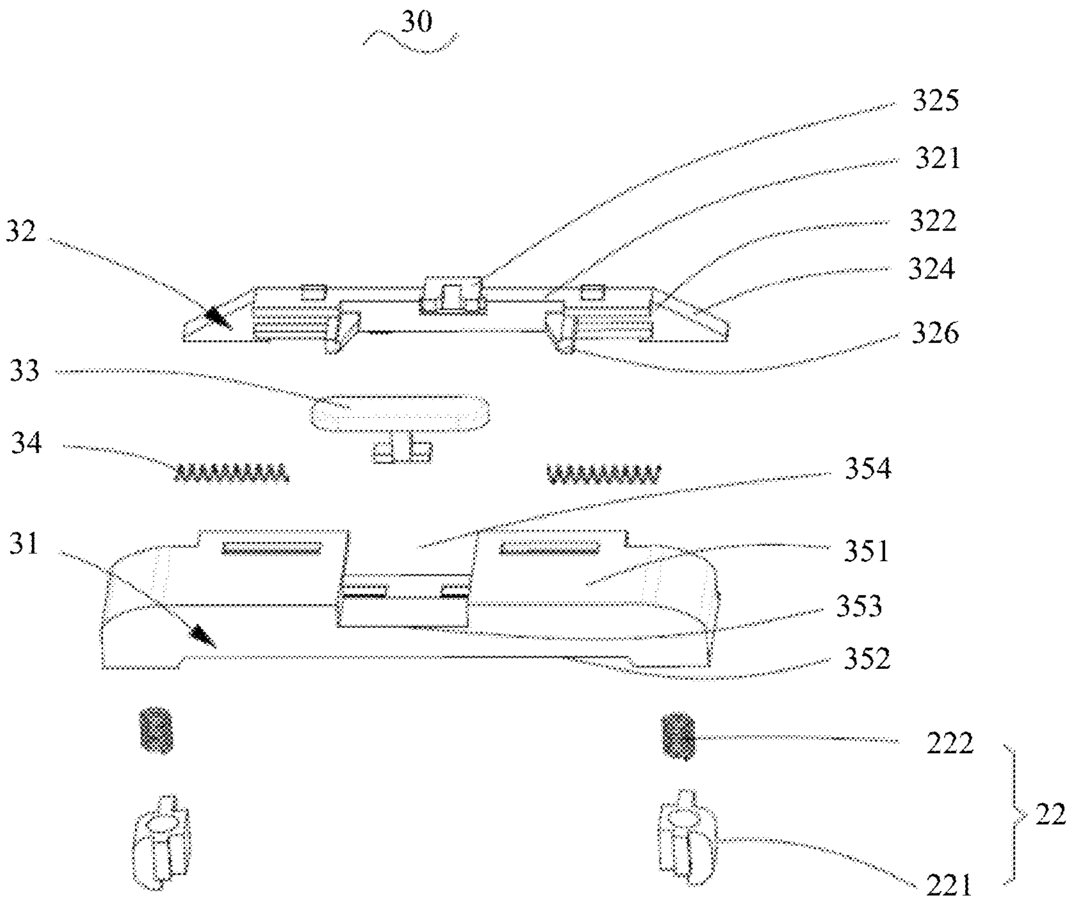

In an implementation of this embodiment, referring to FIG. 8, FIG. 10, FIG. 11*a*, and FIG. 11*b*, FIG. 10 is a partially enlarged view of an internal structure of the smartwatch including the driving component in this embodiment; and FIG. 11*a* and FIG. 11*b* are schematic exploded views of the driving component from different angles.

The driving component includes a sliding portion 30 and the second locking component, the sliding portion 30 includes two opposite sliding directions, the two sliding directions are the same as directions in which the two Bluetooth headsets 300 are pushed out of the accommodating slots 21, the Bluetooth headset 30 is fastened in the accommodating slot 211 by fastening the first locking component to the second locking component, and when the sliding portion 30 is driven to slide in a sliding direction, the second locking component is driven to be unlocked with the Bluetooth headset 300 in the sliding direction.

The second locking component includes two elastic fastening bodies 22 and two elastic fasteners 23 that contact the sliding portion 30. The elastic fastening bodies 22 and the elastic fasteners 23 are located opposite to each other. The two elastic fastening bodies 22 are respectively located in the two sliding directions of the sliding portion 30. The sliding portion 30 is configured to drive the elastic fastening bodies 22 to move, so that the elastic fastening bodies 22 are fastened or reset.

In this embodiment, the sliding portion 30 and the two elastic fastening bodies 22 are disposed in the installation cavity 27 of the main body of the watch, the two elastic fastening bodies 22 are respectively located in the two sliding directions of the sliding portion 30, and the two elastic fastening bodies 22 respectively extend into the corresponding accommodating slots 21 through the two first walls 211. A first sliding slot 204 is disposed at an end portion 203 of the main body of the watch 20, and the first sliding slot 204 threads through the installation cavity 27.

As shown in FIG. 11*a* and FIG. 11*b*, the sliding portion 30 includes a base 31, a sliding slot 35 that is disposed on the base 31, a sliding block 32 that is installed on the base 31, a toggle key 33 that is installed in the sliding block 32, and two return springs 34. The elastic fastening body 22 elastically abuts against the sliding block 32, is installed in the base 31, and extends out of the base 31. The toggle key 33 protrudes from the main body of the watch 20 through the first sliding slot 204. The base 31 is installed in the installation cavity 27, and the sliding slot is disposed on the base 31. It may be understood that the base 31 may be considered as a part of the main body of the watch and integrally formed with the main body of the watch, that is, a position located in the installation cavity 27 is directly provided with the sliding slot and various elements that are located in the sliding slot.

Figure 11C:
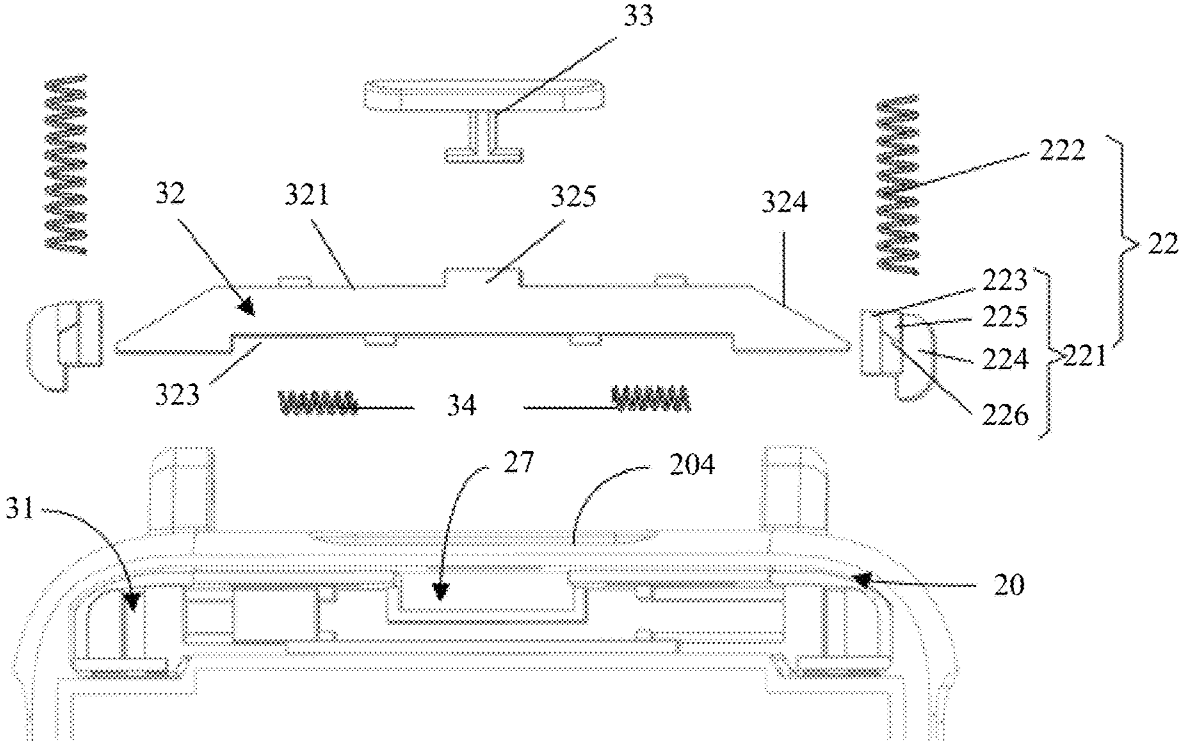
FIG. 11*c* is a schematic diagram in which a base of the driving component is installed in the main body of the watch shown in FIG. 11*b;*

Referring to in FIG. 11*c*, FIG. 11*c* is a schematic diagram in which the base 31 of the driving component is installed in the main body of the watch shown in FIG. 11*b*. The base 31 is a hollow strip-shaped block, and a surface of the base 31 is recessed in the inside of the base to form the sliding slot 35. The sliding slot 35 includes the first side wall 351 and the second side wall 352 that are disposed opposite to each other and a third side wall 353 that is connected to the first side wall 351 and the second side wall 352. A second sliding slot 354 is disposed in a position that is of the first side wall 351 and that corresponds to the first sliding slot 204. The base 31 is installed in the installation cavity 27, the second sliding slot 354 and the first sliding slot 204 are opposite to each other and are in communication with a middle position, in which the toggle key 33 is assembled, of the sliding block 32. The second sliding slot 354 and the first sliding slot 204 protrude from the main body of the watch, to facilitate a sliding operation of the sliding block 32.

Through holes 355 in communication with the outside are disposed on two opposite ends of the second side wall 352, so that the elastic fastening bodies 22 pass through the through holes 355. A stopping position 357 is disposed in a position that is opposite to the through hole 355 and that is on a surface of the first side wall 351 in the sliding slot 35. Two first stopping blocks 356 that are spaced apart are convexly disposed on a surface of the third side wall 353 in the sliding slot 35. The first stopping blocks 356 are respectively located on two opposite sides of the toggle key 33.

The sliding block 32 is long-strip-shaped. The sliding block 32 includes a first surface 321, a second surface 322, and a third surface 323 that is disposed opposite to the first surface 321. The second surface 322 is connected to the first surface 321 and the third surface 323. The sliding block 32 further includes two ends that are connected to the first surface 321, the second surface 322, and the third surface 323, that is, a first end and a second end. End faces of the first end and the second end are first abutting bevels 324. The two first abutting bevels 324 tilt towards the first surface 321. An installation body 325 of the toggle key is disposed on the first surface 321, and is configured to install the toggle key 33. Certainly, the toggle key 33 and the installation body 325 of the toggle key may be integrated, that is, the toggle key 33 and the sliding block 32 are integrally formed. Two spaced-apart second stopping blocks 326 are disposed on the second surface 322, orthographic projection of the installation body 325 of the toggle key is located between the two second stopping blocks 326. Specifically, the two second stopping blocks 326 are symmetrically disposed on the second surface 322 of the sliding block 32. The return spring 34 is a coil spring, an end of the return spring 34 and the second stopping block 326 are fastened to each other, and two return springs 34 are located on two opposite surfaces of the two second stopping blocks 326.

The sliding block 32 is installed in the sliding slot 35. The first surface 321 and the first side wall 351 are opposite to each other. The toggle key 33 protrudes from the second sliding slot 354. Two ends of the return spring 34 respectively abut against the second stopping block 326 and the first stopping block 356 of the third side wall 353 of the sliding slot 35. In a normal state, the toggle key 33 is located in the middle of the first sliding slot 204, the two return springs 34 are in natural states, and the sliding block 32 slides in the sliding slot 35 and may compress the return spring 34 that is located in the sliding direction. The return spring 34 provides return elasticity to the sliding block that has slid. The two sliding directions of the sliding block 32 include sliding to the first end and sliding to the second end, that is, a length direction of the sliding block 32. An extending direction or a compressing direction of the return spring 34 are in parallel with the two sliding directions of the sliding block 32. When the sliding block 32 slides to a headset on the left in the figure, the return spring 34 on the left in the two return springs 34 is compressed, and the return spring 34 on the right is extended. During sliding to left, the elastic fastening body 22 on the left is enabled to be unlocked with the Bluetooth headset 300 on the left. The return spring on the right returns to a normal state after external force is removed, and the sliding block is pulled to an original position. When the sliding block 32 slides to a headset on the right in the figure, the return spring 34 on the right in the two return springs 34 is compressed, and the return spring 34 on the left is extended. During sliding to the right, the elastic fastening body 22 on the right is enabled to be unlocked with the Bluetooth headset 300 on the right.

Referring to FIG. 8 and FIG. 11*b*, in this embodiment, each elastic fastening body 22 includes a fastener body 221 and a spring 222 that is located at an end of the fastener body. An end portion that is of the fastener body 221 and that is far away from the spring 222 is a fastener end that is fastened to the first fastening slot. Certainly, the spring 222 and the fastener body 221 may be considered as entirety. A second abutting bevel 228 is disposed on the fastener body 221, and is configured to abut against the first abutting bevel 324. The spring 222 is connected to the sliding slot 32 and an elasticity direction of the spring 222 is perpendicular to an elasticity direction of the return spring 34. The fastener body 221 partially protrudes from the sliding slot 32 and is fastened to the first fastening slot, and the spring 222 provides fastening force to the fastener body 221. Specifically, the fastener body 221 is a block, and the fastener body 221 includes a first end face 224 on which the spring 222 is installed and a fastener end that is disposed opposite to the first end face 224. A connection face 226 is disposed between the first end face 224 and the fastener end. An end of the spring 222 is connected to the first end face 224, the other end is configured to be connected to the stopping position 357 in the sliding slot 35. The fastener body 221 extends out of the base 31 through the through hole 355. The second abutting bevel 228 is formed on the connection face 226, and specifically, a protrusion is formed on the connection face. A side face of the protrusion forms the second abutting bevel 228. Certainly, the protrusion and the fastener body are an integrated structure.

Still referring to FIG. 10, the elastic fastening bodies 22 are installed on two ends in the sliding slot 35 that are located on the sliding blocks 32 and that are provided with the first abutting bevels 324, that is, the elastic fastening bodies 22 are respectively located on the first end and the second end of the sliding block 32. The second abutting bevel 228 abuts against the first abutting bevel 324 of the sliding block 32. The fastener end of the fastener body 221 extends out of the second surface 322 of the sliding block 32 through the through hole 355. The springs 22 of the two elastic fastening bodies 22 are connected to the stopping position 357 in the sliding slot 35, to limit the elastic fastening bodies 22 in the sliding slot 35. In a normal state, the springs 222 are in natural elastic states, and the return springs 34 are in natural states. In this case, moving directions of the elastic fastening body 22 are perpendicular to the sliding directions of the sliding block 32, that is, elasticity directions of the return springs 34 are perpendicular to elasticity directions of the spring 22. It may be understood that an independent area and fastening position may be disposed on two ends of the sliding block 32 that is located in the sliding slot 35, to accommodate and limit the elastic fastening bodies 22. The base 31 is installed in the installation cavity 27, the toggle key 33 is accommodated in the first sliding slot 204 and may slide in the first sliding slot 204, and the sliding block 32 may slide in the base 31. The fastener body 221 of the elastic fastening body 22 protrudes from the through hole 355 and extends into the accommodating slot. The two elastic fastening bodies 22 partially extend out of the sliding slot 35 and are elastically fastened to the first fastening slot 3103. When the toggle key 33 is pushed to drive the sliding block 32 to slide in a sliding direction to the first end or the second end, the first abutting bevel 324 located in the direction slides relative to the second abutting bevel 228 to produce pushing force to push the elastic fastening body 22 to axially move to the through hole 355. Therefore, the spring 222 is compressed, to enable the fastener body 221 to retract from the through hole 355 and to be unlocked with the first fastening slot 3103.

A back housing of the main body of the watch 20 includes an installation hole that is in communication with the accommodating slot 21, the elastic fastener is disposed on a carrier, the carrier includes a seal board and an elastic arm that is located on an inner surface of the seal board and that extends far away from the seal board, the elastic fastener is disposed on the elastic arm, the elastic arm extends into the accommodating slot through the installation hole and contacts the second wall, and the seal board is installed on a back cover to cover the installation hole.

Figure 12:
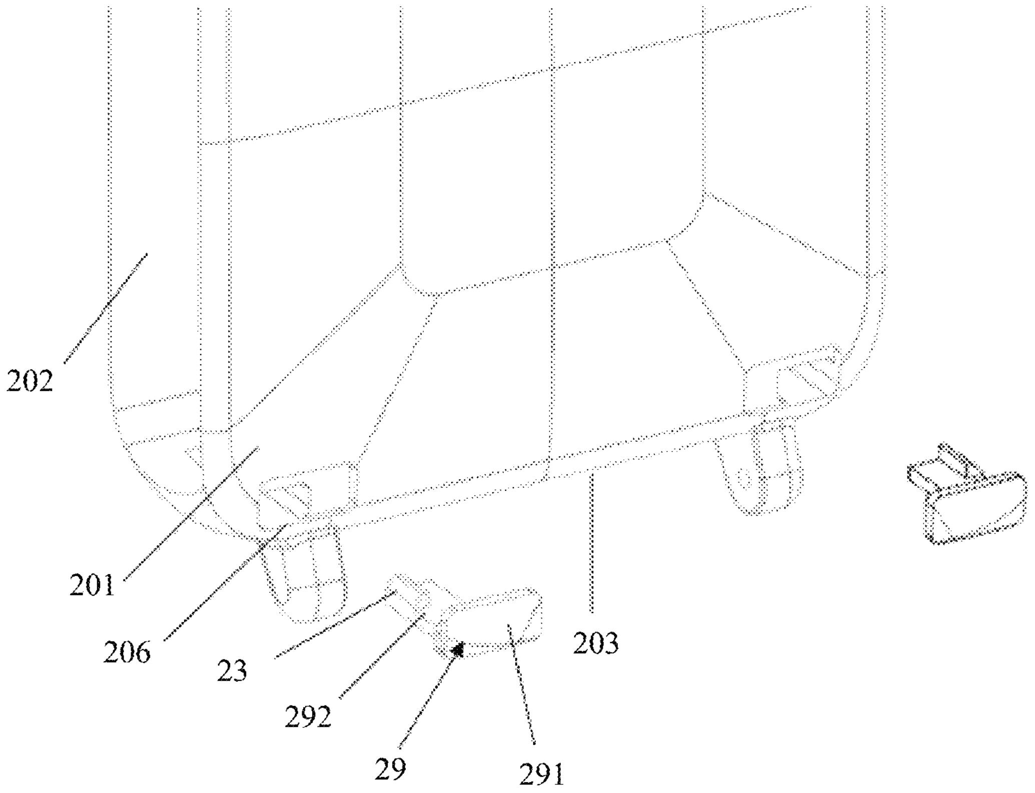
FIG. 12 is a schematic structural diagram of an elastic fastener of the smartwatch shown in FIG. 8 in an implementation.

In this embodiment, referring to FIG. 8 and FIG. 12, FIG. 12 is a schematic exploded view of the elastic fastener and the main body of the watch in this embodiment. The elastic fastener 23 is convexly disposed on the second wall 212 of the accommodating slot 21 and faces towards a fastener 223 of the elastic fastening body 22. A bevel 231 is disposed at an end portion of the elastic fastener 23, to help the second fastening slot 3204 be fastened and unlocked. As shown in FIG. 12, in another implementation, the elastic fastener 23 is an independent element, and is disposed on a carrier 29 that is shaped as L. Specifically, the carrier 29 includes a seal board 291 and an elastic arm 292 that is connected to a surface of the seal board 291 and that extends far away from the seal board. The elastic fastener 23 is convexly disposed on the elastic arm 292, and correspondingly, two installation holes 205 towards the inside of the main body of the watch 20 are recessed in the outside of the back housing 201 of the main body of the watch 20. The installation holes 205 are arranged in parallel on another side opposite to the elastic fastening body 22, and thread through the accommodating slot 21. The carrier 29 is detachably inserted in the installation hole 205. The seal board 291 is connected to the back housing 201 to encapsulate the installation hole 205. The elastic fastener 23 is located in the installation hole 205, extends into the accommodating slot 21, and protrudes towards the fastener 223 of the elastic fastening body 22.

Referring to FIG. 13, in this embodiment, when the Bluetooth headset 300 is accommodated in the accommodating slot 21, the Bluetooth headset 300 is pushed from the opening of the accommodating slot 21, and the headset is accommodated in the accommodating slot 21. Both of the headset head portion 3201 and the headset tail portion 3202 may be pushed into the accommodating slot 21 by using pushing force. The elastic fastener 23 is fastened to the second fastening slot 3204, the fastener body 221 of the elastic fastening body 22 is fastened to the first fastening slot 3203, and elasticity of a spring of the elastic fastening body 22 locks the elastic fastening body 22 with the first fastening slot 3203. In this case, the Bluetooth headset 300 is accommodated and is located in the main body of the watch 20, the return spring 34 is in a natural elastic state, and the spring 222 is in a free state or a semi-compressed state. When the Bluetooth headset needs to be removed, the toggle key 33 is toggled to slide to the Bluetooth headset 300 in the first sliding slot 204, to drive the sliding block 32 to slide to the same direction in the base 31. The return spring 34 located in the direction is compressed by the first stopping block 356 and the second stopping block 326. The first abutting bevel 324 of the sliding block 32 pushes the second abutting bevel 228 of the fastener 223. In this case, the first abutting bevel 324 pushes the second abutting bevel 228 to produce friction and drive the elastic fastening body 22 to move to the through hole 355. Therefore, the elastic fastening body 22 is driven to compress the spring 222, the first fastening slot 3203 is enabled to be removed from the elastic fastening body 22 and to be unlocked, and the Bluetooth headset 300 may be removed. When the headset is removed, the second fastening slot is unlocked with the elastic fastener.

Furthermore, on a premise that the operation portion is not disposed, the driving component in this implementation further includes an ejecting portion, and when the first fastening slot is unlocked with the elastic fastening body, the ejecting portion ejects the Bluetooth headset from the accommodating slot. In an embodiment, the ejecting portion includes a first magnet that is disposed in the Bluetooth headset 300 and a second magnet that is disposed in the accommodating slot 21 and that is opposite to the first magnet, and the first magnet and the second magnet are magnetically repulsive to each other. When the elastic fastening body 22 is unlocked with the first fastening slot 3103, repulsive magnetic force between the first magnet and the second magnet shown in the figure is produced, to push the Bluetooth headset 300 out of the accommodating slot 21, helping remove the headset.

In a first implementation of this embodiment, when the driving component is disposed in the smartwatch, the toggle key 33 is toggled to slide to the Bluetooth headset 300 in the first sliding slot 204, to drive the sliding block 32 to slide in the same direction in the base 31. The return spring 34 is compressed by the first stopping block 356 and the second stopping block 326. The first abutting bevel 324 of the sliding block 32 pushes the second abutting bevel 228. In this case, the first abutting bevel 324 pushes the second abutting bevel 228 to produce friction to drive the elastic fastening body 22 to move to the through hole 355, and the fastener body 221 is driven to compress the spring 222 and to be unlocked with the first fastening slot 3203 of the headset head portion 3201. In this case, the elastic body 3207 in the headset head portion 3201 is released, and elasticity produced by the elastic body 3207 pushes the headset head portion 3201 of the Bluetooth headset to move out of the accommodating slot 21, so that it is more convenient to remove the headset.

In this embodiment, the Bluetooth headset 300 is accommodated in the main body of the watch 20 and is located by coordinating the first locking component with the second locking component, that is, the Bluetooth headset 300 is fastened in the main body of the watch by fastening the elastic fastening body 22 that elastically contacts the sliding portion 30 to the first fastening slot 3203 and fastening the elastic fastener 23 to the second fastening slot 3204. The toggle key 33 of the sliding portion 30 protrudes from the main body of the watch 20, so that the Bluetooth headset 300 is released by toggling the toggle key 33, and the headset is quickly released in coordination with the ejecting portion, so that it is convenient to remove the headset and comfortable experience is provided to the user.

In another embodiment, the toggle key 33 and the first sliding slot 204 are canceled, a driving motor 36 is connected to the sliding block, the driving motor 36 is electrically connected to the wearable device, a flexible circuit board 3 is connected to the motor 36, and the flexible circuit board is connected to a circuit board of the wearable device, to provide power and a control instruction to the motor. The motor 36 may be enabled by using a screen of the watch, the motor 36 drives the sliding block 32 to slide in the sliding slot, to drive the elastic fastening body 22 to be unlocked with the first fastening slot 3203. Therefore, the Bluetooth headset 300 is unlocked with the main body of the watch 20. The motor 35 controls the sliding block 32 to unlock the elastic fastening body 22 and the headset, to implement full-automatic control.

Figure 14A:
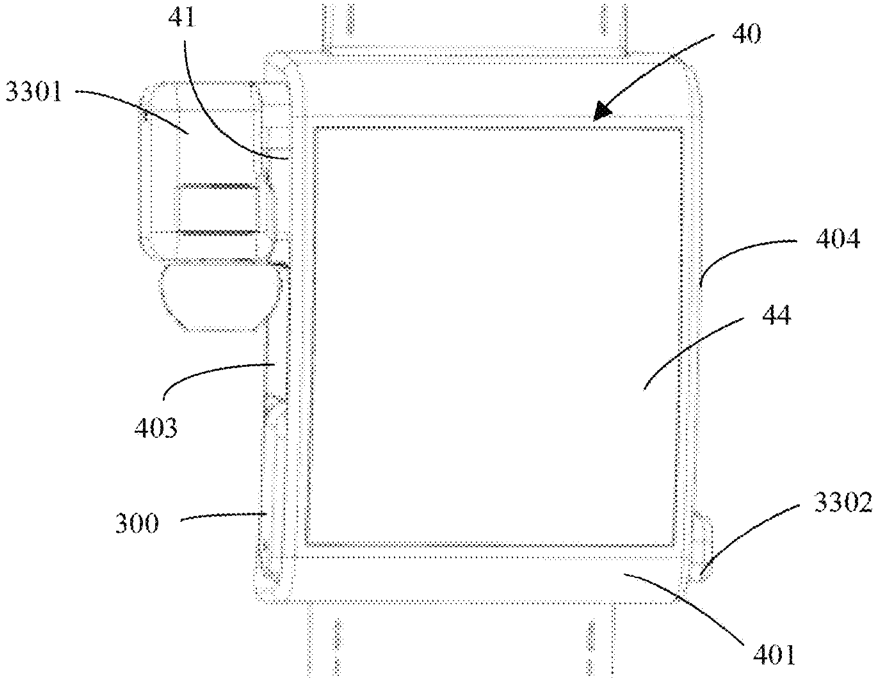
FIG. 14*a*, FIG. 14*b*, and FIG. 14*c* are schematic structural diagrams of a wearable device according to a third embodiment of this application from different angles.

In a third embodiment of this application, referring to FIG. 14*a*, FIG. 14*a* is a schematic structural diagram of the wearable device in this embodiment. One Bluetooth headset is in a state that the Bluetooth headset is unlocked and is pushed out of the main body of the watch, and the other headset is in a locking state. The wearable device is a smartwatch, and the bearing body is a main body of the watch 40. There are two Bluetooth headsets 300 in this embodiment, the Bluetooth headset 300 includes a headset head portion 3301 configured to transfer a sound and a headset tail portion 3302 disposed opposite to the headset head portion 3301, and a first locking component 3303 is disposed on the headset head portion 3301. The main body of the watch 40 includes two opposite side portions, two accommodating slots 41 towards the inside of the main body of the watch 40 are recessed in the side portion, the second locking component is disposed in each accommodating slot 41, each accommodating slot 41 includes an opening and a through hole 43 that is disposed opposite to the opening and that is in communication with the opening, and the opening of the accommodating slot and the through hole 43 are respectively located on the two side portions. The Bluetooth headset 300 is accommodated in the accommodating slot 41 and the headset head portion 3301 encapsulates the opening of the accommodating slot 41, the headset tail portion 3302 protrudes from a side portion of the main body of the watch 40 through the through hole 43, the Bluetooth headset 300 is locked in the accommodating slot 41 by coordinating the first locking component with the second locking component, and the headset tail portion 3302 is pushed into the main body of the watch 40, so that the first locking component is unlocked with the second locking component and the headset head portion 3301 extends out of the accommodating slot 41.

Specifically, the side portions are respectively a first side portion 403 and a second side portion 404 that is disposed opposite to the first side portion 403. In this implementation, openings of the two accommodating slots are located on the same side portion, that is, the two adjacent accommodating slots 41 towards the inside of the main body of the watch 40 are recessed in the first side portion 403, a through hole 43 corresponding to each accommodating slot 41 is disposed on the second side portion 404, and the through hole 43 is in communication with the corresponding accommodating slot 41.

The Bluetooth headset 300 is accommodated in the accommodating slot 41 and the headset head portion 3301 encapsulates the opening of the accommodating slot 41, the headset tail portion 3302 protrudes from the second side portion 404 of the main body of the watch 40 through the through hole 43, the Bluetooth headset 300 is locked in the accommodating slot 41 by coordinating the first locking component 3303 with the second locking component, and by pushing the headset tail portion 3302, the first locking component 3303 may be unlocked with the second locking component 42, and the headset head portion 3301 extends out of the accommodating slot 41. Furthermore, the headset head portion 3301 includes a top face that faces away from the headset tail portion 3302, and the top face is coplanar with a surface of the first side portion 403, so that the main body of the watch 40 can have an entire outer surface and it is ensured that appearance of the watch is elegant.

Furthermore, the headset tail portion 3302 protrudes from the second side portion 404 of the main body of the watch 40; or an end face of the headset tail portion 3302 is coplanar with a surface of the second side portion 404. FIG. 14*c* is a schematic diagram in which the Bluetooth headset is fully locked in the main body of the watch. In this embodiment, the headset tail portion 3302 is an end face that protrudes from the second side portion 404 and that pushes the headset tail portion 3302 from the second side portion 404, that is, the Bluetooth headset 300 may be pushed out of the accommodating slot 41, to pull the headset out and remove the headset.

Figure 14B:
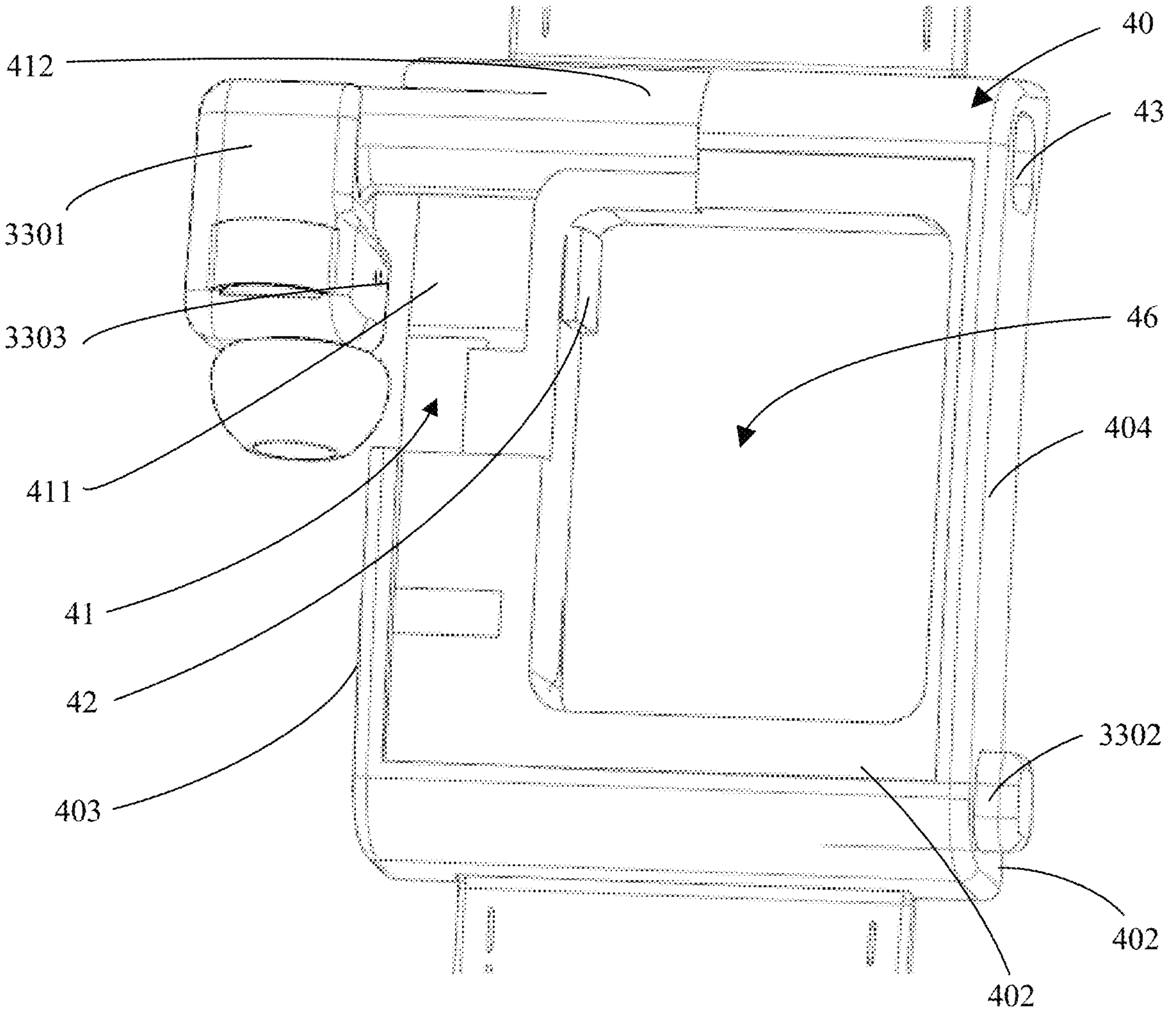
Figure 14C:
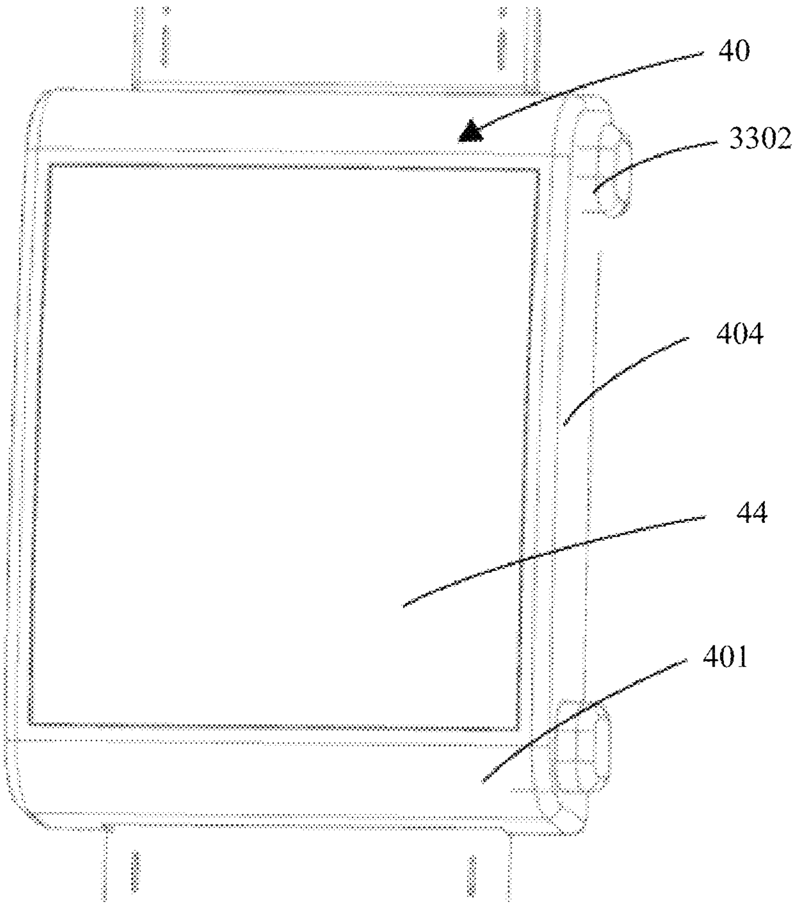

Further referring to FIG. 14*b*, FIG. 14*b* is a schematic structural diagram in which a back housing on the back face of the smartwatch shown in FIG. 14*a* is removed and a part of the accommodating slot 41 is exposed. In this embodiment, the first locking component 3303 is a magnet that is disposed in the Bluetooth headset 300, the second locking component 42 is a magnet that is disposed in the main body of the watch 40, and the two magnets are magnetically attractive to each other. Certainly, an external portion of the Bluetooth headset 300 is made of a metal material and may magnetically attract a magnet, so that a magnet in the Bluetooth headset may be omitted.

The accommodating slot 41 includes a first area 411 that accommodates the headset head portion 3302 and a second area 412 that is connected to the first area 411 and that is in communication with the through hole 43, the second area 412 extends to the second side portion 404 from the first area 411. Second areas 412 of the two accommodating slots 41 are spaced apart. First areas 411 of the two accommodating slots 41 are connected to each other, and the two first areas 411 may be in communication with each other, or may be not in communication with each other. Actually, a length extending direction of the first area 411 is perpendicular to a length extending direction of the second area 412, so that the first area 411 and the second area 412 may be considered in a shape of L, and is consistent with an appearance design of the headset. The through hole 43 threads through the second side portion 404 of the main body of the watch 40, it may also be understood that a side wall that threads through the accommodating slot 41 is in communication with the second area, and the through hole 43 is opposite to the opening of the accommodating slot. In this embodiment, the main body of the watch 40 is an integrated structure, and the accommodating slot 41 may be directly formed after the first side portion 403 is recessed towards the second side portion 404.

Specifically, as shown in FIG. 14*b*, the main body of the watch 40 includes a front face 401 and a back face 402. The front face 401 and the back face 402 are located between the first side portion 403 and the second side portion 404. A storage cavity 46 is disposed in the main body of the watch 40, and the storage cavity 46 is configured to accommodate various devices that implement functions of the watch, such as a circuit board. The display screen 44 is installed on the front face 401, the back cover covers the back face 402, and the storage cavity 46 is located on a partial area of the back face of the main body and is sealed by using the back cover. The accommodating slot 41 towards the second side portion 404 is disposed on the first side portion 403, the opening of the accommodating slot 41 is located on the first side portion 403, and the accommodating slot 41 partially threads through the back face 402, and is encapsulated by the back cover. The through hole 43 is disposed on a side wall that is opposite to the opening and that is of the accommodating slot 41. After the Bluetooth headset 300 is accommodated in the accommodating slot 41, the headset head portion 3301 of the Bluetooth headset 300 exactly fills the opening of the accommodating slot 41, the headset tail portion 3302 of the Bluetooth headset 300 partially protrudes from the second side portion 404, and a protruding part is considered as decoration, to ensure that the appearance of the watch is elegant. The second locking component 42 is disposed on the side wall of the accommodating slot 41. The first locking component 3303 is disposed on a side that is of the headset head portion 3301 and that faces towards the headset tail portion 3302. The headset tail portion 3302 is inserted in the accommodating slot from the opening of the accommodating slot 41 and pushes the headset head portion 3301 of the Bluetooth headset 300 into the accommodating slot 41. The Bluetooth headset 300 is accommodated and located in the main body of the watch 40. The first locking component 3303 is locked with the second locking component 42, that is, the two magnets are attracted to each other to fasten the headset to the main body of the watch 40. The headset tail portion 3302 protrudes from a side of the main body of the watch 40 through the through hole 404. The headset tail portion 3302 of the Bluetooth headset 300 is pushed from the outside of the main body of the watch 40, so that the headset head portion 3301 of the Bluetooth headset 300 protrudes from the opening of the accommodating slot 41, the first locking component 3303 is unlocked with the second locking component 42, and the Bluetooth headset 300 may be removed from the watch.

In this embodiment, the Bluetooth headset 300 is accommodated in the main body of the watch 40 and is located by coordinating the first locking component with the second locking component, that is, the Bluetooth headset 300 is fastened in the main body of the watch 40 through attraction between the magnets. The headset tail portion 2302 of the Bluetooth headset 300 may be coordinated with the main body of the watch 40 as an accommodating or removing key to lock and release the Bluetooth headset 300. This design structure is simple, and the appearance of the watch is not affected. When the Bluetooth headset 300 is in an idle state, the Bluetooth headset 300 can be accommodated in the main body of the watch 40. When the Bluetooth headset 300 is used, the headset tail portion 3302 can be pressed to enable the headset head portion 3301 to extend out of the main body of the watch 40 to quickly remove the Bluetooth headset 300, and the main body of the watch 40 can be fastened to and be unlocked with the Bluetooth headset 300 without an unnecessary structure. Therefore, space is saved and a process of accommodating and removing the Bluetooth headset 300 is simplified, to improve efficiency of accommodating and removing the headset. The user does not need to additionally accommodate the Bluetooth headset, to effectively avoid losing the Bluetooth headset, and it is convenient to accommodate and remove the Bluetooth headset in various motion states.

In an embodiment of this application, the wearable device including the bearing body and two Bluetooth headsets is provided. The bearing body is the main body of the watch and a bottom housing, and the first locking component is disposed in the Bluetooth headset, a display screen is disposed on the front face of the main body of the watch, the bottom housing includes a bearing face and the accommodating slot that is recessed in the bearing face, the second locking component that is locked with the first locking component is disposed in the accommodating slot, and the main body of the watch is movably connected to the bottom housing through a connection portion. An elastic ejector pin is disposed on the Bluetooth headset, the main body of the watch covers the bottom housing to encapsulate the accommodating slot, the back face of the main body of the watch assists the first locking component and the second locking component in abutting against the Bluetooth headset, the elastic ejector pin is compressed into the Bluetooth headset, the main body of the watch moves relative to the bottom housing through the connection portion, to expose the accommodating slot, after the main body of the watch is removed from the Bluetooth headset, the elastic ejector pin enables the first locking component to be entirely unlocked with the second locking component and pushes the Bluetooth headset out of the accommodating slot, and the operation portion is the elastic ejector pin. The following is described by using two specific embodiments.

Figure 15A:
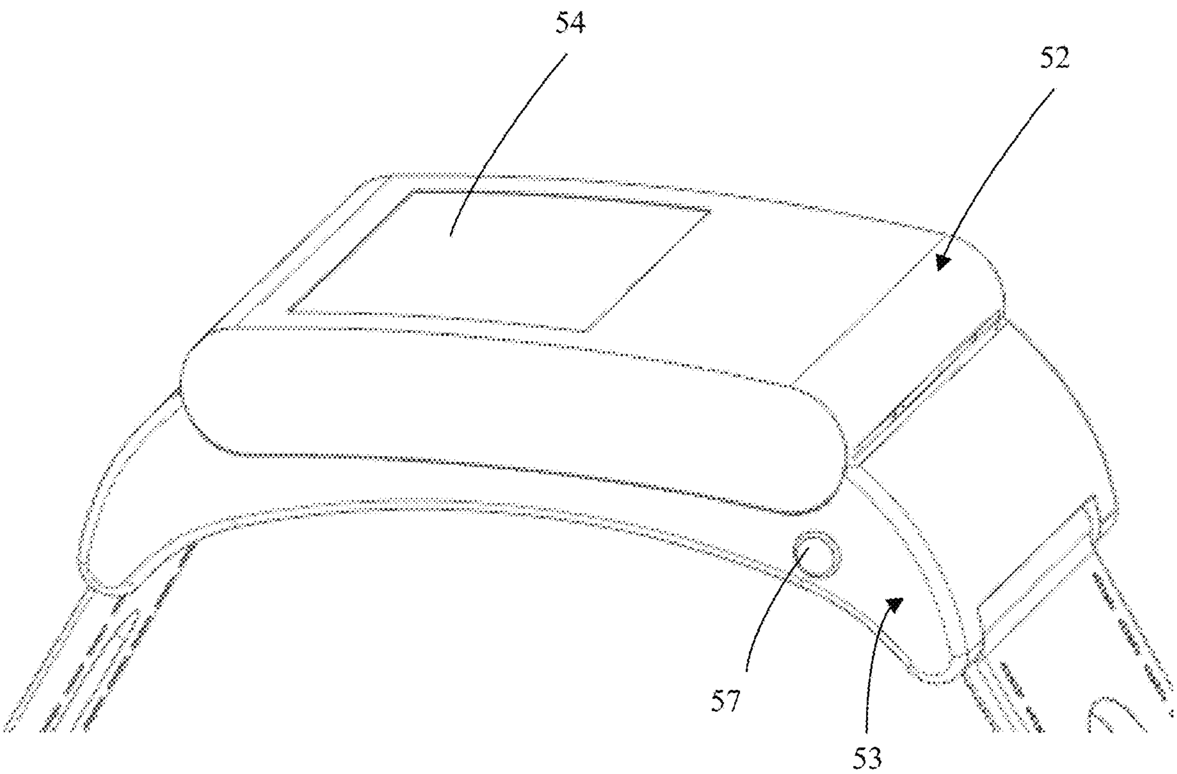
FIG. 15*a*, FIG. 15*b*, and FIG. 15*c* are schematic structural diagrams of a wearable device according to a fourth embodiment of this application.
Figure 15B:
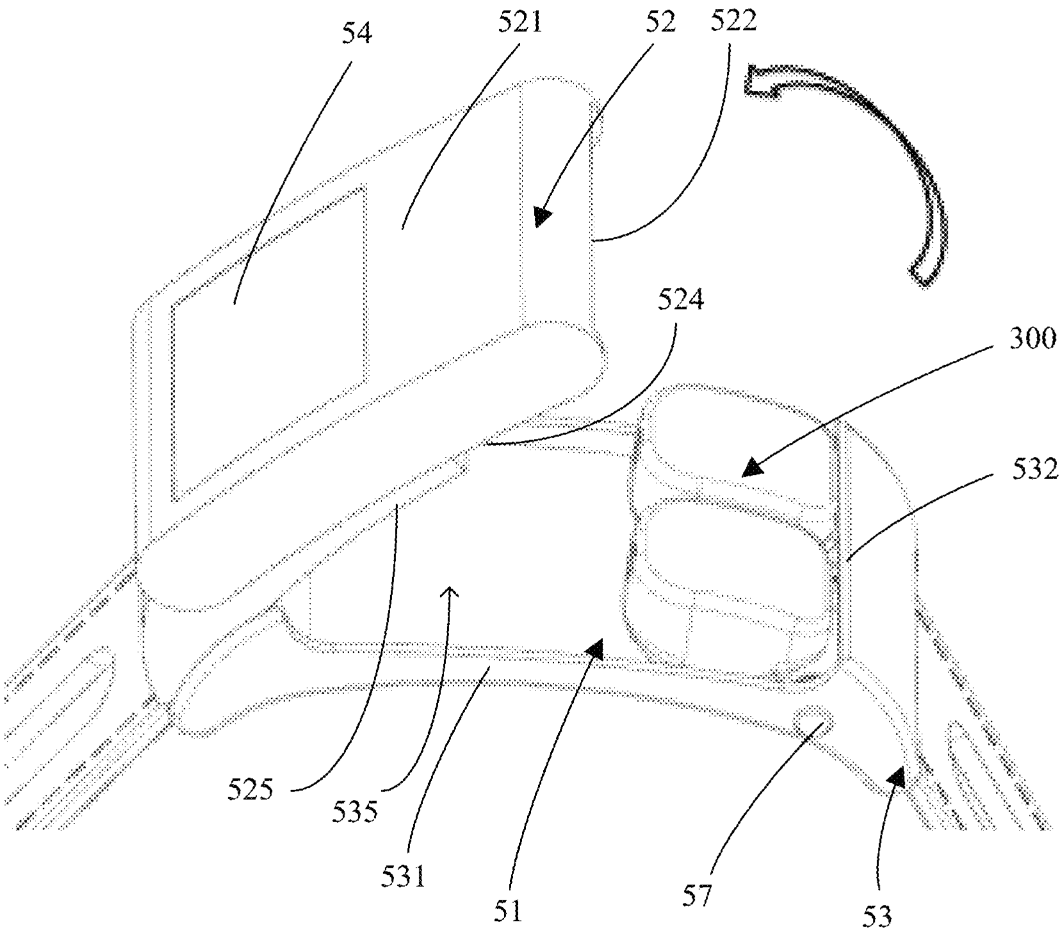

In a fourth embodiment of this application, the wearable device is a smartwatch. In this embodiment, the connection portion is disposed at an end of the main body of the watch and is rotatably connected to the bottom housing, so that the main body of the watch may cover the bottom housing in a flipping manner, and may enable the main body of the watch to be automatically ejected relative to the accommodating slot of the bottom housing. The wearable device further includes a limiting component, the limiting component is disposed opposite to the rotating portion, and is configured to firmly lock the main body of the watch on the bottom housing or enable the main body of the watch to be unlocked with the bottom housing. Referring to FIG. 15*a* and FIG. 15*b* for specific details, FIG. 15*a* is a schematic structural diagram of the smartwatch in this embodiment. The main body of the watch and the bottom housing are in a closing state. FIG. 15*b* shows that the main body of the watch shown in FIG. 15*a* is in an opening state relative to the bottom housing, and exposes the Bluetooth headset. In this embodiment, the smartwatch includes a main body of the watch 52, a bottom housing 53, and two Bluetooth headsets 300. The main body of the watch 52 and the bottom housing constitute a dial of the watch. The first locking component is disposed in the Bluetooth headset 300, the second locking component is disposed in the main body of the watch 52, and a display screen 54 is disposed on a front face of the main body of the watch 52. The bottom housing 53 includes a bearing face 532 and an accommodating slot 51 that is recessed in the bearing face 532. The second locking component (not shown in the figure) that is locked with the first locking component is disposed in the accommodating slot 51. The main body of the watch 52 is movably connected to the bottom housing 53 through a connection portion 55. The main body of the watch 52 covers the bearing face 532 and encapsulates the accommodating slot 51, to encapsulate the Bluetooth headset 300 in the bottom housing 53. The main body of the watch 52 moves relative to the bottom housing 53 through the connection portion, to expose the accommodating slot 51. The elastic ejector pin is disposed on a headset head portion of the Bluetooth headset 300. After the Bluetooth headset 300 is locked in the accommodating slot 51 by the main body of the watch 52, the first locking component, and the second locking component, the elastic ejector pin is retracted in the Bluetooth headset 300. In this case, both of locking force of the first locking component and the second locking component and pressure of the main body of the watch limit the Bluetooth headset 300. After the main body of the watch 52 is rotatably unlocked relative to the bottom housing 53 and opened, pressure on the Bluetooth headset 300 is released, and the elastic ejector pin elastically recovers and pushes the headset out of the accommodating slot 51, and may entirely unlock the first locking component with the second locking component. Furthermore, the first locking component and a groove that is disposed adjacent to the first locking component are disposed on the headset head portion. When the headset is used, the elastic ejector pin is rotatably accommodated in the groove, and usage is not affected. The Bluetooth headset in this embodiment may be ejected by the elastic ejector pin. When there is limited space of the accommodating slot 51, the Bluetooth headset partially protrudes from the bottom housing, to help the user remove the Bluetooth headset from the accommodating slot.

In this embodiment, the first locking component is a first magnet (not shown in the figure) that is disposed in the Bluetooth headset 300. The second locking component is a second magnet (not shown in the figure) that is disposed in the main body of the watch 52, the first magnet and the second magnet are magnetically attractive to each other, and the Bluetooth headset may be located in the accommodating slot 51. As shown in FIG. 15*b*, the main body of the watch 52 includes a front face 521, a back face 522, and a side face 523. A storage portion 525 is disposed in the main body of the watch 52. The storage cavity 525 is configured to accommodate various devices that implement functions of the watch, such as a circuit board. The front face 521 is a face at which the display screen 54 is located. The bottom housing 53 includes two opposite side faces 531 and the bearing face 532 that is connected to the two side faces 531. One accommodating slot 51 is recessed in the bearing face 532, and is configured to accommodate the two Bluetooth headsets 300. The second magnet is disposed on a bottom wall of the accommodating slot 51. The outside of a side wall of the accommodating slot is the side face 531. After the Bluetooth headset 300 is accommodated in the accommodating slot 51, the first magnet and the second magnet are magnetically attractive to each other. The main body of the watch 52 covers the bearing face 532 of the bottom housing 53 to encapsulate the accommodating slot 51, to fasten the Bluetooth headset 300 in the accommodating slot 51. The watch in this embodiment may accommodate the Bluetooth headset and may ensure integrity of the appearance of the watch, and in addition, this structure is simple and is convenient to accommodate the Bluetooth headset.

Furthermore, a recessed portion 524 adjacent to the storage portion 525 is disposed on the back face 522 of the main body of the watch 52, a recessed slot 535 that is adjacent to the accommodating slot 51 and that is opposite to the storage portion is disposed on the bearing face 532 of the bottom housing 53, the main body of the watch 52 covers the bottom housing 53, the storage portion 525 is accommodated in the recessed slot 535, and the recessed portion 524 and the accommodating slot 51 are opposite fastened to each other to form space that accommodates the two Bluetooth headsets 300. In this embodiment, space of the main body of the watch 52 and the bottom housing 53 is fully used, to accommodate devices of the watch and the Bluetooth headset. In this way, a volume of the watch may be reduced as much as possible.

Figure 15C:
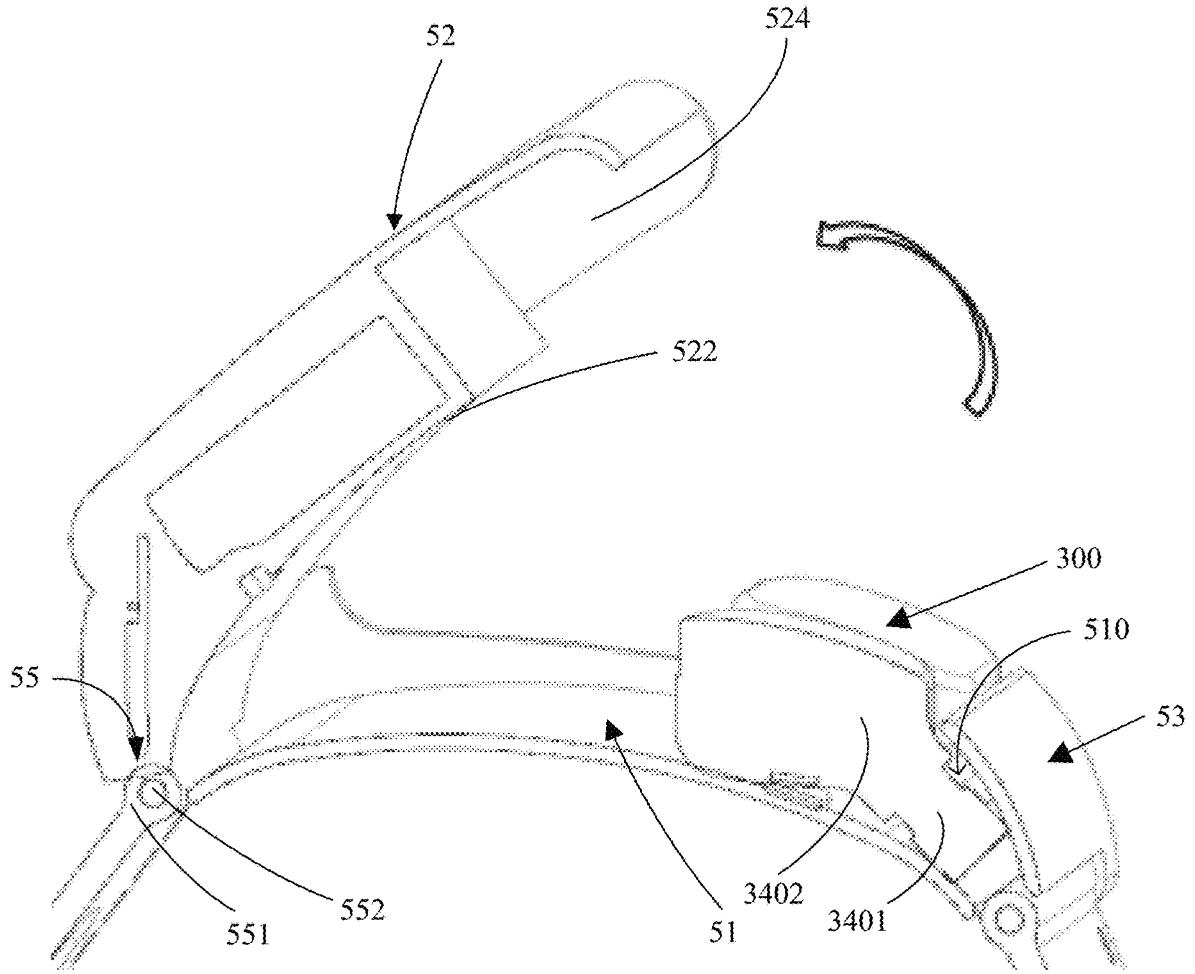

In this embodiment, referring to FIG. 15*c*, FIG. 15*c* is an internal schematic diagram in which a surface of the smartwatch shown in FIG. 15*b* is partially sectioned. The connection portion 55 includes two opposite hinge ends 551 and two rotating shafts 552, a rotary spring (not shown in the figure) is sheathed on a rotating shaft, the two hinge ends 551 are disposed on a side of the bottom housing 53, the two rotating shafts 552 are respectively disposed on side faces that are of the main body of the watch 52 and that are located on two opposite sides of the display screen, the two rotating shafts 552 are respectively rotatably installed on the two hinge ends 551, to enable the main body of the watch 52 to rotate relative to the bottom housing 53, and two opposite ends of the rotary spring respectively abut against the main body of the watch 52 and the hinge end 551. The main body of the watch 52 may rotate relative to the bottom housing 53 through the connection portion 55, to cover the accommodating slot 51, or to be opened relative to the accommodating slot 51. The connection portion 55 is located at a position of one end of the main body of the watch, to help the main body of the watch 52 flip relative to the bottom housing.

Figure 16:
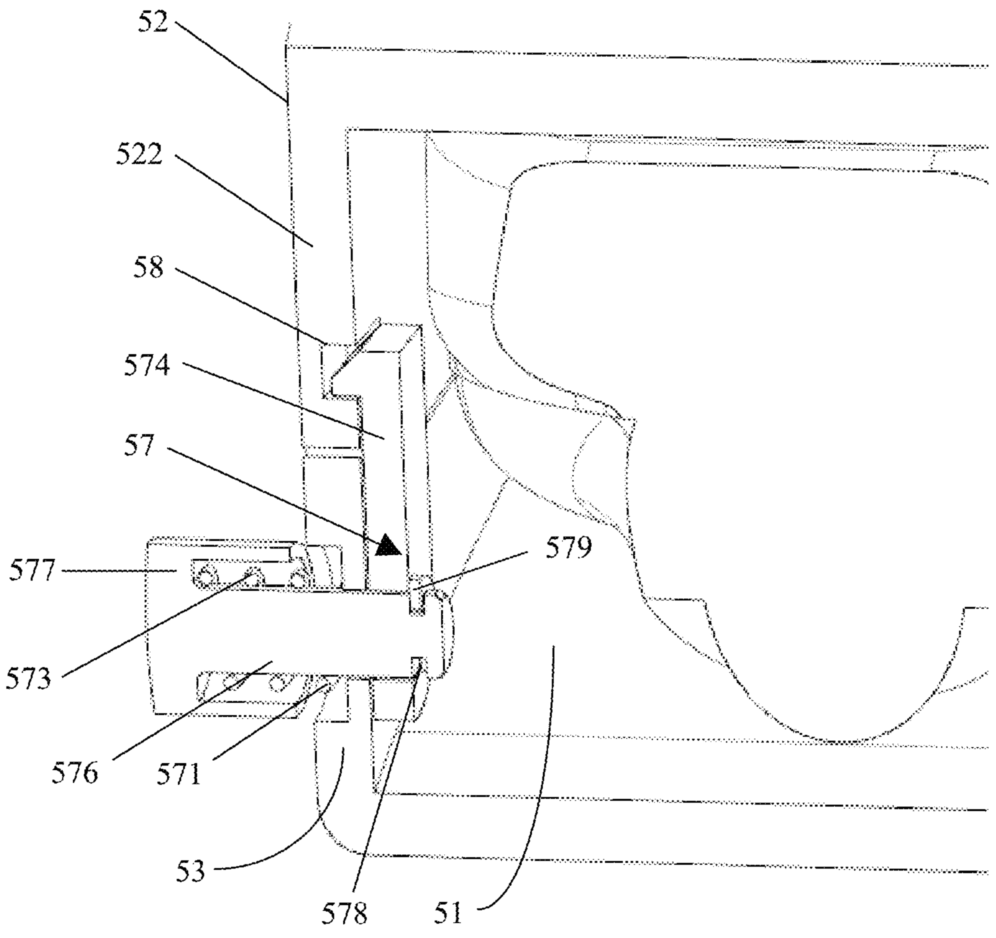
FIG. 16 is a schematic diagram of a locking state of a locking component of the wearable device shown in FIG. 15*a;*

Referring to FIG. 16, in this embodiment, a fastening slot 58 is disposed on an inner side wall of the recessed portion 524, that is, the fastening slot 58 is disposed at an end that is of the back face 522 of the main body of the watch 52 and that is far away from the rotating portion 55. The limiting component 57 includes the fastening slot 58, a key 572, a fastening hook 574, and an elastic body 573. An installation hole 571 that threads through the accommodating slot is disposed on the bottom housing 53, the key 572 includes a key shaft 576, the key shaft 576 extends into the accommodating slot 51 through the installation hole, the fastening hook 574 is connected to an end portion of the key shaft 576, the elastic body 573 is sheathed on the key shaft 576 and is connected between the key and the bottom housing, the main body of the mobile phone 52 covers the bottom housing 53, the fastening hook 574 is fastened to the fastening slot 58 and provides fastening force by using the elastic body 573, and the key 572 is pressed to compress the elastic body 573 to unlock the fastening hook 574 and the fastening slot 58.

Specifically, the installation hole 571 is disposed on the side face 531 of the bottom housing 53 and the installation hole 571 is in communication with the accommodating slot 51. A through hole is disposed in a position that is of the fastening hook 574 and that is far away from a hook portion. The key 572 includes the key shaft 576 and a keycap 577 that is fastened to an end of the key shaft 576. The key shaft 576 and the keycap 577 are integrally formed. A limiting slot 578 is disposed on outer periphery of a free end of the key shaft 576, and a limiting ring 579 is disposed in the limiting slot 578. The elastic body 573 is a coil spring and is sheathed on the key shaft 576. The fastening hook 574 is located in the accommodating slot 51. The key shaft 576 threads through the installation hole 571 to be fastened to the fastening hook 574, and fastens the fastening hook 574 between walls of the limiting slot 578 and the accommodating slot 51 by using the limiting ring 579. Two ends of the elastic body 573 respectively abut against the keycap 577 and the side face 531 of the bottom housing 53. In this case, the fastening hook 574 is fastened to a side wall 511 of the accommodating slot 51 by using the key 572, and the elastic body 573 is in an elastic pre-compressed state.

The main body of the watch 52 covers the bottom housing 53, a side wall of the recessed portion 525 is connected to a side wall of the accommodating slot 51, and the fastening hook 574 of the locking component is fastened into the fastening slot 581 in the main body of the watch 52, to lock the main body of the watch 52 with the bottom housing 53. When the main body of the watch 52 needs to be opened to remove the Bluetooth headset 300, the keycap 577 is pressed, so that the key 572 moves to the bottom housing 53 and compresses the elastic body 573, and the fastening hook 574 is driven to move far away from the side wall of the accommodating slot 51 and to be unlocked by being removed from the fastening slot 58. Elasticity of the elastic body 573 enables the key to move to an original position. When the main body of the watch 52 is locked with the bottom housing 53 by using the limiting component 57, a rotary spring of the rotating portion 55 is compressed, the limiting component 57 is unlocked, and the rotary spring recovers elasticity to eject the main body of the mobile phone 52, that is, the Bluetooth headset can be exposed. In another implementation, the limiting component includes a first magnet that is disposed on a bearing face of the bottom housing 53 and a second magnet that is disposed on the main body of the watch 52, the first magnet and the second magnet are magnetically attractive to each other and are both far away from the connection portion 55, and the main body of the watch 52 covers the bottom housing 53 and is fastened to the bottom housing 53 through attraction between the first magnet and the second magnet.

In this embodiment, by coordinating the main body of the mobile phone with the bottom housing, the Bluetooth headset 300 is accommodated in the bottom housing 53 and is fastened to the bottom housing 53 through the attraction between magnets. The main body of the watch 52 is used as a cover body to encapsulate the accommodating slot. Provided that the main body of the mobile phone is unlocked with the bottom housing, the connection portion can eject the main body of the mobile phone to expose the Bluetooth headset. This structure is simple and is convenient to operate. The limiting component 57 is additionally disposed on the bottom housing 53 to lock the main body of the watch 52 with the bottom housing 53, to strengthen locking reliability. The key 572 is pressed to enable the main body of the watch 52 to flip relative to the bottom housing 53 to expose the Bluetooth headset 300, and the Bluetooth headset 300 is accommodated in and removed from the bottom housing 53 through the front face 501. This operation is convenient to use.

In a fifth embodiment of the wearable device in this application, a difference between the fifth embodiment and the fourth embodiment is that the connection portion includes sliding rails that are disposed on two opposite sides of the back face of the main body of the watch, and sliding slots that are disposed on the bottom housing and that are coordinated with the sliding rails, and the sliding rails are slidably installed in the sliding slots, so that the main body of the watch is slidably installed on the bottom housing. Furthermore, there is a protrusion on the back face of the main body of the watch, the two sliding rails are disposed on two opposite sides of the protrusion and threads through an end face of the protrusion, the sliding slots are respectively disposed on inner side end portions of two side walls of the accommodating slot, the main body of the watch is slidably installed on the bottom housing, and the protrusion is located in the accommodating slot. The following is described by using a specific embodiment.

Figure 17:
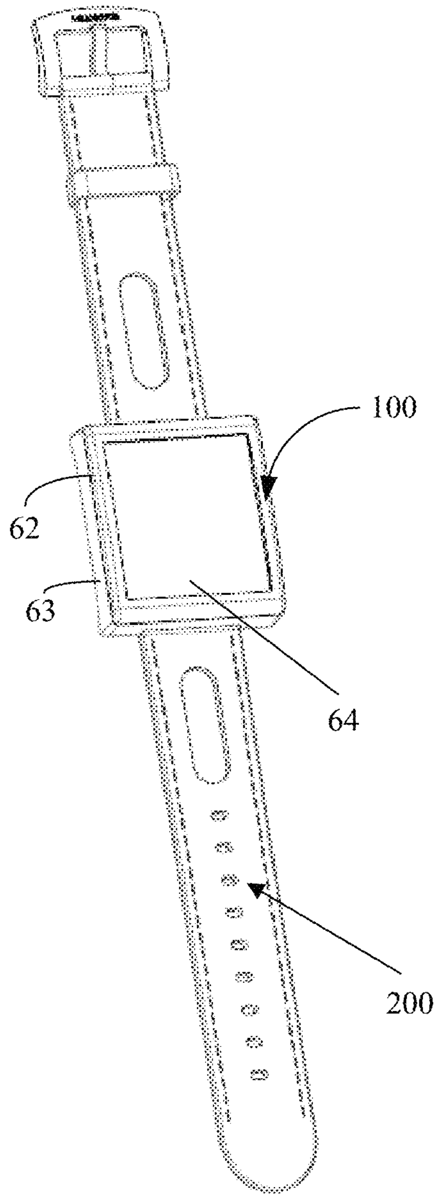
FIG. 17 is a schematic diagram of a wearable device according to a fifth embodiment of this application.
Figure 18:
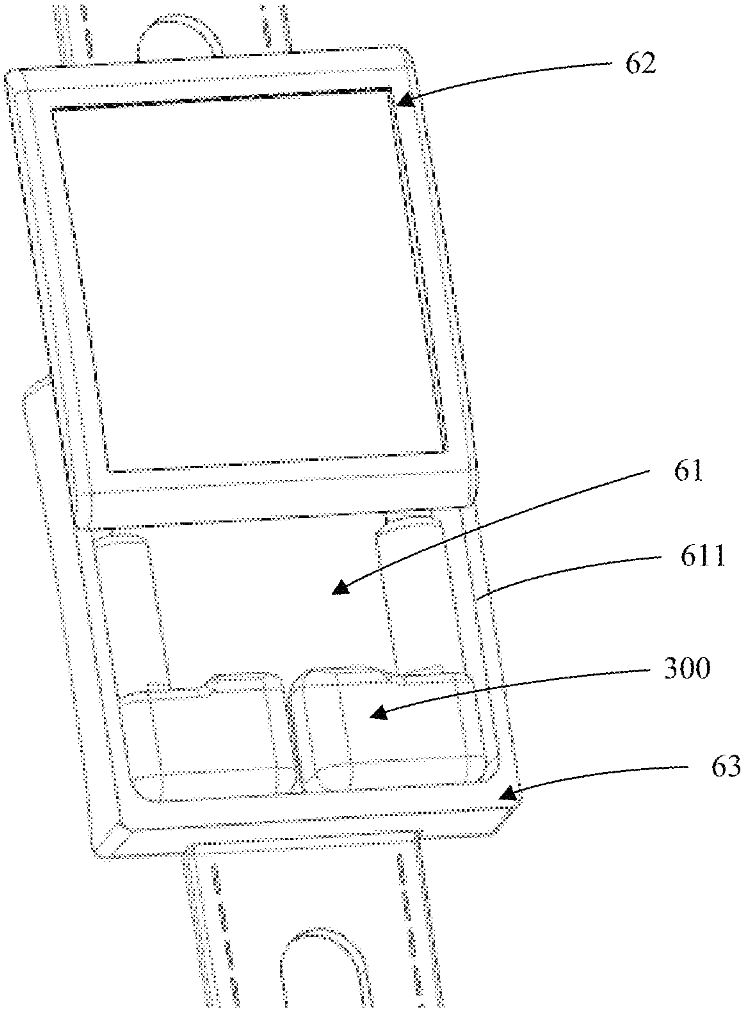
FIG. 18 is a schematic diagram of a partial structure of the wearable device shown in FIG. 17, where a main body of a watch is opened relative to a bottom housing.

Referring to FIG. 17, FIG. 17 is a schematic diagram of a smartwatch in the fifth embodiment, the smartwatch includes a dial 100, a watch band 200, and Bluetooth headsets. The dial 100 includes a main body of the watch 62, a bottom housing 63, and a display screen 64. The watch band 200 is connected to two sides of the dial 100. The display screen is located on the front face of the main body of the watch 62. Referring to FIG. 18, FIG. 18 is a schematic diagram of opening states of the main body of the watch 62 and the bottom housing 63 of the smartwatch shown in FIG. 17. The first locking component (not shown in the figure) is disposed in the Bluetooth headset 300, the bottom housing 63 includes accommodating slots 61, the second locking components are disposed on both of the accommodating slots 61, and the Bluetooth headset 300 is fastened to the bottom housing 63 by using the first locking component and the second locking component. Both of the first locking component and the second locking component in this embodiment are magnets, and the two magnets are magnetically attractive to each other. The main body of the watch 62 is slidably installed on the bottom housing 63 and encapsulates the Bluetooth headset 300 in the accommodating slot 61, and after the Bluetooth headset 300 is accommodated in the accommodating slot 61, the magnets are magnetically attractive to each other to fasten the Bluetooth headset 300 in the accommodating slot 61. When the main body of the watch 62 slides relative to the bottom housing 53 to expose the accommodating slot 61, pressure on the Bluetooth headset 300 is released, and the elastic ejector pin elastically recovers and pushes the headset out of the accommodating slot 61, and may entirely unlock the first locking component with the second locking component. The Bluetooth headset in this embodiment may be ejected by the elastic ejector pin. When there is limited space of the accommodating slot 51, the Bluetooth headset partially protrudes from the bottom housing, to help the user remove the Bluetooth headset from the accommodating slot.

Figure 19:
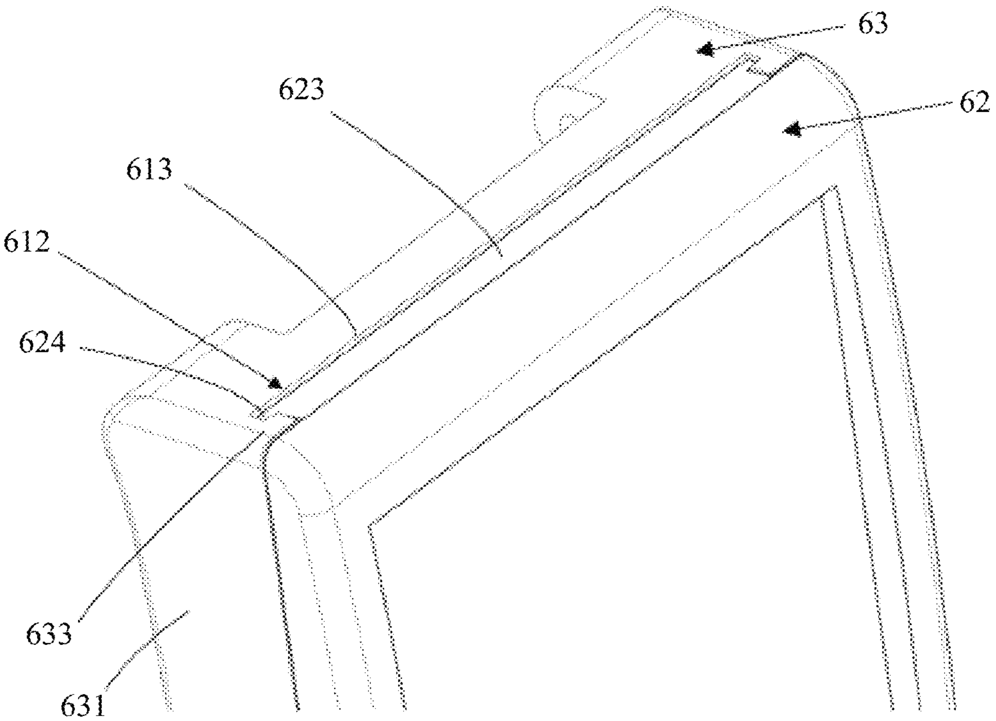
FIG. 19 is a partially enlarged schematic diagram of the wearable device shown in FIG. 17.

Specifically, referring to FIG. 18 and FIG. 19, FIG. 19 is a partially enlarged view of the dial 100 shown in FIG. 17. The main body of the watch 62 and the bottom housing 63 are closed. A side wall that is of the accommodating slot 61 and that is located on two opposite sides of the bottom housing 63 is a side wall 611, a sliding slot 612 is disposed along a length extending direction of the side wall 611 in an end portion of the side wall 611, and each sliding slot 612 threads through an end face 633 of the bottom housing 63 towards a same end portion, and forms an insertion opening 613. It may be understood that the end face 633 is an end face that the sliding slot 612 is inserted in. The insertion opening 613 is configured to insert the main body of the watch 62 into the bottom housing 63.

A dovetail joint 623 is convexly disposed on the back face of the main body of the watch 62, and the dovetail joint 623 may be understood as a protrusion. The sliding rails 624 are disposed on two opposite sides of the dovetail joint 623. The main body of the watch 62 inserts the sliding rail 624 from the insertion opening 613 into the sliding slot 612, and the sliding rail 624 may slide in the sliding slot 612, so that the main body of the watch 62 is slidably installed on the bottom housing 63, and the dovetail joint 623 is located in the accommodating slot 61. When the Bluetooth headset 300 needs to be removed, the main body of the watch 62 slides far away from the bottom housing 63, to expose the accommodating slot 61. When the Bluetooth headset 300 is required to be encapsulated, the main body of the watch 62 slides to the bearing face 532 to seal the accommodating slot 61.

Furthermore, to prevent the main body of the watch 62 from falling out of the bottom housing 63, the main body of the watch 62 and the bottom housing 63 are fastened to each other by increasing friction between the main body of the watch 62 and the bottom housing 63. Certainly, the limiting component in the implementation of the fourth embodiment may be disposed between the back face of the main body of the watch 62 and the bottom housing 63 to close and then lock the main body of the watch 62 and the bottom housing 63, and a specific position is determined based on an actual design. For example, when the main body of the watch 62 and the bottom housing 63 slide to a desired position, the position is located by using magnets, and a closing state or a sliding opening state of the main body of the mobile phone 62 and the bottom housing 63 may be implemented by using the two magnets. Certainly, a limiting spring may be disposed between the main body of the watch 62 and the bottom housing 63. An elasticity direction of the limiting spring is consistent with a sliding direction of the main body of the watch 62. The limiting spring is configured to limit a sliding distance of the main body of the watch 62, to prevent the main body of the watch 62 from falling out, and when the main body of the mobile phone 62 and the bottom housing 63 are closed, attraction between the magnets may compress the limiting spring.

In this embodiment, the Bluetooth headset 300 is accommodated in the bottom housing 63 and is located by using the magnets. The main body of the watch 62 is slidably installed on the bottom housing 63 to seal and expose the accommodating slot 61 for accommodating and removing the Bluetooth headset 300. It is also ensured that the watch is cleaner and more elegant. The Bluetooth headset of the watch is directly accommodated in the watch, the user does not need to additionally accommodate the Bluetooth headset to avoid losing the Bluetooth headset, and the main body of the watch 62 is pushed to remove the headset, to facilitate this operation.

In a sixth embodiment of this application, the bearing body is the main body of the watch, the Bluetooth headset includes the headset head portion and the headset tail portion, the headset tail portion includes the first locking component and an ejector pin (not shown in the figure), an installation hole that threads through an outer side face of the main body of the watch is disposed on a side wall of the accommodating slot, the second locking component includes an elastic key and a fastening hook, the elastic key includes an abutting body that faces towards the fastening hook, the elastic key is inserted in the installation hole from the outside of the main body of the watch, the fastening hook is located in the accommodating slot and is far away from the installation hole, and the abutting body abuts against the ejector pin. The Bluetooth headset is accommodated in the accommodating slot, the fastening hook is fastened to the first locking component from a side of the headset tail portion, the elastic key is pressed to first push the ejector pin to push the Bluetooth headset out of the accommodating slot, and pushing force of the ejector pin and pushing force of the elastic key enable the fastening hook to move far away from the headset tail portion and to be unlocked with the first locking component. The operation portion may be understood as the ejector pin.

Figure 20:
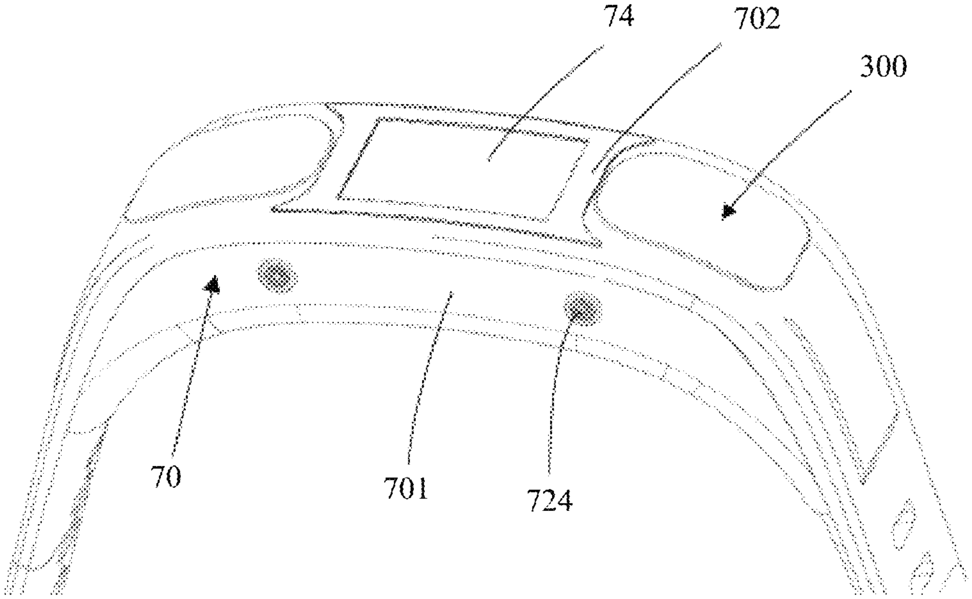
FIG. 20 is a schematic diagram of a wearable device according to a sixth embodiment of this application.
Figure 21:
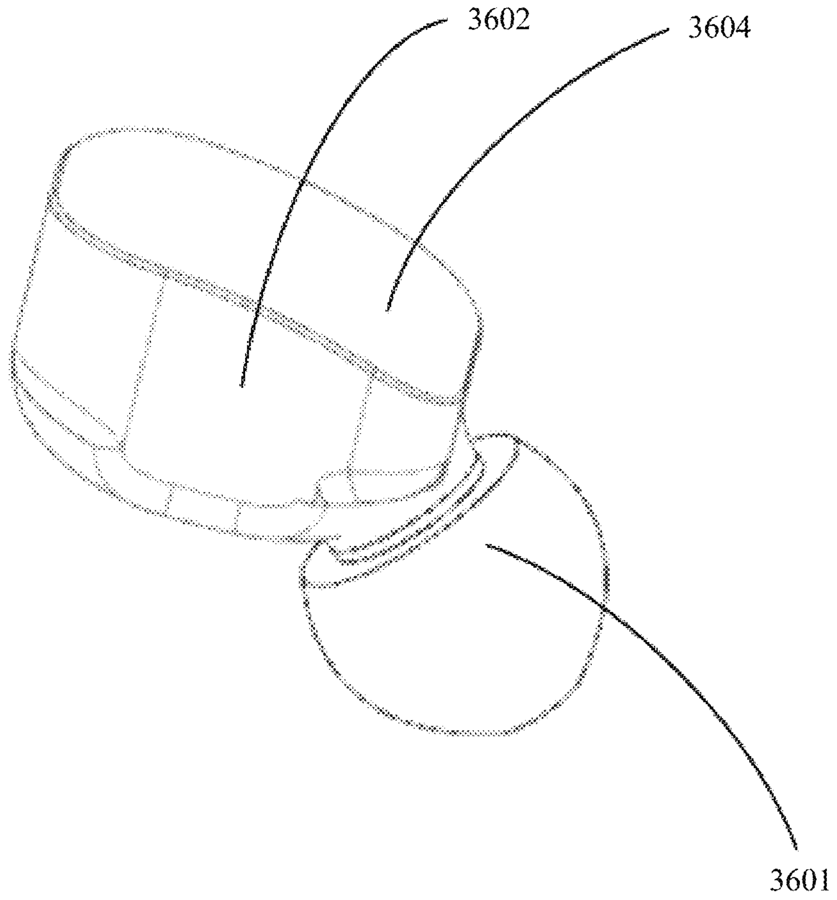
FIG. 21 is a schematic structural diagram of a Bluetooth headset shown in FIG. 20.

The following is described by using a specific embodiment. Referring to FIG. 20, FIG. 20 is a schematic structural diagram in the sixth embodiment of this application, and the wearable device is a band. The band includes the main body of a watch 70 and two Bluetooth headsets 300. A display screen 74 is disposed on the main body of the watch 70, the two Bluetooth headsets 300 are accommodated in the main body of the watch 70 and are located on two opposite sides of the display screen 74, and the two Bluetooth headsets 300 and the display screen both constitute an outer surface of the main body of the watch 70. FIG. 21 is a schematic structural diagram of the Bluetooth headset 300. The Bluetooth headset 300 includes a headset head portion 3601 configured to transfer a sound and a headset tail portion 3602 disposed opposite to the headset head portion 3601, a rubber plug is disposed on the outside of the headset head portion 3601, and the headset tail portion 3602 includes an outer end face 3604 and the first locking component (not shown in the figure). The first locking component is a fastening slot 3603 that is disposed on an outer surface of the Bluetooth headset 300.

Figure 22:
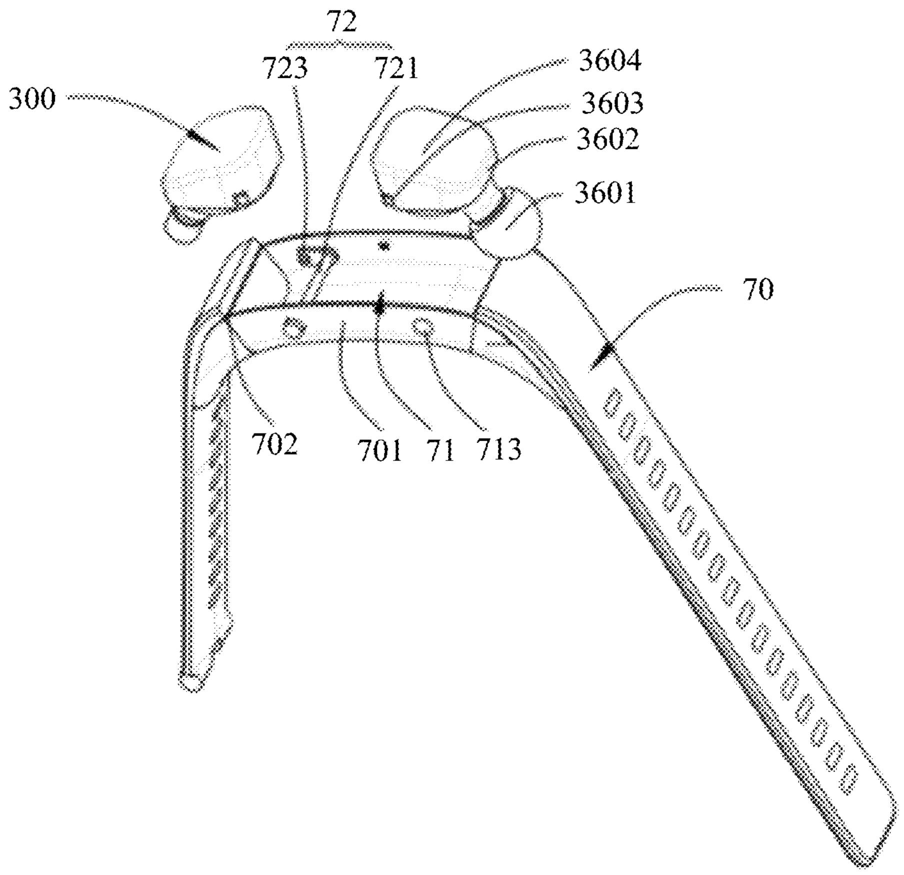
FIG. 22 is a schematic exploded view of a partial structure of the wearable device shown in FIG. 20.

Referring to FIG. 22, FIG. 22 is a schematic exploded view of a partial structure of the hand ring shown in FIG. 20. The main body of the watch 70 includes a side face 701 and a front face 702, the display screen 74 and accommodating slots 71 located on two opposite sides of the display screen 74 are disposed on the front face 702, and the second locking component 72 corresponding to the first locking component 3603 of each Bluetooth headset 300 is disposed on the main body of the watch 70. The two Bluetooth headsets 300 are respectively accommodated in two accommodating slots 71, and the second locking component 72 is locked with the first locking component 3603 to lock the Bluetooth headset 300 into the accommodating slot 71. An outer end face 3604 of the headset tail portion 3602 encapsulates an opening of the accommodating slot 71 and is coplanar with the front face 702 of the main body of the watch 70. The two Bluetooth headsets 300 are located on two sides of the display screen, an internal structure of the watch does not need to be changed, and it is only required to directly increase a length direction of the main body of the watch. For the hand ring, an increased length of the dial improves the entire appearance. From a perspective of the appearance of the hand ring, the outer end face 3604 of the headset tail portion 3602 and the front face 702 of the main body of the watch 70 are in different areas, and have no other differences, may both be outer surfaces of the hand ring, to ensure integrity of the appearance of the hand ring.

Figure 23:
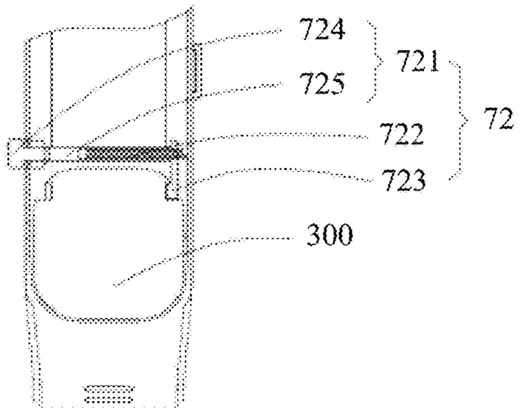
FIG. 23 is an enlarged schematic diagram of a partial structure of the wearable device shown in FIG. 23.

As shown in FIG. 22 and FIG. 23, FIG. 23 is an enlarged view of a partial structure shown in FIG. 22. In this embodiment, an installation hole 713 that threads through a side face 701 of the main body of the watch 70 is disposed on a side wall of the accommodating slot 71. The second locking component 72 includes a key 721, a spring 722, and a fastening hook 723. The key 721 includes a keycap 724 and a key shaft 725 that is disposed at an end of the keycap 724. The fastening hook 723 is disposed at an end portion of the key shaft 725, and a cavity that threads through the end portion of the key shaft 725 is disposed in the key shaft 725. The spring 722 is located in the cavity and one end of the spring 722 is fastened to the cavity. The key shaft 725 is inserted from the outside of the main body of the watch 70 into the installation hole 713. The fastening hook 722 is located in the accommodating slot 71 and is far away from the installation hole 713. The other end of the spring 722 is fastened to a side wall that is of the accommodating slot 71 and that is far away from the installation hole 713. The Bluetooth headset 300 is accommodated in the accommodating slot 71, the fastening hook 723 is fastened to the fastening slot 3603 from a side of the headset tail portion 3602, and the Bluetooth headset is located in the accommodating slot 71 by using a side wall of the accommodating slot 71 and elasticity of the spring. The abutting body is disposed in parallel with the key shaft, the ejector pin is disposed perpendicular to the abutting body, and a length of the abutting body may enable the abutting body to first push the ejector pin when the key is pushed, so that the spring is compressed to push the fastening hook and the ejector pin provides specific external force to unlock the fastening hook with the fastening slot. The keycap 724 is pressed to compress the spring, to drive the fastening hook 722 to move and fall out of the fastening slot 3603, and in addition, the Bluetooth headset 300 is pushed out of the accommodating slot 71. The Bluetooth headset is unlocked with the main body of the watch 72 by pressing the key 721, so that the Bluetooth headset may be removed. In this embodiment, the key shaft 725 extends into the accommodating slot 71 through a side of the outside of the main body of the watch 72 and is located between two opposite side walls. One end of the spring is fastened to the cavity of the key shaft 725, and the other end is connected to a side wall that is opposite to the installation hole 713. After the Bluetooth headset 300 is accommodated in the accommodating slot 71, the key shaft 725 is located below the headset, and the fastening hook 723 is fastened to the fastening slot from the side portion. A bottom wall of the accommodating slot 71 is not designed as a plane, and has a first area and a second area that is connected to the first area. The first area and the second area are respectively used to accommodate the headset head portion and the headset tail portion of the Bluetooth headset 300, that is, an internal shape of the accommodating slot 71 is consistent with an appearance outline of the headset.

Figure 24:
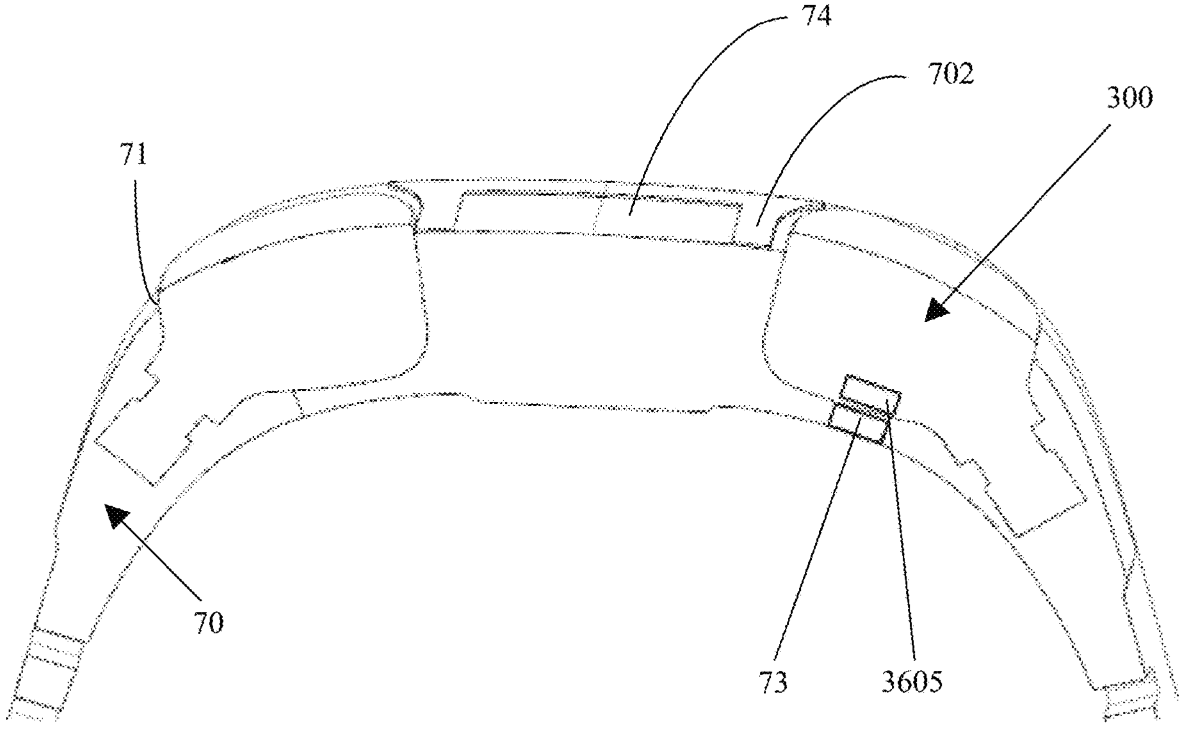
FIG. 24 is a schematic structural diagram of the wearable device shown in FIG. 23.

Furthermore, referring to FIG. 24, FIG. 24 is a schematic diagram of an internal structure of the hand ring shown in FIG. 20. In this embodiment, an ejecting portion may further be disposed in the hand ring, and is configured to eject the Bluetooth headset 300 out of the accommodating slot 71 after the first locking component is unlocked with the second locking component. In an implementation, the ejecting portion is two magnets that are magnetically repulsive to each other. A first magnet 73 is disposed on the bottom wall of the accommodating slot 71, and a second magnet 3605 that faces away from the outer end face 3604 is disposed in the headset tail portion 3602. The first magnet 73 and the second magnet 3605 are magnetically repulsive to each other. After the second locking component 72 is unlocked with the first locking component 3603, the Bluetooth headset 300 is pushed out of the accommodating slot by repulsive force of the magnets. In this embodiment, the accommodating slot 71 includes the first area that accommodates the headset head portion 3601 and the second area that accommodates the headset tail portion 3602. The first area is in communication with the second area. The second magnet is disposed on the second area of the accommodating slot 71.

In another embodiment, the ejecting portion is an elastic body disposed on the bottom wall of the accommodating slot 71, the Bluetooth headset 300 is accommodated in the accommodating slot 71 and then compresses the elastic body, the second locking component is unlocked with the first locking component, and the elastic body ejects the Bluetooth headset out of the accommodating slot. The elastic body may be a coil spring, and a flexible elasticity direction faces towards the accommodating slot 71, or may be an elastic body that is made of a hollow elastic material.

In still another implementation, after the first locking component and the second locking component are unlocked, both elasticity produced in a process in which a rubber plug of the headset head portion 3601 converts from a compressed state to a free state and repulsive force of the magnet 3604 and the magnet 73 function to enable the headset tail portion 3602 of the Bluetooth headset 300 to extend out of the opening of the accommodating slot 71, to remove the Bluetooth headset 300 from the hand ring. The rubber plug disposed in the headset head portion 3601 is inserted in an ear canal during wearing, to ensure firmness and an acoustic requirement of the Bluetooth headset 300. When the rubber plug is pressed into the accommodating slot 71, resistance is produced due to a specific compressed state of the rubber plug, to ensure that when released, the Bluetooth headset 300 cannot fall out of the accommodating slot 71. Certainly, if the rubber plug of the headset head portion 3601 has enough elasticity, the magnet 3604 and the magnet 73 may be omitted. The ejecting portion in the foregoing two manners may be used when an operation portion is not disposed.

When the Bluetooth headset 300 is accommodated in the accommodating slot 71, the fastening hook 722 of the key is fastened to the fastening slot 3603 on the Bluetooth headset 300, to lock the Bluetooth headset 300 in the accommodating slot 71, to prevent the Bluetooth headset 300 from falling. In this case, the magnet on the Bluetooth headset 300 is opposite to the magnet in the accommodating slot, an outer surface of the headset tail portion 3602 and the bearing face 702 are located on a same plane and are located on two sides of the display screen 74, to ensure integrity of the appearance of the hand ring. The Bluetooth headset is accommodated in the accommodating slot from the front face of the hand ring, to help the user remove the Bluetooth headset. A decorative layer is disposed on the outer end face 3604 of the headset tail portion. A layer that has the same color as that of the front face of the main body of the watch 70 or a color layer may be disposed, to improve the appearance of the hand ring. Certainly, a coating may be a headset icon. The Bluetooth headset may be directly placed on the hand ring to help the user accommodate, remove, and use the Bluetooth headset, and may also not damage the integrity of the appearance of the hand ring and improve the appearance of the hand ring.

In a seventh embodiment of the present invention, the bearing body is the main body of the watch and a watch band is connected to the main body of the watch, a flexible key and a fastening hook and an ejector rod that are connected to the flexible key are disposed on each of two opposite sides of the Bluetooth headset, and fastening directions of the ejector rod and the fastening hook are perpendicular to each other. The watch band includes a watch fastener, the accommodating slot is disposed on an outer surface of the watch fastener, the accommodating slot includes two first side walls that are disposed opposite to each other, and a fastening slot is disposed on an inner surface of each first side wall.

The Bluetooth headset is accommodated in the accommodating slot, two fastening hooks are fastened into the fastening slot, the ejector rod is compressed into the Bluetooth headset, and the flexible key is pressed into the Bluetooth headset, to enable the fastening hook to be unlocked with the fastening slot and enable the ejector rod to extend out of the Bluetooth headset and abut against a bottom wall of the accommodating slot, and therefore, the Bluetooth headset is pushed out of the accommodating slot. The following describes a specific embodiment.

Figure 25A:
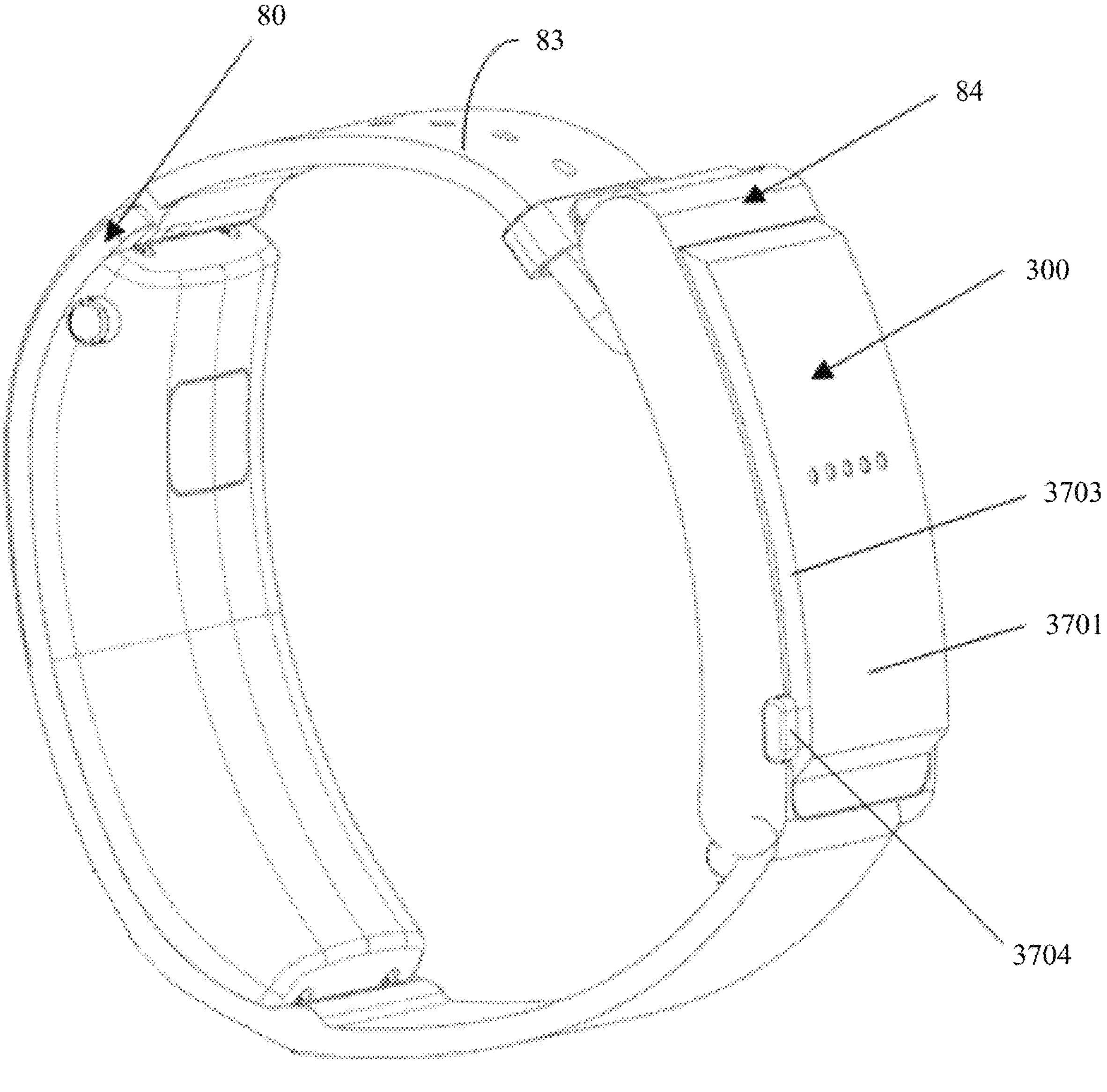
FIG. 25*a* is a schematic diagram of a wearable device according to a seventh embodiment of this application.
Figure 25B:
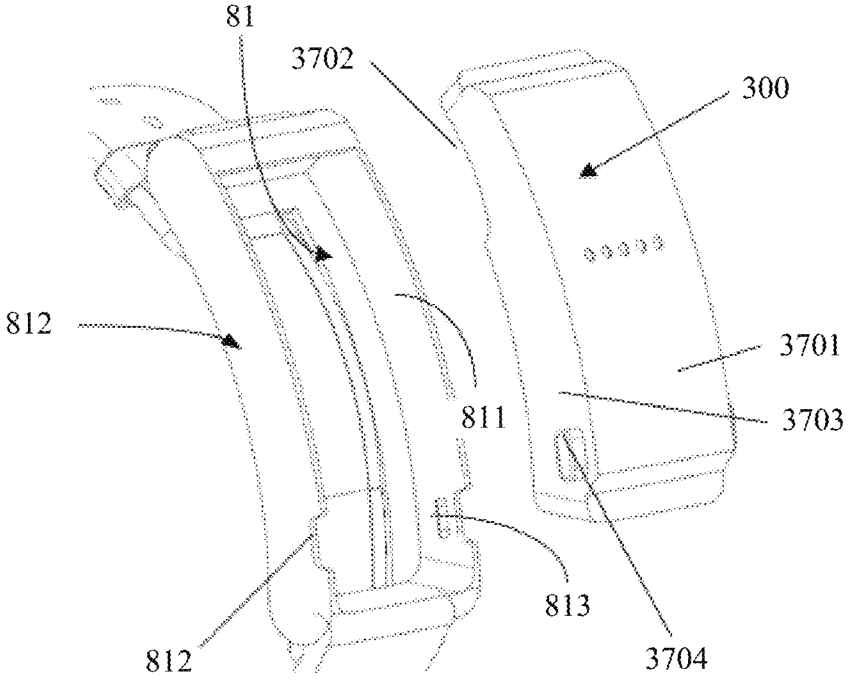
FIG. 25*b* is a schematic diagram of an unlocking state of a Bluetooth headset and a watch fastener of the wearable device shown in FIG. 25*a*.

Referring to FIG. 25*a* and FIG. 25*b*, FIG. 25*a* is a schematic structural diagram of the watch in this embodiment, and FIG. 25*b* is a schematic exploded view of a watch fastener 84 and the Bluetooth headset shown in FIG. 25*a*. As shown in FIG. 25*a*, the watch includes a main body of a watch 80, a watch band 83 connected to the main body of the watch 80, and the Bluetooth headset 300. The Bluetooth headset 300 includes an external portion 3701. The watch band 83 includes a band body and the watch fastener 84 that is disposed on the band body. The accommodating slot 81 (as shown in FIG. 25*b*) is disposed on an outer surface of the watch fastener 84. The Bluetooth headset is accommodated in the accommodating slot 81, the external portion 3701 encapsulates an opening of the accommodating slot 81, and a surface of the external portion 3701 of the Bluetooth headset 300 is coplanar with the outer surface of the watch fastener 84. The accommodating slot 81 that accommodates the Bluetooth headset 300 is disposed on the watch fastener 84 of the watch band 83. The watch fastener 84 is configured to fasten the watch band 83 to a wrist of the user. The Bluetooth headset and the watch fastener may be located through friction, or an adhesive layer may be disposed on the outer surface of the entire Bluetooth headset, to strengthen fastening force between the headset and the accommodating slot.

When the Bluetooth headset 300 is accommodated in the accommodating slot 81, a front face 3701 of the Bluetooth headset 300 protrudes from the accommodating slot 81, to ensure integrity of appearance of the watch fastener. Appearance and a shape of the Bluetooth headset 300 is consistent with those of the watch fastener 84. The Bluetooth headset 300 is directly installed on the watch fastener 84 of the watch band, to facilitate usage and avoid losing the headset. The Bluetooth headset 300 does not need to occupy space of the dial of the watch and the watch fastener is fully used, to reduce manufacturing costs of the watch.

Referring to FIG. 25*b*, the Bluetooth headset 300 includes the external portion 3701 (the front face), a back face 3702, and two side faces 3703 that are disposed opposite to each other. First locking components (not shown in the figure) are disposed on two opposite sides of the Bluetooth headset 300. Second locking components opposite to the first locking components are disposed on an inner side of a side wall of the accommodating slot 81. The first locking component includes a flexible key 3704, a fastening hook and an abutting component that are connected to the flexible key. The fastening hook is located on a side that is of the key 3704 and that faces away from the external portion 3701. The abutting component is located on a back face opposite to the external portion 3701. The second locking component is a fastening slot 813. After the Bluetooth headset 300 is accommodated in the accommodating slot 81, the fastening hook is fastened to the fastening slot 813, and the abutting component is retracted to the back face of the Bluetooth headset 300. When the flexible key is pressed, the fastening hook falls out of and is unlocked with the fastening slot 813, and the abutting component pushes the Bluetooth headset 300 out of the accommodating slot 51.

The head portion that is of the Bluetooth headset and that is put into the ear is located on the back face 3702, and the head portion of the Bluetooth headset is accommodated in specific space of the accommodating slot, or may be accommodated in the Bluetooth headset 300, and is rotated out when required to be used. Furthermore, a layer is disposed on a surface of the external portion 3701 of the Bluetooth headset, the Bluetooth headset is accommodated outside the watch fastener, and the layer is exposed on the watch fastener and is used to decorate the watch fastener. The layer may be a color layer, or a layer having a pattern.

Figure 25C:
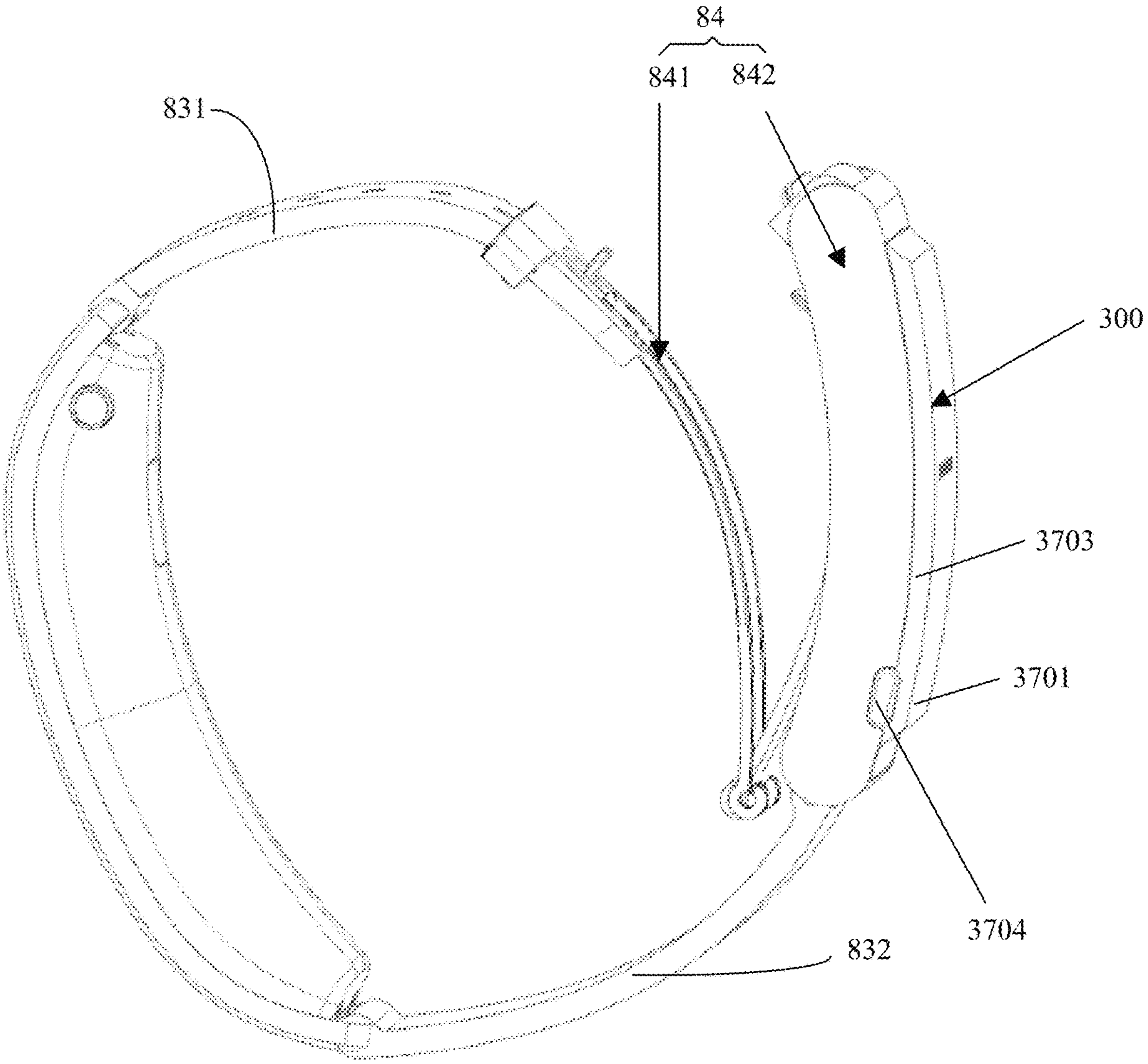
FIG. 25*c* is a diagram of an unlocking state of the watch fastener of the wearable device shown in FIG. 25*a*.

As shown in FIG. 25*c*, the band body includes a first band body 831 and a second band body 832, the first band body 831 and the second band body 8432 are respectively connected to two opposite ends of the main body of the watch 80, the watch fastener 84 includes a foldable connection band 841 and a buckle 842, and the accommodating slot 81 is disposed on an outer surface of the buckle 842; and one end of the connection band 841 is connected to the first band body 831, the other end is connected to one end of the buckle 842, the other end of the buckle 842 is connected to the second band body 832, and the buckle 842 is configured to firmly lock the first band body 831 with the second band body 842. The buckle 822 is connected to an end portion of the connection band 821 and is fastened to the connection band 821 or the first band body 831, to firmly lock the watch band 200 with the wrist of the user. The connection band 841 is located on a back face of the buckle 842 and is foldable. The buckle 842 is fastened to the first band body 831 or the connection band 841 by coordinating the fastening hook with the fastening slot.

Still referring to FIG. 25*b*, the accommodating slot 81 includes two first side walls 811 that are disposed opposite to each other, a notch 812 is disposed at an end portion of each first side wall 811, the Bluetooth headset 300 is accommodated in the accommodating slot 81, two flexible keys 3704 are fastened into notches 812, and the flexible key 3704 is pressed into the Bluetooth headset 300, to unlock the fastening hook that is connected to the flexible key 3704 with the fastening slot 813, and the Bluetooth headset may be removed from the watch fastener. Furthermore, the flexible key 3704 is a function key of the Bluetooth headset, and is configured to start the Bluetooth headset when the Bluetooth headset 300 is removed from the watch fastener.

In this embodiment, when the Bluetooth headset 300 needs to be removed, the flexible key 3704 on the Bluetooth headset 300 is pressed, so that the fastening hook on the key 3704 is unlocked with the fastening slot 813, and the Bluetooth headset 300 may be removed from the watch band 200. In another implementation, the flexible key 3704 on the Bluetooth headset 300 is canceled, and the fastening slot may also be canceled, and a layer of rubber is directly added on the outer surface of the Bluetooth headset. After the Bluetooth headset 300 is accommodated in the accommodating slot, the rubber is compressed to increase friction between the Bluetooth headset and the accommodating slot 81, to limit the Bluetooth headset 300 on the watch fastener 84. This structure is simple.

In this embodiment, the Bluetooth headset 300 is disposed on the watch fastener 84. In this way, it is convenient for the user to use the Bluetooth headset 300, and the user does not need to put the Bluetooth headset 300 in another position such as a pocket of a garment, to avoid losing the Bluetooth headset 300, to enable a thickness of the Bluetooth headset and a thickness of the watch fastener 84 to be the same and an entire thickness of the watch band 83 not to be increased. Comfort of the band body of the watch band is not affected, and the dial does not need to be structurally changed. The Bluetooth headset 300 has the key 3704. When the key 3704 is pressed, an action of removing the headset may be performed, so that accommodating and removing the Bluetooth headset 300 are more convenient and quick.

Furthermore, a main accommodating slot is further disposed on the main body of the watch 80, and the primary Bluetooth headset is accommodated in the sub-accommodating slot and is locked with the sub-accommodating slot by using the locking component. The primary Bluetooth headset and the Bluetooth headset may be used at the same time, or may be used separately, to increase convenience of the user. When one of the primary Bluetooth headset and the Bluetooth headset is used, the other is charged by using a watch circuit, to ensure that the Bluetooth headset can be always used in a standby mode.

Based on any one of the foregoing embodiments, the accommodating slots that accommodate the two Bluetooth headsets may be replaced with one accommodating slot, and the other accommodating slot is disposed on the watch band. It may also be understood that there is only one Bluetooth headset and the Bluetooth headset is accommodated on the watch band. In this embodiment, the wearable device includes the primary Bluetooth headset and a secondary Bluetooth headset (subsequently referred to as the Bluetooth headset), a main accommodating slot is disposed on the main body of the watch, and the primary Bluetooth headset is accommodated in the main accommodating slot and is locked by using the locking component. The main accommodating slot may be the accommodating slot in any one of the foregoing embodiments, but the accommodating slot is used for one headset. The locking component may also be the locking component in the foregoing embodiments. The primary Bluetooth headset and the Bluetooth headset may be used at the same time, or may be used separately, and do not affect each other, to improve flexibility of using the headset. When one of the primary Bluetooth headset and the Bluetooth headset is used, the other is charged by using a watch circuit, to ensure that one Bluetooth headset usually has enough power.

In this embodiment, the Bluetooth headset is handily disposed at a position of the watch fastener, to improve efficient utilization of current space of the watch, and decrease accommodating space that needs to be additionally disposed for accommodating the Bluetooth headset, and reduce manufacturing costs.

The wearable device provided in this application detachably accommodates the Bluetooth headset in the accommodating slot of the main body of the watch or the watch band of the wearable device. The wearable device may further locate the Bluetooth headset in the accommodating slot by coordinating the first locking component with the second locking component. The Bluetooth headset is removed from the wearable device when the Bluetooth headset needs to be used. Therefore, it is convenient to accommodate the Bluetooth headset, the Bluetooth headset does not easily fall out of the wearable device, and requirements of the user to listen to music and have a call during exercising or driving. It is convenient to carry and use the Bluetooth headset.

The foregoing descriptions are preferred implementations in the embodiments of the present invention. It should be noted that a person of ordinary skill in the art may make improvements and polishing without departing from the principle of the embodiments of the present invention and the improvements and polishing shall fall within the protection scope of the embodiments of the present invention.

What is claimed is:

1. A wearable device, comprising a bearing body and a Bluetooth headset, wherein an accommodating slot is disposed on the bearing body, a first locking component is disposed on the Bluetooth headset, a second locking component is disposed on the bearing body, the Bluetooth headset is configured to be accommodated in the accommodating slot, and the first locking component is configured to be locked with the second locking component; and the Bluetooth headset comprises an operation portion, and the operation portion is configured to: unlock the first locking component and the second locking component, and push the unlocked Bluetooth headset out of the accommodating slot, wherein the wearable device is a watch, the bearing body comprises a main body of the watch and a bottom housing, a display screen is disposed on a front face of the main body of the watch, the accommodating slot is disposed on the bottom housing, and the main body of the watch and the bottom housing are movably connected to each other through a connection portion; an elastic ejector pin is disposed on the Bluetooth headset, the main body of the watch covers the bottom housing to encapsulate the accommodating slot, a back face of the main body of the watch assists the first locking component and the second locking component in abutting against the Bluetooth headset, and the elastic ejector pin is compressed into the Bluetooth headset; and the main body of the watch moves relative to the bottom housing through the connection portion, to expose the accommodating slot, and after the main body of the watch is separated from the Bluetooth headset, the elastic ejector pin enables the first locking component and the second locking component to be entirely unlocked, and pushes the Bluetooth headset out of the accommodating slot.

2. The wearable device according to claim 1, further comprising a second Bluetooth headset and a second accommodating slot, wherein each Bluetooth headset comprises a headset head portion and a headset tail portion, the headset tail portion comprises a pressing end, a contact position is disposed on an inner surface that is of the headset tail portion and that faces towards the accommodating slot, a support position that faces towards the contact position is disposed on a bottom wall of the accommodating slot, and the operation portion comprises the pressing end and the contact position; and the Bluetooth headset is accommodated in the accommodating slot, the contact position of the Bluetooth headset abuts against the support position, the pressing end protrudes from the accommodating slot, a tail portion position of the Bluetooth headset is pressed into the accommodating slot, and the support position is used as a fulcrum for the Bluetooth headset, to enable the headset head portion to move out of the accommodating slot and the first locking component to be unlocked with the second locking component.

3. The wearable device according to claim 1, further comprising a second Bluetooth headset and a second accommodating slot, wherein each Bluetooth headset comprises a headset head portion and a headset tail portion, and each accommodating slot comprises a bottom wall opposite to an opening of the accommodating slot;

the headset head portion comprises a head portion base and an earbud body that is slidably installed on the head portion base, a column is disposed at an end of the earbud body, two opposite ends of an elastic body are separately connected between the head portion base and the earbud body, and the headset tail portion comprises a pressing end; and after the Bluetooth headset is locked in the accommodating slot, the earbud body abuts against the bottom wall, the elastic body is pre-compressed, and the Bluetooth headset is pressed from the outside of the accommodating slot, so that the first locking component and the second locking component are unlocked, and the Bluetooth headset is ejected by elasticity of the elastic body.

4. The wearable device according to claim 1, further comprising a second Bluetooth headset and a second accommodating slot, wherein each Bluetooth headset comprises a headset head portion and a headset tail portion, a main body of the watch comprises a first side portion and a second side portion that is disposed opposite to the first side portion, the accommodating slot is recessed into the bearing body from the first side portion and extends to the second side portion, a through hole corresponding to each accommodating slot is disposed on the second side portion, and the through hole is in communication with the accommodating slot corresponding to the through hole; and the Bluetooth headset is accommodated in the accommodating slot, the headset head portion encapsulates an opening of the accommodating slot, the headset tail portion protrudes from the second side portion of the main body of the watch through the through hole, and the headset tail portion is pushed into the bearing body, so that the first locking component is unlocked with the second locking component and the headset head portion extends out of the accommodating slot.

5. The wearable device according to claim 1, wherein the Bluetooth headset comprises a headset tail portion and a headset head portion, and the headset tail portion comprises the first locking component and an ejector pin;

an installation hole that threads through an outer side face of the main body of the watch is disposed on a side wall of the accommodating slot, the second locking component comprises an elastic key and a fastening hook, the elastic key comprises an abutting body that faces towards the fastening hook, the elastic key is inserted in the installation hole from the outside of the main body of the watch, the fastening hook is located in the accommodating slot and is far away from the installation hole, and the abutting body abuts against the ejector pin; and the Bluetooth headset is accommodated in the accommodating slot, the fastening hook is fastened to the first locking component from a side of the headset tail portion, the elastic key is pressed to push the ejector pin, so that the ejector pin then pushes the Bluetooth headset out of the accommodating slot, and pushing force of the ejector pin and pushing force of the elastic key enable the fastening hook to move far away from the headset tail portion and to be unlocked with the first locking component.

6. The wearable device according to claim 1, wherein a watch band is connected to the main body of the watch, a flexible key and a fastening hook and an ejector rod that are connected to the flexible key are disposed on each of two opposite sides faces of the Bluetooth headset, and fastening directions of the ejector rod and the fastening hook are perpendicular to each other;

the watch band comprises a watch fastener, the accommodating slot is disposed on an outer surface of the watch fastener, the accommodating slot comprises two first side walls that are disposed opposite to each other, and a fastening slot is disposed on an inner surface of each first side wall; and the Bluetooth headset is accommodated in the accommodating slot, two fastening hooks are fastened into the fastening slot, the ejector rod is compressed into the Bluetooth headset, and the flexible key is pressed into the Bluetooth headset, so that the fastening hook is unlocked with the fastening slot, and the ejector rod extends out of the Bluetooth headset and abuts against a bottom wall of the accommodating slot, to push the Bluetooth headset out of the accommodating slot.

7. The wearable device according to claim 2, wherein the headset head portion comprises a head portion base and an earbud body that is slidably installed on the head portion base, a column is disposed at an end of the earbud body, two opposite two ends of the elastic body are separately connected between the head portion base and the earbud body; and after the Bluetooth headset is locked in the accommodating slot, the elastic body is pre-compressed, and the pressing end of the Bluetooth headset is pressed, so that the first locking component and the second locking component are unlocked, and the elastic body recovers elasticity to eject the headset head portion out of the accommodating slot.

8. The wearable device according to claim 2, wherein a first fastening slot is disposed on the headset head portion, a second fastening slot is disposed on the headset tail portion, and the accommodating slot is disposed on each of two opposite sides of the main body of the watch; and an elastic component is disposed in each accommodating slot, the elastic component comprises the elastic body and an elastic fastener that is disposed opposite to the elastic body, the elastic body comprises a connection end that is connected to the accommodating slot and a free end opposite to the connection end, an elastic protrusion is disposed on the free end, the Bluetooth headset is accommodated in the accommodating slot, the elastic protrusion is elastically fastened into the first fastening slot, and the elastic fastener is fastened into the second fastening slot.

9. The wearable device according to claim 8, wherein the accommodating slot comprises the bottom wall that is located between the first wall and the second wall, a support body that faces towards an opening of the accommodating slot is convexly disposed on the bottom wall, and the support position is located on the support body.

10. The wearable device according to claim 8, wherein a recessed portion is disposed on the second wall, an elastic end is disposed on the elastic fastener, and the elastic end is fastened to the recessed portion, so that the elastic fastener is configured to be elastically deformed relative to the recessed portion.

11. The wearable device according to claim 3, wherein a contact position is disposed on an inner surface that is of the headset tail portion and that faces towards the accommodating slot, a support position that abuts against the contact position is disposed on the bottom wall of the accommodating slot, the support position is used as a fulcrum for the Bluetooth headset, and the pressing end of the Bluetooth headset is pressed from the outside of the accommodating slot, so that the first locking component and the second locking component are unlocked.

12. The wearable device according to claim 3, wherein the wearable device comprises a driving component, the accommodating slot is disposed on each of two opposite sides of the main body of the watch; and the driving component comprises a sliding portion and the second locking component, the sliding portion comprises two opposite sliding directions, the two sliding directions are the same as directions in which two Bluetooth headsets are separated from the accommodating slots, the Bluetooth headset is fastened in the accommodating slot by fastening the first locking component and the second locking component, and when the sliding portion is driven to slide in a sliding direction, the second locking component is driven to be unlocked with the Bluetooth headset in the sliding direction.

13. The wearable device according to claim 12, wherein the Bluetooth headset comprises the headset head portion and the headset tail portion, a first fastening slot is disposed on the headset head portion, and a second fastening slot is disposed on the headset tail portion;

the second locking component comprises two elastic fastening bodies and two elastic fasteners;

each accommodating slot comprises a first wall and a second wall opposite to the first wall, the two elastic fasteners are respectively installed on second walls of the two accommodating slots, the sliding portion and the two elastic fastening bodies are disposed in the main body of the watch, the two elastic fastening bodies are respectively located in the two sliding directions of the sliding portion, and the two elastic fastening bodies respectively extend into the corresponding accommodating slots through two first walls;

the Bluetooth headset is accommodated in the accommodating slot and is located between the first wall and the second wall, the elastic fastener is fastened to the second fastening slot, the elastic fastening body is elastically fastened into the first fastening slot, and when the sliding portion is driven to slide in the sliding direction, the elastic fastening body located in the sliding direction is driven to be unlocked with the first fastening slot that is of the Bluetooth headset and that is fastened to the elastic fastening body.

14. The wearable device according to claim 13, wherein the sliding portion comprises a sliding slot and a sliding block that is slidably installed in the sliding slot, the sliding block comprises a first end and a second end that are opposite to each other, first abutting bevels are disposed on both of the first end and the second end, and second abutting bevels are disposed on both of the two elastic fastening bodies; and the two elastic fastening bodies are installed in the sliding slot and are respectively located on the first end and the second end of the sliding block, the first abutting bevel abuts against the second abutting bevel, the two elastic fastening bodies partially extend out of the sliding slot and is elastically fastened to the first fastening slot, the sliding block slides to the first end or the second end, the first abutting bevel abuts against and pushes the second abutting bevel that is coordinated with the first abutting bevel, to enable the elastic fastening bodies to be retracted into the sliding slot and to be unlocked with the first fastening slot.

15. The wearable device according to claim 14, wherein each elastic fastening body comprises a fastener body and a spring with one end disposed on the fastener body, the other end of the spring is connected to the sliding slot, the second abutting bevel is disposed on the fastener body, the fastener body extends out of the sliding slot and is fastened to the first fastening slot, and the spring provides fastening force to the fastener body.

16. The wearable device according to claim 15, wherein the sliding portion further comprises two return springs, the two return springs are separately connected between the sliding slot and the sliding block and have opposite elasticity, an elasticity direction of the spring is perpendicular to elasticity directions of the return springs, and the return springs provide return elasticity to the sliding block that has slid.

17. The wearable device according to claim 16, wherein two first stopping blocks that are spaced apart are disposed on a side wall of the sliding slot, a second stopping block is disposed on a surface that is of the sliding block and that is located between the first end and the second end, two opposite ends of each return spring are separately connected between the first stopping block and the second stopping block, and an elasticity direction is parallel to a sliding direction of the sliding block.

18. The wearable device according to claim 15, wherein a fastener is disposed at an end portion that is of the fastener body and that is far away from the spring, the sliding slot comprises a first side wall and a second side wall that are disposed opposite to each other and a third side wall that is connected to the first side wall and the second side wall, the first stopping block is disposed on the third side wall, a through hole in communication with the outside is disposed on each of two opposite ends of the second side wall, the spring is connected to the first side wall, and the fastener extends out of the sliding slot through the through hole.

19. The wearable device according to claim 14, wherein the sliding portion comprises a base, the sliding slot is disposed on the base, the base is installed on a side that is in the main body of the watch and on which the accommodating slot accommodates the headset head portion, and the elastic fastening body extends out of the base and then extends into the accommodating slot.

* * * * *